(12) United States Patent
Hokodate et al.

(10) Patent No.: US 6,353,203 B1
(45) Date of Patent: Mar. 5, 2002

(54) LASER MACHINING DEVICE

(75) Inventors: Toshiyuki Hokodate; Yasuhiko Iwai; Miki Kurosawa; Junichi Nishimae; Kentaro Tanaka, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 31 days.

(21) Appl. No.: 09/602,154

(22) Filed: Jun. 21, 2000

Related U.S. Application Data

(63) Continuation of application No. PCT/JP97/04914, filed on Dec. 26, 1997.

(51) Int. Cl.[7] .................................... B23K 26/02
(52) U.S. Cl. ...................... 219/121.67; 219/121.75; 219/121.81
(58) Field of Search ............... 219/121.67, 121.68, 219/121.69, 121.7, 121.71, 121.72, 121.73, 121.74, 121.75, 121.79, 121.8, 121.81

(56) References Cited

FOREIGN PATENT DOCUMENTS

| JP | A-59-95510 | 6/1984 | | |
|---|---|---|---|---|
| JP | A-62-142484 | 9/1987 | | |
| JP | A-62-267093 | 11/1987 | | |
| JP | A-1-122688 | 5/1989 | | |
| JP | A-4-327391 | 11/1992 | | |
| JP | A-5-183216 | 7/1993 | | |
| JP | A-7-120650 | 5/1995 | | |
| JP | A-7-124778 | 5/1995 | | |
| JP | A-7-185861 | 7/1995 | | |
| JP | 407283470 A | * | 10/1995 | ............... 219/121.6 |

* cited by examiner

Primary Examiner—Samuel M. Heinrich
(74) Attorney, Agent, or Firm—Sughrue Mion, PLLC

(57) ABSTRACT

In a laser machining apparatus comprising a deflector for changing a direction of a laser beam outputted from a laser oscillator, and a converging lens for refracting the laser beam introduced from the deflector and focusing the laser beam onto a work to be machined, a lens position adjusting unit is provided for changing a relative position between a plurality of lenses constituting the converging lens and the lens position adjusting unit change the relative positions of the lenses so as to cancel a change in refractance of the lenses due to a change in the temperature.

33 Claims, 47 Drawing Sheets

FIG.30

$$\begin{Bmatrix} x' \\ y' \end{Bmatrix} = \begin{pmatrix} a_1 & a_2 & a_3 & a_4 & a_5 & a_6 \\ a_7 & a_8 & a_9 & a_{10} & a_{11} & a_{12} \end{pmatrix} \begin{pmatrix} 1 \\ x \\ y \\ xy \\ x^2 \\ y^2 \end{pmatrix}$$

MACHINING TO
25 POINTS

↓

COORDINATES OF THE POINTS $P_1$, $P_2$,
$\cdots P_{25}$ ARE MEASURED

↓

TRANSFORMATION COEFFICIENTS $a_1 \sim a_{25}$ x', y' = INSTRUCTED COORDINATES
x, y = TARGET MACHINING POSITION $$\{M\} = \begin{pmatrix} a_1 & a_2 & a_3 & a_4 & a_5 & a_6 \\ a_7 & a_8 & a_9 & a_{10} & a_{11} & a_{12} \end{pmatrix}$$

FIG.32

TEMPERATURE CORRECTION TABLE

| T TEMPERATURE (°C) | CORRECTION MATRIX M |
|---|---|
| 18 | $[M_1]$ |
| 19 | $[M_2]$ |
| 20 | $[M_3]$ |
| 21 | $[M_4]$ |
| 22 | $[M_5]$ |
| ⋮ | ⋮ |

LASER MACHINING DEVICE

This Appln is a continuation of PCT/JP97/04914 filed Dec. 26, 1997.

TECHNICAL FIELD

The present invention relates to a laser machining device, and more specifically to a laser machining device for drilling, cutting, or marking a material of a printed board, a semiconductor chip or the like such as resin or ceramics.

BACKGROUND ART

As a laser machining device for drilling, cutting, or marking, there has been well known the one having a structure as shown in FIG. 46.

This laser machining device has a laser oscillator 1 which is a source of a laser beam L, a collimate lens 2 for adjusting a divergence angle of the laser beam, Y-axial and X-axial galvanomirrors 3 and 4 each for deflecting the laser beam L to a required direction based on the rotation angle, a Y-axial galvanoscanner 5 and an X-axial galvanoscanner 6 each for adjusting rotation angles of the Y-axial galvanomirror 3 and X-axial galvanomirror 4 respectively according to a machining program, and a converging lens 7 for introducing and converging the laser beam L deflected by the Y-axial galvanomirror 3 and X-axial galvanomirror 4.

Wavelength of the laser beam L generated by the laser oscillator 1 varies according to a quality of a work to be machined, but in many cases a carbon oxide gas laser is used as the laser oscillator 1.

The converging lens 7 is an optical lens capable of deciding a converging position according to the incidence angle of the laser beam, and changes a converging position according to an incidence angle decided under deflection control by the Y-axial galvanomirror 3 and X-axial galvanomirror 4.

The laser machining device has an XY table device 8 for mounting and positioning of a work W to be machined, and by moving the work W can change the relative position of the work W with respect to the converging lens 7 according to movement of the XY table device 8 along the axes. Laser beam L converged by the converging lens 7 is irradiated onto the work W mounted on the XY table device 8.

Adjacent to the XY table device 8, there is provided a vision sensor 9 for detecting a machined position on the work W machined by means of irradiation of the laser beam L.

Connected to the laser machining device is a control unit 10 such as a numerical control unit for driving and controlling the laser oscillator 1, Y-axial galvanoscanner 5 and X-axial galvanoscanner 6. In many cases the control unit 10 is a PC-NC having a personal computer as a user interface, and has a machining program with machining positions or conditions for machining described therein previously stored in the personal computer.

Types of machining required in a laser machining device include drilling of a small hole having a diameter in a range from 50 μm to around 200 μm, and in this type of machining for drilling a small hole it is necessary to converge a laser beam onto a very small spot having a diameter in a range from 50 μm to around 200 μm on the work W to be machined. To achieve this, the converging lens for converging a laser beam onto a work W is used.

A light path of a laser beam outputted from the laser oscillator 1 to the work W has a certain distance, so that the laser beam diverges while propagating this light path and the diameter of the beam becomes larger on the Y-axial galvanomirror 3 and X-axial galvanomirror 4. To obtain a required diameter for the laser beam, adjustment of the divergence angle of the laser beam is required. To achieve this, the collimate lens 2 is provided in the light path to adjust the beam diameter.

To irradiate the laser beam L onto a required portion of the work W, the Y-axial galvanoscanner 5 and X-axial galvanoscanner 6 are driven to change the rotation angles of the Y-axial galvanomirror 3 and X-axial galvanomirror 4 so as to deflect the laser beam to a required position in a required direction. Coordinates on the work W are unitarily decided according to an incidence angle θ of the deflected laser beam with the converging lens 7.

In response to a start instruction from an operator or a start signal inputted from the outside the control unit 10 executes machining based on the selected machining program. In this machining program, data for required machining positions are converted into the coordinates of the XY table device 8 as well as into the coordinates (rotation angles) of the galvanoscanners 3 and 4.

When executing a machining program, the control unit 10 outputs a drive signal according to the machining program so that large movement is executed by means of movement of the XY table device 8 in which many movement strokes can be set, and small movement is executed by means of scan movement of the Y-axial galvanomirror 3 and X-axial galvanomirror 4 each having a high moving speed.

Generally a DC servo motor is used for the Y-axial galvanoscanner 5 and X-axial galvanoscanner 6, and the technique for providing a position detector or servo control is often employed. Generally the XY table device 8 is driven and controlled by a servo motor using a ball screw.

The Y-axial galvanoscanner 5 and X-axial galvanoscanner 6 can make positioning at a high speed of a round 500 holes/s, and the XY table device 8 can be driven at a speed of 30 m/s. Presently, a positioning precision for the Y-axial galvanoscanner 5, X-axial galvanoscanner 6 and XY table device 8 can be achieved to a level of around ±20 μm.

Generally the converging lens 7 is classified as a conversion lens, and is often used as a combination lens called as the fθ lens. FIG. 47 shows a converging position when the fθ lens is used as the converging lens 7. With the fθ lens, it is possible to obtain an image height (operational distance) ω proportional to an incidence angle θ of the laser beam L having passed through the focus position into the fθ lens. It has been known that the following equation is established in this case:

$$\omega = f \cdot \theta$$

wherein f indicates a focal length of the fθ lens and θ indicates an incidence angle of the laser beam.

The converging lens 7 gets aberration like in a general optical glass lens, so that it is difficult to maintain the relation of ω=f·θ. Therefore, in many cases a deviation between the theoretical value and the actual value is measured and this deviation is used as means for correcting an instruction value for a deflection angle of each of the Y-axial galvanoscanner 5 and X-axial galvanoscanner 6.

In this correction, correction of the converging lens is made for each machining position (x, y) to decide instruction values (x', y') for the deflecting devices (Y-axial galvanoscanner 5, X-axial galvanoscanner 6). This correction is often made by using an expression for conversion using a matrix, and to decide this expression for conversion, it is possible to cancel such an effect as aberration of a lens at the point of time by updating the expression for conversion used for correction independently from an ordinary machining sequence.

FIG. 48 is a flow chart showing a sequence for correcting and updating the parameters of the converging lens. To correct the aberration of the converging lens, drilling for correction is executed according to an instruction for machining positions having the configuration shown in FIG. 49 and the latticetype pattern shown as shown in FIG. 50 (step S611). However, because of aberration of the converging lens 7, in most cases the actually machined positions are displaced from the actually instructed lattice points as shown in FIG. 51.

When the drilling for correction is complete, a position of a machined hole is monitored with the vision sensor 9, and the coordinates of the machined hole are detected (step S612). With such operations a deviation between theoretical positions of the holes and an actually position of the machined holes can be obtained, so that coordinate transformation can be executed to obtain a desired machining position according to the obtained deviation. The coordinate transformation is often executed by an expression for conversion using a matrix, and fitting by means of, for instance, the least square method is executed according to deviation between a machining position theoretically obtained from characteristics of the converging lens 7 and an actual machined position, and then elements of a matrix [M] are obtained by means of correction matrix computing (step S613).

The converging lens 7 is required to have a high transmittance (or a low reflective index) against a wavelength of a laser beam, and especially in a case of a carbon oxide gas laser often used, there are some restrictions for a material of a lens, and generally a semiconductor crystalline material such as germanium (Ge) is used. It has been known that the lens material as described above has a very large temperature coefficient dn/dT for a refractive index n deciding the optical characteristics, and that germanium (Ge) has a temperature dependency dn/dT of 277 (/° C.).

As the conventional type of laser machining device has the configuration as described above, when the temperature of the converging lens 7 changes due to effect by the ambient temperature or heat generation by the laser machining device itself, displacement of a machining position substantially proportional to the temperature change is disadvantageously generated, and due to which a machining position is displaced by 10 to 15 $\mu$m per 1° C., which disadvantageously causes a machining fault.

Displacement of a machining position caused by aberration of the converging lens 7 can be compensated by correction for aberration of a converging lens by means of the coordinate transformation described above, but when the temperature of the converging lens 7 changes during correction for aberration, optical characteristics of the converging lens 7 changes, and when temperature rises further, the lattice points actually machined generally disadvantageously shrink as shown in FIG. 52.

Further, a change in the temperature of the converging lens 7 not only displaces the machining position, but also changes the focal length of the lens and separates the focal point from a surface of a work which in turn generates a machining position fault.

As shown in FIG. 53, when temperature of the converging lens 7 is T, a laser bean coming into the converging lens 7 converges like a laser beam La with a focal point Pa positioned on a surface of the work, so that excellent machining can be carried out, but when temperature of the converging lens 7 changes by $\delta$T, a laser beam having the same incidence angle converges like a laser beam Lb, so that displacement of a machining position by $\delta$X is generated, and in addition a height of the focal point Pb goes higher by $\delta$f.

This displacement of a machining position can be recognized only when the precision is checked after machining, so that sometimes a large number of works are continuously machined without knowing that there has generated a positional displacement and a large number of badly machined boards are disadvantageously produced.

Although displacement of a machining position can be corrected by frequently correcting aberration of a converging 5 lens, but to correct the aberration of a converging lens during operation in an automatic mode the operation is requires to be stopped which lowers the productivity.

There is no means for automatically detecting displacement of the focal length, so that it is required for an operator to previously obtain the focal length by actually operating the machining device, and in a case where the displacement of a focal length occurs as time goes by, there is no method to take appropriate countermeasures for the displacement of a focal length.

In the production of the printed boards, needs for further size reduction and higher machining precision in drilling have been becoming increasingly stronger in association with reduction of size and weight of electronic circuits and the trend for a higher degree of integration, so that there are strong needs for improving performance of a laser machining device.

The present invention was made to solve the problems as described above, and it is an object of the present invention to provide a laser machining device in which a converging performance of a converging lens does not depend on temperature change in the converging lens, and also which insures high precision machined and stable laser machining even when used continuously for a long time.

DISCLOSURE OF THE INVENTION

The present invention can provide a laser machining apparatus comprising a deflector for changing a direction of a laser beam outputted from a laser oscillator, and a converging lens for refracting a laser beam introduced from the deflector and focusing the laser beam onto a work to be machined, in which the converging lens comprises a plurality of lenses and has a lens position adjusting unit for changing a relative position between the plurality of lenses to cancel a change in the reflective index of the lenses because of a change in the temperature so that the converging characteristics of the converging lens does not depend on a change in the temperature of the converging lens.

Because of this configuration, a change in the converging characteristics due to a change in the reflective index of a lens due to a change of temperature is canceled, the converging characteristics of the converging lens does not depend on a change in the temperature of the converging lens, and a change of a machining position or the like due to a change in the temperature of ambient air or generation of heat in the laser machining apparatus itself does not occur, so that stable laser machining is executed.

The present invention can provide a laser machining apparatus in which the lens position adjusting unit comprises a temperature measuring unit for detecting the temperature of the converging lens, an actuator for driving a lens in a direction of the optic axis, and a control circuit for controlling the actuator to compensate the displacement of the focal point of the converging lens because of a change in the temperature of the converging lens detected by the temperature measuring unit.

Because of this configuration, the lens is displaced along the direction of the optic axis by the actuator so that displacement of a focal point because of a change in the temperature of the converging lens is compensated according to the temperature of the converging lens detected by the temperature measuring unit, dependency of the converging characteristics of the converging lens on a change in temperature of the converging lens is prevented, and a change of a machining position due to the temperature of the ambient air or generation of heat in the laser machining apparatus itself does not occur, so that stable laser machining is executed.

The present invention can provide a laser machining apparatus, in which the actuator comprises a feed screw mechanism for moving the lenses along the direction of the optic axis, and a motor for rotating and driving the feed screw mechanism.

Because of this configuration, the lens can be moved accurately by the feed screw mechanism along the direction of the optic axis.

The present invention can provide a laser machining apparatus, in which the actuator comprises a piezoelectric element.

Because of this configuration, the lens can be moved accurately by the piezoelectric element along the direction of the optic axis.

The present invention can provide a laser machining apparatus, in which the lens adjusting unit comprises a holding member made from a material with temperature dependency for holding the lenses and changes a position of the lenses by contraction or expansion of the holding member itself according to a change in the temperature.

Because of this configuration, the lenses are displaced along the direction of the optic axis according to the contraction or expansion of the holding member itself due to a change in temperature, displacement of a focal point because of a change in the temperature of the converging lens is compensated by this displacement, and dependency of the converging characteristics of the converging lens on a change in the temperature of the converging lens is prevented, so that a change of a machining position or the like due to a change in the temperature of ambient air or generation of heat in the laser machining apparatus itself does not occur, and hence stable laser machining high precision is executed.

The present invention can provide a laser machining apparatus comprising a deflector for changing the direction of a laser beam outputted from a laser oscillator, and a converging lens for refracting a laser beam introduced from the deflector and focusing the refracted laser beam onto a work to be machined, in which the converging lens has, in addition to a group of convex lenses for converging a light beam, a concave lens for temperature compensation incorporated therein, a change in the reflective index of the group of convex lenses due to a change in the temperature is canceled by a change in the reflective index of the concave lens, and the converging characteristics of the converging lens does not depend on a change in the reflective index of the converging lens because of a change in the temperature.

Because of this configuration, a change in the reflective index of the convex lens group is canceled due to a change in temperature of the concave lens, and dependency of the converging characteristics of the converging lens on a change in temperature of the converging lens is prevented, so that a specific control system is not required, a change of a machining position or the like due to a change in the temperature of ambient air or generation of heat in the laser machining apparatus itself does not occur, and hence stable laser machining with high precision is executed.

The present invention can provide a laser machining apparatus, in which the convex lens group of the converging lens is made of zinc selenite and the concave lens is made of germanium.

Because of this configuration, a change in reflective index of the convex lens group can accurately be canceled due to a change in temperature of the concave lens, and dependency of the converging characteristics of the converging lens on a change in temperature of the converging lens is prevented, so that a change of a machining position or the like due to a change in the temperature of ambient air or generation of heat in the laser machining apparatus itself does not occur, and hence stable laser machining with high precision is executed.

The present invention can provide a laser machining apparatus comprising a deflector for changing a direction of a laser beam outputted from a laser oscillator, and a converging lens for refracting a laser beam introduced from the deflector and focusing the refracted laser beam onto a work to be machined; the machining device further comprising a temperature measuring unit for detecting the temperature of the converging lens, and a temperature display unit for displaying temperature of the converging lens detected by the temperature measuring unit.

Because of this configuration, temperature of the converging lens detected by the temperature measuring unit is clearly displayed on the temperature display unit for the operator.

The present invention can provide a laser machining apparatus, in which the temperature display unit has a reset button and a temperature change is displayed according to temperature of the converging lens when the reset button is operated.

Because of this configuration, a change in the temperature of the converging lens when the reset button is operated is displayed on the temperature display unit and a temperature change when the reset button of the converging lens can be clearly seen by the operator.

The present invention can provide a laser machining apparatus comprising a deflector for changing a direction of a laser beam outputted from a laser oscillator, and a converging lens for refracting a laser beam introduced from the deflector and focusing the refracted laser beam onto a work to be machined; the laser machining apparatus further comprising a temperature measuring unit for detecting the temperature of the converging lens, and an alarming unit for generating an alarm when a change in the temperature of the converging lens exceeds a previously decided permissible value.

Because of this configuration, when a change in the temperature of the converging lens exceeds a permissible value, the alarming unit generates an alarm to alert the operator indicating that a change in the temperature of the converging lens has exceeded a prespecified permissible value.

The present invention can provide a laser machining apparatus comprising a deflector for changing a direction of a laser beam outputted from a laser oscillator, and a converging lens for refracting a laser beam introduced from the deflector and focusing the refracted laser beam onto a work to be machined, the laser machining apparatus further comprising a temperature a measuring unit for detecting the temperature of the converging lens, and a heating unit for heating the converging lens so that the temperature of the converging lens detected by the temperature measuring unit will be maintained at a specified constant value.

Because of this configuration, temperature of the converging lens is maintained at a specified constant value because of heating by the heating unit, and generation of a change in the converging characteristics of the converging lens due to a temperature change is prevented, so that a change of a machining position or the like due to a change in the temperature of the ambient air or generation of heat in the laser machining apparatus itself does not occur, and hence stable laser machining with high precision is executed.

The present invention can provide a laser machining apparatus comprising a deflector for changing the direction of the laser beam outputted from a laser oscillator, and a converging lens for refracting the laser beam introduced from the deflector and focusing the refracted laser beam onto a work to be machined, the laser machining apparatus further comprising a temperature measuring unit for detecting the temperature of the converging lens, and a temperature control unit for cooling the converging lens so that the temperature of the converging lens detected by the temperature measuring unit will be maintained at a specified constant value.

Because of this configuration, temperature of the converging lens is maintained at a specified constant value because the converging lens is cooled by the temperature control unit, and generation of a change in the converging characteristics of the converging lens due to a change in the temperature is prevented, so that a change in the machining position or the like due to a change in the temperature of the ambient air or generation of heat in the laser machining apparatus itself does not occur, and hence stable laser machining with high precision is executed.

The present invention can provide a laser machining apparatus, in which the temperature control unit is a Peltier element.

Because of this configuration, the converging lens is cooled by the Peltier element and the temperature of the converging lens is maintained at a specified constant value, and generation of a change in the converging characteristics of the converging lens is prevented, so that a change in the machining position or the like due to a change in the temperature of the ambient temperature or generation of heat in the laser machining apparatus itself does not occur, and hence stable laser machining with high precision is executed.

The present invention can provide a laser machining apparatus comprising a deflector for changing the direction of a laser beam outputted from the laser oscillator, and a converging lens for refracting the laser beam introduced from the deflector and focusing the refracted laser beam onto a work to be machined; the laser machining apparatus further comprising an heat-insulating unit for protecting the converting lens from the temperature of ambient air.

Because of this configuration, heat from the ambient air is not conducted to the converging lens because of the presence of the heat-insulating unit and possibility of generation of a change in the optical characteristics of the converging lens due to a change in the temperature is suppressed, so that a change in the machining position due to a change in the temperature of the ambient air is prevented, and hence stable laser machining with high precision is executed.

The present invention can provide a laser machining apparatus, in which the heat-insulating unit comprises an outer cylindrical body surrounding the converging lens, a heat insulating material filled in a heat-insulating space defined by the converging lens and the outer cylindrical body surrounding the converging lens, and a window seal plate through which a laser beam can be passed through and also which is so located that an upper edge and a lower edge of the heat-insulating space is sealed.

Because of this configuration, conduction of heat from the ambient air to the converging lens is prevented because of the presence of heat-insulating material generation of a change in the converging characteristics of the converging lens due to a change in the temperature is suppressed, so that a change in the machining position due to a change in the temperature of the ambient air is prevented, and hence stable laser machining with high precision is executed.

The present invention can provide a laser machining apparatus, in which the heat-insulating unit supports the lenses constituting a converging lens via a heat-insulating member made from a heat-insulating substance.

Because of this configuration, conduction of heat from the ambient air to the converging lens is prevented because of the presence of the heat-insulating member, and generation of a change in the converting characteristics of the converging lens due to a change in the temperature is prevented, so that table laser machining with high precision is executed.

The present invention can provide a laser machining apparatus, in which the heat-insulating unit has a plurality of projections and also has a lens mount member for contacting the tips of the projections to the lenses constituting the converging lens points to points to hold the lenses.

Because of this configuration, because the lenses are supported by means of point contact heat conduction between the lens holder and lens is substantially eliminated, generation of a change in the converging characteristics of the converging lens due to a change in the temperature is suppressed, and heat conduction from ambient air to the lens is suppressed, so that a change in the machining position due to a change in the temperature of the ambient air is prevented, and hence stable laser machining with high precision is executed.

The present invention can provide a laser machining apparatus, in which the heat-insulating unit has a lens mount member having continuous projections and the tips of these continuous projections contact the lenses constituting the converging lens line to line to hold the lenses.

Because of this configuration, because the lenses are supported by means of line contact heat conduction between the lens holders and lenses is substantially eliminated, generation of a change in the converging characteristics of the converging lens due to a change in the temperature is suppressed, and heat conduction from the ambient air to the lens is suppressed, so that a change in the machining position due to a change in the temperature of the ambient air is prevented, and hence stable laser machining with high precision is executed.

The present invention can provide a laser machining apparatus, in which the converging lens comprises a plurality of convex lenses, topmost and bottommost convex lenses thereof are made from a lens material having optical characteristics not depending on temperature, and the other convex lenses located in the intermediate section are made from a lens material having optical characteristics depending on temperature.

Because of this configuration, the topmost and bottommost convex lenses function as heat barriers, and as for the convex lenses located in the intermediate section each made from a material having optical characteristics depending on temperature, heat conduction thereto from the ambient air is prevented, and generation of a change in the converging characteristics of the converging lens due to a change in the temperature is suppressed, and heat conduction from the ambient air to the lens is suppressed, so that a change in the machining position due to a change in the temperature of the ambient air is prevented, and hence stable laser machining with high precision is executed.

The present invention can provide a laser machining apparatus, in which the convex lenses provided in the intermediate section are held by a lens mount member having a projection and contacting the tips of the projection to a lens constituting the converging lens line to line.

Because of this configuration, heat conduction from the lens holder to the convex lenses located in the intermediate section is suppressed, and generation of a change in the converging characteristics of the lens due to a change in the temperature is suppressed, so that a change in the machining position due to a change in the temperature of the ambient air is prevented, and hence stable laser machining with high precision is executed.

The present invention can provide a laser machining apparatus comprising a deflector for changing the direction of a laser beam outputted from a laser oscillator, and a converging lens for refracting the laser beam introduced from the deflector and focusing the laser beam onto a work to be machined, the laser machining apparatus further comprising a temperature measuring unit for detecting the temperature of the converging lens, and a temperature adjusting unit for adjusting the temperature of the ambient air in a section where the converging lens is provided so that temperature of the converging lens detected by the temperature measuring unit is maintained at a specified contact value.

Because of this feature, temperature of the converging lens is maintained at a specified constant value, and generation of a change in the converging characteristics of the lens due to a change in the temperature is suppressed, so that a change in the machining position due to a change in the temperature of the ambient air is prevented, and hence stable laser machining with high precision is executed.

The present invention can provide a laser machining apparatus comprising a deflector for changing the direction of a laser beam outputted from a laser oscillator, and a converging lens for refracting the laser beam introduced from the deflector and focusing the laser beam onto a work to be machined, the laser machining apparatus further comprising a cancel mechanism for canceling a change in the optical characteristics of the converging lens due to a change in the temperature of the converging lens by adjusting an angle of a laser beam introduced into the converging lens.

Because of this configuration, an angle of a laser beam introduced into the converging lens is adjusted by the cancel mechanism, the a change in the optical characteristics of the converging lens due to a change in the temperature of the converging lens is canceled by means of this angle adjustment, so that a change in the machining position or the like due to a change in the temperature of ambient air or generation of heat in the laser machining apparatus itself is not generated, and hence stable laser machining with high precision is executed.

The present invention can provide a laser machining apparatus, in which the cancel mechanism is a deflection amount instruction correcting unit for correcting an instruction value for the amount of deflection by the deflector.

Because of this configuration, an instruction value for the amount of deflection by the deflector is corrected by the deflection amount instruction correcting unit, an angle of a laser beam introduced into the converging lens is adjusted by means of this correction, and a change in the optical characteristics of the converging lens due to a change in the temperature of the converging lens is canceled through this angle adjustment, so that a change in the machining position or the like due to a change in the temperature of the ambient air or generation of heat in the laser machining apparatus itself is not generated, and hence stable laser machining with high precision is executed.

The present invention can provide a laser machining apparatus comprising a temperature measuring unit for detecting the temperature of the converging lens, in which the deflection amount instruction correcting unit corrects an instruction value for the amount of deflection by the deflector based on a correction parameter set according to temperature of the converging lens detected by the temperature measuring unit.

Because of this configuration, the deflection amount instruction correcting unit corrects an instruction value for the amount of deflection by the deflector based on the correction parameter set according to temperature of the converging lens detected by the temperature measuring unit, an angle of a laser beam introduced into the converging lens is adjusted through this correction, and also a change in the optical characteristics of the converging lens due to a change in the temperature of the converging lens is canceled by means of this angle adjustment, so that a change in the machining position or the like due to a change in the temperature of the ambient air or generation of heat in the laser machining apparatus itself is not generated and stable laser machining with high precision is executed.

The present invention can provide a laser machining apparatus, in which the deflection amount instruction correcting unit executes correction of an instruction for the amount of deflection by means of coordinate transformation by obtaining a coordinate transformation function from the machining position error in fixed point machining.

Because of this configuration, an instruction value for the amount of deflection by the deflector is corrected by the deflection amount instruction correcting unit by means of coordinate transformation by obtaining a coordinate transformation function according to a machining position error in fixed point machining, angle of the laser beam introduced into the converging lens is adjusted through this correction, and a change in the optical characteristics of the converging lens due to a change in the temperature of the converging lens is canceled by means of this angle adjustment, so that a change in the machining position or the like due to a change in the temperature of the ambient air or generation of heat in the laser machining apparatus itself is not generated, and hence stable laser machining with high precision is executed.

The present invention can provide a laser machining apparatus, in which the deflection amount instruction correcting unit executes correction of an instruction for the amount of deflection with a correction matrix obtained from a machining position error in fixed point machining.

Because of this configuration, an instruction value for the amount of deflection by the deflector is corrected by the deflection amount instruction correcting unit by means of coordinate transformation by obtaining a correction matrix according to a machining position error in fixed point machining, angle of the laser beam introduced into the converging lens is adjusted through this correction, and a change in the optical characteristics of the converging lens due to a change in the temperature of the converging lens is canceled, so that a change in the machining position or the error due to a change in the temperature of the ambient air or generation of heat in the laser machining apparatus itself is not generated, non-linear positional displacement can completely be corrected, and hence laser machining with high precision can be executed.

The present invention can provide a laser machining apparatus, in which the coordinate trans formation function or correction matrix is updated before start of laser machining each time laser machining is executed.

Because of this configuration, each time laser machining is executed, a coordinate transformation function or a correction matrix is updated before start of laser machining, and a change in the optical characteristics of the converging lens due to a change in the temperature of the converging lens is canceled by correcting an instruction for the amount of deflection by the deflector with an updated coordinate transformation function or a correction matrix, so that a change of a machining position or the error due to a change in the temperature of the ambient air or generation of heat in the laser machining apparatus itself is not generated, and hence laser machining with high precision can be executed.

The present invention can provide a laser machining apparatus comprising a temperature measuring unit for detecting temperature of the converging lens, in which the coordinate transformation function or correction matrix is updated, when a change in the temperature of the converging lens detected by the temperature measuring unit exceeds a specified value, before start of laser machining according to temperature of the converging lens at the point of time.

Because of this configuration, when a change in the temperature of the converging lens detected by the temperature measuring device exceeds a specified value, a coordinate transformation function or a correction matrix is changed, and a change in the optical characteristics of the converging lens due to a change in the temperature of the converting lens is canceled by correcting an instruction for the amount of deflection by the deflector with the updated coordinate transformation function or correction matrix, so that a change in the machining position or the error due to a change in the temperature of the ambient air or generation of heat in the laser machining apparatus itself is not generated, and hence laser machining with high precision can be executed.

The present invention can provide a laser machining apparatus, in which the coordinate transformation function of correction matrix is updated at prespecified timing.

Because of this configuration, a coordinate transformation function or a correction matrix is updated at a specified timing, and a change in the optical characteristics of the converging lens due to a change in the temperature of the converging lens is canceled by correcting an instruction for the amount of deflection by the deflector with the updated coordinate transformation function or correction matrix, so that a change in the machining position or the error due to a change in the temperature of the ambient air or generation of heat in the laser machining apparatus itself is not generated, and hence laser machining with high precision can be executed.

The present invention can provide a laser machining apparatus, in which the coordinate transformation function or correction matrix is updated each time a specified period of time has passed.

Because of this configuration, each time a specified period of time has passed, periodically a coordinate transformation function or a correction matrix is updated, and a change in the optical characteristics of the converging lens due to a change in the temperature of the converging lens is canceled by correcting an instruction for the amount of deflection by the deflector with the updated coordinate transformation function or correction matrix, so that a change in the machining position or the error due to a change in the temperature of the ambient air or generation of heat in the laser machining apparatus itself is not generated, and hence laser machining with high precision can be executed.

The present invention can provide a laser machining apparatus comprising a temperature measuring unit for detecting the temperature of the converging lens by previously obtaining a correction matrix for temperature of each converging lens, in which a correction matrix corresponding to the temperature of the converging lens detected by the temperature measuring unit is used.

Because of this configuration, a change in the optical characteristics of the converging lens due to a change in the temperature of the converging lens by correcting an instruction for the amount of deflection by the deflector with a correction matrix based on a previously obtained temperature of each converging lens and without requiring execution of the processing for updating the correction matrix each time laser machining is executed, so that a change in the machining position or the error due to a change in the temperature of the ambient air or generation of heat in the laser machining apparatus itself is not generated, and hence laser machining with high precision can be executed.

The present invention can provide a laser machining apparatus, in which the cancel mechanism includes a variable gain setting unit for variably setting a gain of an instruction value for the amount of deflection by the deflector according to temperature of the converging lens detected by the temperature measuring unit.

Because of this configuration, an instruction for the amount of deflection is executed by means of gain adjustment for a deflection instruction value with the variable gain setting unit, and a change in the optical characteristics of the converging lens due to a change in the temperature of the converging lens is canceled through this, correction, so that a change in the machining position or the error due to a change a in the temperature of the ambient air or generation of heat in the laser machining apparatus itself is not generated, and hence laser machining with high precision can be executed.

The present invention can provide a laser machining apparatus, in which the cancel mechanism includes a bend mirror for adjusting an angle of a laser beam introduced into the deflector.

Because of this configuration, an angle of a laser beam introduced into the deflector is adjusted by the bend mirror, and a change in the optical characteristics of the converging lens due to a change in the temperature of the converging lens is canceled through this adjustment, so that a change in the machining position or the error due to a change in the temperature of the ambient air or generation of heat in the laser machining apparatus itself is not generated, and hence laser machining with high precision can be executed.

The present invention can provide a laser machining apparatus comprising a deflector for changing a direction of a laser beam outputted from a laser oscillator, and a converging lens for refracting a laser beam introduced from the deflector and focusing the laser beam onto a work to be machined, the laser machining apparatus further comprising a temperature measuring unit for detecting the temperature of the converging lens, and a machining table driving instruction correcting unit for correcting a positional instruction for a work to be machined under the converging lens according to temperature of the converging lens detected by the temperature measuring unit and also for canceling fluctuation of the optical characteristics of the converging lens due to fluctuation in temperature of the converging lens.

Because of this configuration, the machining table driving instruction correcting unit corrects an instruction for the position of the work to be machined according to temperature of the converging lens, and a change of a machining position due to a change in the optical characteristics of the converging lens due to a change in the temperature of the converging lens is canceled through this positional correction, so that a change in the machining position or the error due to a change in the temperature of the ambient air or generation of heat in the laser machining apparatus itself is not generated, and hence laser machining with high precision can be executed.

The present invention can provide a laser machining apparatus comprising a deflector for changing a direction of a laser beam outputted from a laser oscillator, and a converging lens for refracting a laser beam introduced from the deflector and focusing the laser beam onto a work to be machined, the laser machining apparatus further comprising a temperature measuring unit for detecting the temperature of the converging lens, and a variable wavelength laser oscillator for variably setting a wavelength of an outputted laser beam according to the temperature of the converging lens detected by the temperature measuring unit so that a change in the optical characteristics of the converging lens due to a change in the temperature of the converging lens is canceled.

Because of this configuration, a wavelength of a laser beam can be set so that positional displacement caused by a change in the optical characteristics of the converging lens due to a change in the temperature of the converging lens is canceled, so that stable and high precision laser machining can be executed without being affected by a change in the temperature of the converging lens.

The present invention can provide a laser machining apparatus comprising a deflector for changing the direction of a laser beam outputted from a laser oscillator, and a converging lens for refracting the laser beam introduced from the deflector and focusing the laser beam onto a work to be machined, the laser machining apparatus further comprising a temperature measuring unit for detecting the temperature of the converging lens, and a cancel mechanism for adjusting a distance between the converging lens and the deflector according to the temperature of the converging lens detected by the temperature measuring unit to cancel a change in the optical characteristics of the converging lens due to a change in the temperature of the converging lens.

Because of this configuration, a distance between the converging lens and deflector is adjusted by the cancel mechanism according to the temperature of the converging lens, and a change in the optical characteristics of the converging lens due to a change in the temperature of the converging lens is canceled through this adjustment, so that a change in the machining position due to change in the temperature of the ambient air or generation of heat in the laser machining apparatus itself is prevented, and hence laser machining with high precision is executed.

The present invention can provide a laser machining apparatus comprising a deflector for changing the direction of a laser beam outputted from a laser oscillator, and a converging lens for refracting the laser beam introduced from the deflector and focusing the laser beam onto a work to be machined, the laser machining apparatus further comprising a temperature measuring unit for detecting the temperature of the converging lens, and an adaptive optics for adjusting a divergence angle of a laser beam according to the temperature of the converging lens detected by the temperature measuring unit so that a change in the focal length of the converging lens due to a change in the temperature of the converging lens is canceled.

Because of this configuration, a divergence angle of the laser beam is adjusted by the adaptive optics according to the temperature of the converging lens, and a position of a focal point can be maintained on the surface of the work through this adjustment, so that stable and high precision laser machining can be executed even if temperature of the converging lens changes.

The present invention can provide a laser machining apparatus comprising a deflector for changing the direction of a laser beam outputted from a laser oscillator, and a converging lens for refracting the laser beam introduced from the deflector and focusing the laser beam onto a work to be machined, the laser machining apparatus further comprising a temperature measuring unit for detecting the temperature of the converging lens, and a collimate lens position adjusting mechanism for adjusting a position of a collimate lens according to the temperature of the converging lens detected by the temperature measuring, unit so that a change in the focal length of the converging lens due to a change in the temperature of the converging lens is canceled.

Because of this configuration, a position of the collimate lens is adjusted by the collimate lens position adjusting mechanism, and a position of a focal point can be maintained on the surface of the work by adjusting a divergence angle of the laser beam according to a change in the focal length due to a change in the temperature of the converging lens through this adjustment, so that stable and high precision laser machining can be executed even if temperature of the converging lens changes.

The present invention can provide a laser machining apparatus comprising a deflector for changing the direction of a laser beam outputted from a laser oscillator, and a converging lens for refracting the laser beam introduced from the deflector and focusing the laser beam onto a work to be machined, the laser machining apparatus further comprising a temperature measuring unit for detecting the temperature of the converging lens, and a machining table height adjusting mechanism for adjusting the distance between the converging lens and the work to be machined so that a change in the focal length of the converging lens due to a change in temperature of the converging lens.

Because of this configuration, a distance between the converging lens and a work to be machined is adjusted by the machining table height adjusting mechanism, and a position of a focal point can be maintained on the surface of the work through this adjustment, so that stable and high precision laser machining can be executed even if temperature of the converging lens changes.

BRIEF DESCRIPTION OF THE DRAWINGS

FIG. 30 is an explanatory view showing a sequence for obtaining a correction matrix in Embodiment 15 of the laser machining apparatus according to the present invention;

FIG. 32 is an explanatory view showing a temperature correction table in Embodiment 15 of the laser machining apparatus according to the present invention;

BEST MODE FOR CARRYING OUT THE INVENTION

Figure 1:
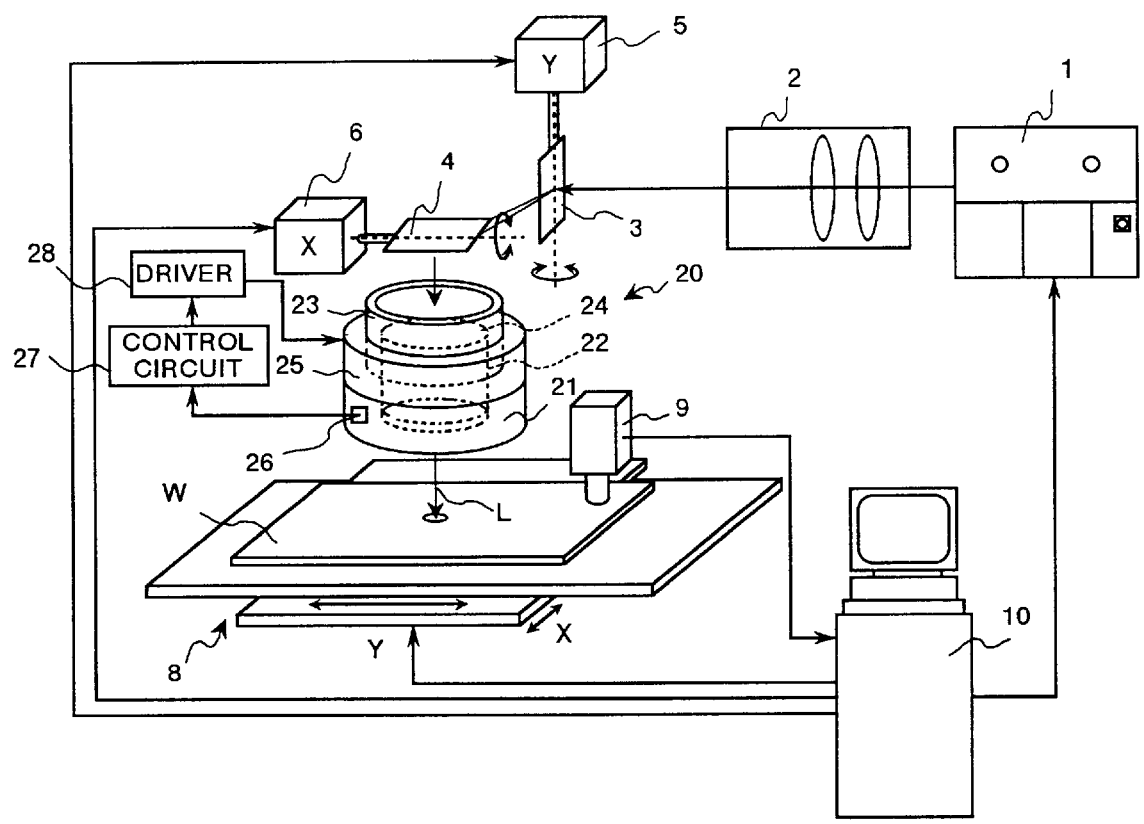
FIG. 1 is a general block diagram showing Embodiment 1 of a laser machining apparatus according to the present invention.

Description is made hereinafter for preferred embodiments of the present invention with reference to the attached drawings. It should be noted that, in embodiments of the present invention described below, the same reference numerals are assigned to the same or equivalent components as those in the example of the conventional technology described above and description thereof is omitted herein.

FIG. 1 shows Embodiment 1 of the laser machining apparatus according to the present invention.

The laser machining apparatus according to Embodiment 1 has a lens position adjusting unit for changing a relative position of a plurality lenses constituting a conversing lens according to temperature of the converging lens so that a change in the reflective index of the lenses constituting the converging lens due to a change in the temperature is canceled.

In FIG. 1, a converging lens is indicated by the reference numeral 20. The converging lens 20 is a fθ lens, and the converging lens receives a laser beam L deflected by the Y-axial galvanomirror 3 and the X-axial galvanomirror 4 like in the conventional technology and focuses the laser beam.

The laser machining apparatus according to this embodiment basically compensates the displacement of a focal point of the converging lens due to a change in the temperature of the converging lens 20 by means of automatic focusing.

Accordingly, the converging lens 20 has a cylindrical lens holder (mirror cylinder) 21 located at a fixed position, a fixed lens 22 fixed to the lens holder 21, a cylindrical movable holder 23 provided such that it can move in the direction of the optic axis of the lens holder 21 (in the vertical direction in the figure), a movable lens 24 fixed to the movable lens holder 23, and a lens driving unit (actuator) 25 as a power drive unit for driving the movable lens holder 23 in the direction of the optic axis.

In this converging lens 20, the movable lens holder 23 is displaced by the lens driving unit 25 in the direction of the optic axis, so that an optical position of the movable lens 24 in the direction of the optic axis can be changed. With this operation, a focal length f of the converging lens changes. Namely, focusing is executed according to a change in the position of the movable lens 24 in the direction of the optic axis.

Buried in the lens holder is a temperature sensor 26, and the temperature sensor 26 detects temperature of the converging lens 20, especially temperature of a main body of the lens, and generates a signal according to the temperature of the lens. The lens temperature signal generated by the temperature sensor 26 is inputted into a control circuit 27.

The control circuit 27 compares a previously set temperature (standard temperature) $T_0$ to the temperature of the converging lens 20 detected by the temperature sensor 26, and gives an instruction signal to a driver 28 of the lens driving unit 25 to displace the movable lens 24 so that a displacement $\Delta f$ in the focal length f of the converging lens 20 generated according to the temperature difference is canceled.

With this operation, the movable lens 24 moves in a direction of the optic axis according to a change in the temperature, and even if the fixed lens or the movable lens 24 is made from a material for which the reflective index is dependent on the temperature the focal length of the converging lens 20 is maintained at a constant value irrespectively of a change in the temperature. This means temperature compensation for focusing of the converging lens 20.

Because of this feature, even if temperature of the converging lens 20 changes due to a change in the temperature of the ambient air or generation of heat in the laser machining apparatus itself, displacement of a machining position due to the displacement of the focal length does not occur, and fine machining with high precision is executed even when the laser machining apparatus is continuously operated for a long time.

Figure 2:
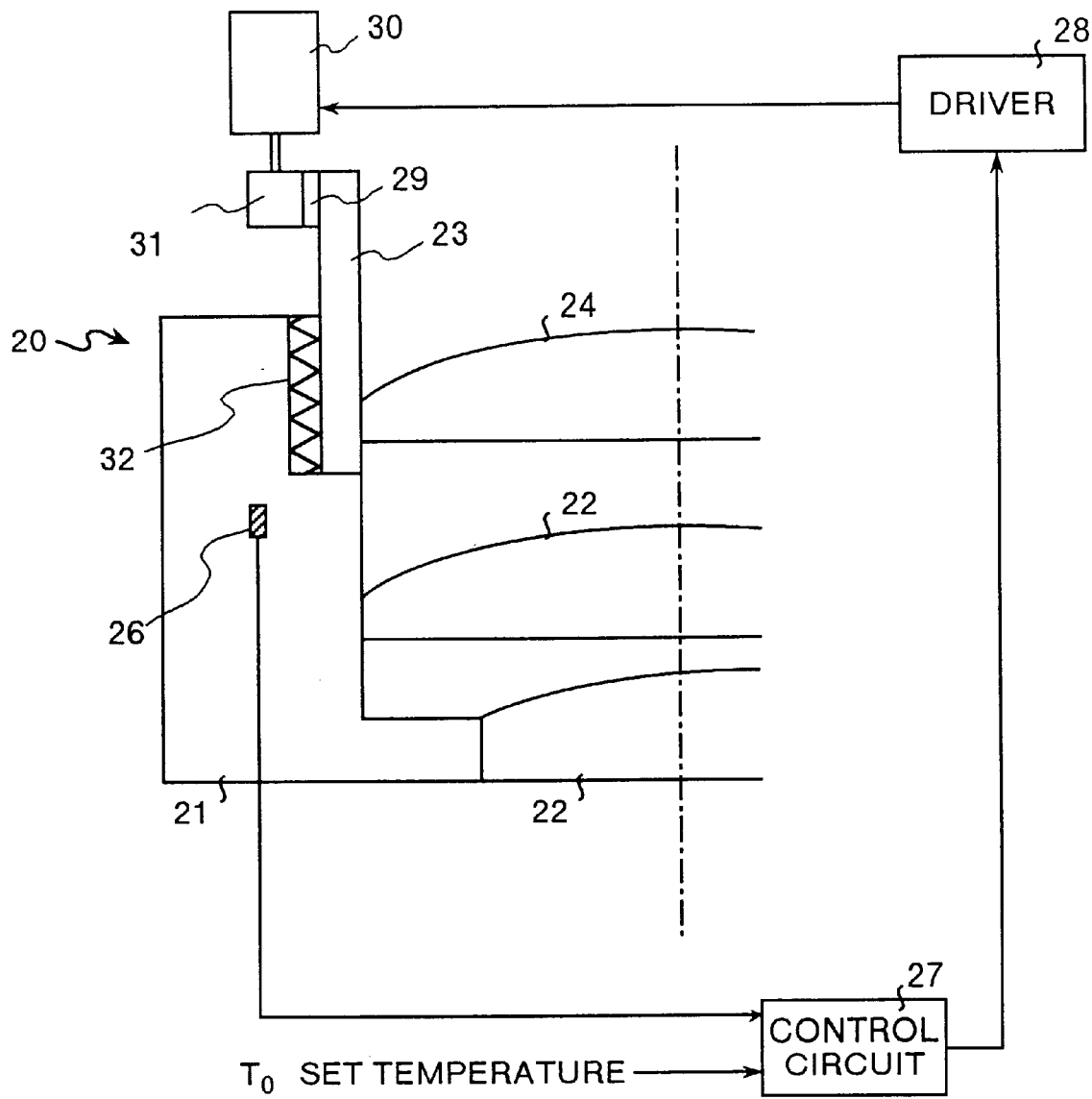
FIG. 2 is a block diagram showing a converging lens section in Embodiment 1 of the laser machining apparatus according to the present invention.

FIG. 2 shows a particular example of the lens driving unit 25. The movable lens holder 23 engages with the lens holder 21 via a helicoid (feed screw) 32, and reciprocally moves in the direction of the optic axis according to rotation around the center line. A gear 29 is engraved on an outer peripheral section of the movable lens holder 23, and a driving gear 31 of the driving motor 30 engages with this gear 29.

With this configuration, when the driving motor 30 is driven by the driver 28, the movable lens holder 23 rotates, and this rotational movement is converted to a linear movement by the helicoid 32 at a high precision, so that the movable lens holder 23 moves in a direction of the optic axis.

Thus, the focal length f of the converging lens 20 is maintained at a constant value irrespective of a temperature change.

Figure 3:
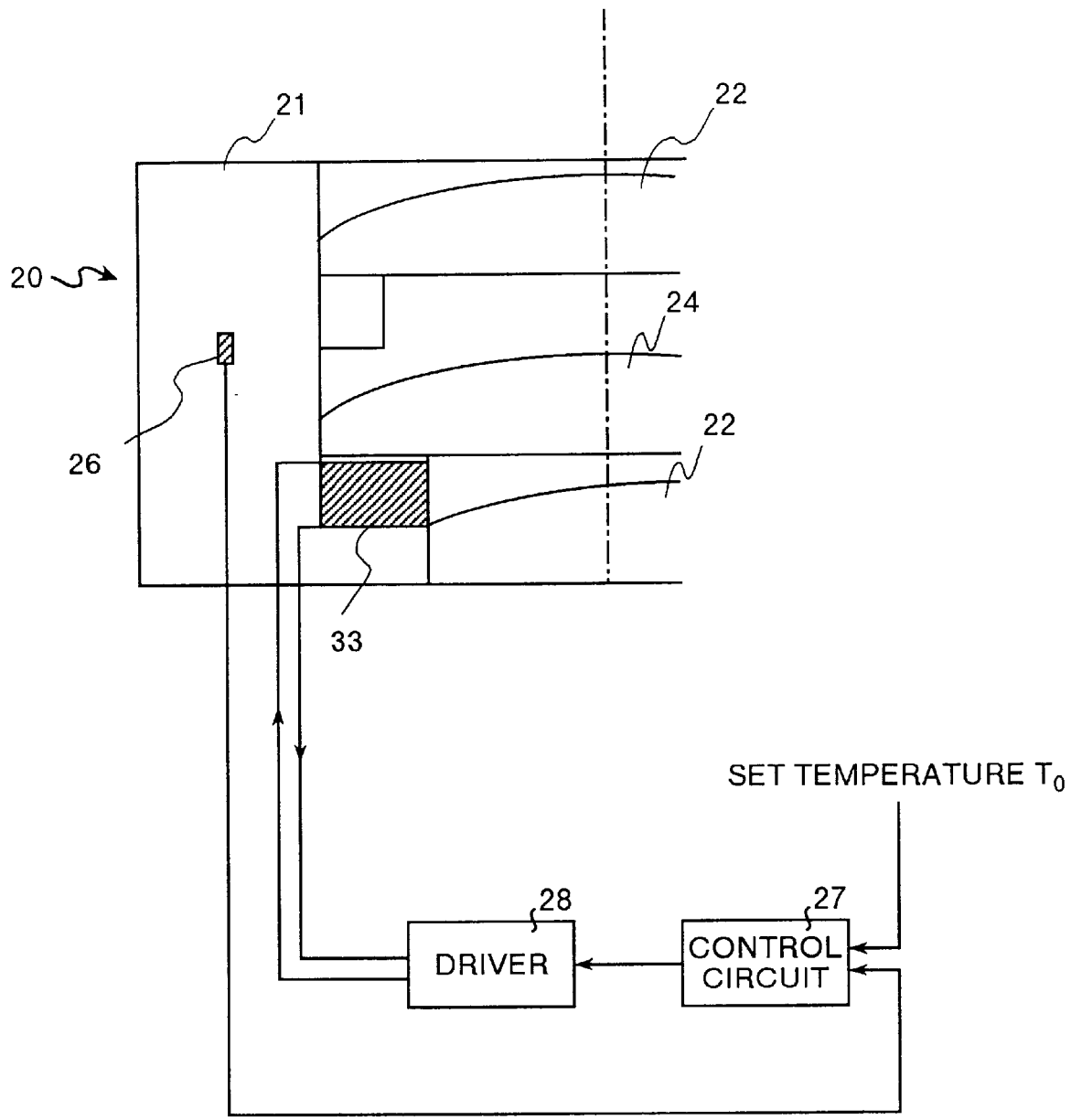
FIG. 3 is a block diagram showing the converging lens section in Embodiment 2 of the laser machining apparatus according to the present invention.

FIG. 3 shows Embodiment 2 of the laser machining apparatus according to the present invention.

The laser machining apparatus according to this embodiment basically compensates the displacement of the focal point of the converging lens 20 because of a change in the temperature of the converging lens 20 by means of automatic focusing, and the movable lens 24 is held by a piezoelectric element 33 such as a piezoelectric element on the lens holder 21, and the movable lens 24 directly moves in a direction of the optic axis according to the electric distortion effect by the piezoelectric element 33.

The control circuit 27 compares a previously set temperature $T_0$ to the temperature of the converging lens 20 detected by the temperature sensor 26, and gives an instruction signal to the driver 28 for the piezoelectric element 33 so that a displacement $\Delta f$ in focal length f of the converging lens 20 generated by the temperature difference is canceled by displacement of the movable lens 24.

With this operation, the movable lens 24 moves in the direction of the optic axis according to the temperature change, and focal length f of the converging lens 20 is maintained at a constant value irrespective of a change in the temperature, so that, even if temperature of the converging lens 20 changes due to a change in the temperature of the ambient air or generation of heat in the laser machining apparatus itself, displacement in the machining position due to the displacement of the focal length does not occur, and fine machining with high precision can be executed even when the laser machining apparatus is continuously operated for a long time.

In this embodiment, the piezoelectric element 33 is used as a source of driving force for moving the movable lens 24, therefore has simple structure, and enables fine adjustment of a lens position.

Figure 4:
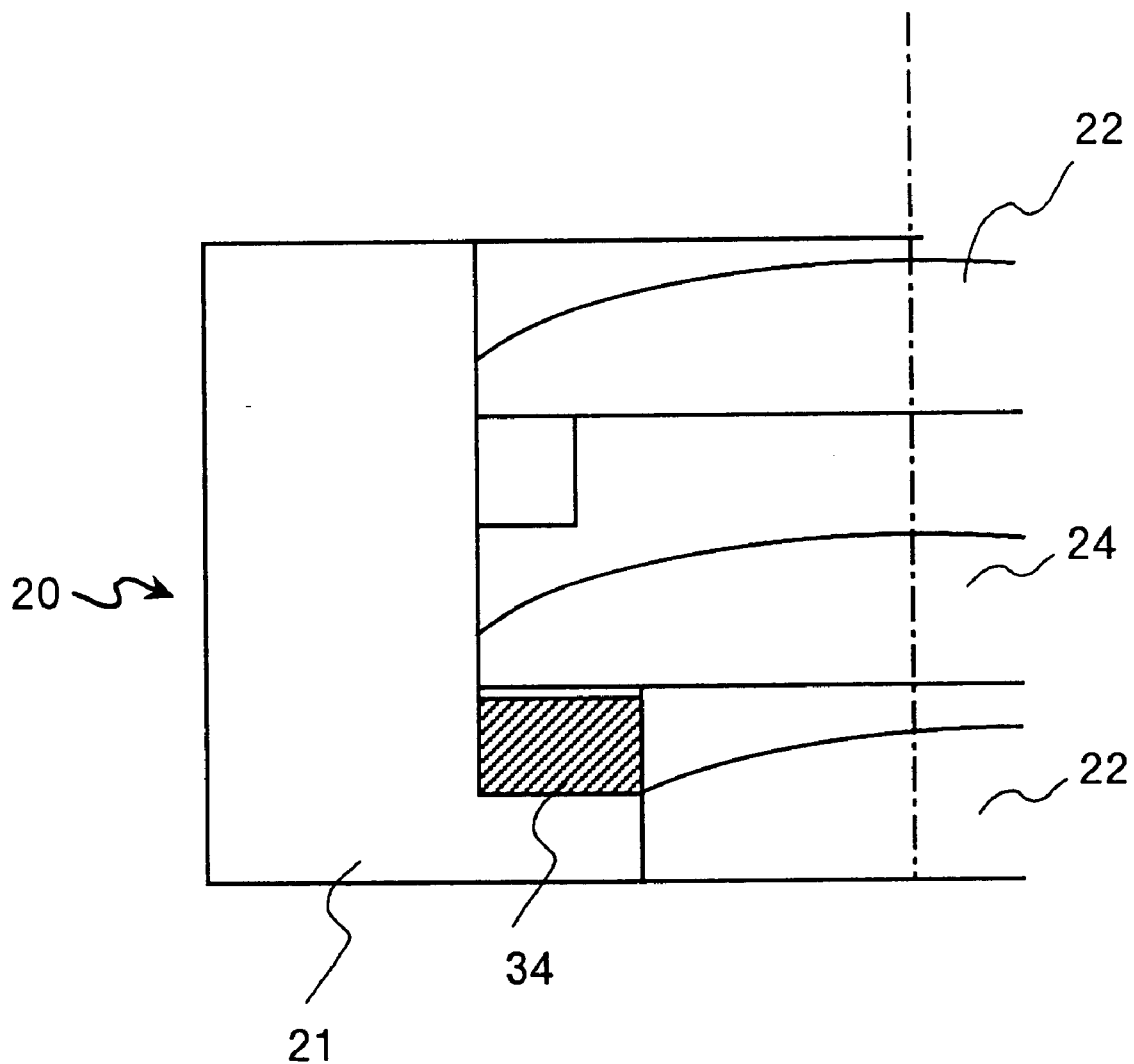
FIG. 4 is a block diagram showing the converging lens section in Embodiment 3 of the present invention according to the present invention.

FIG. 4 shows Embodiment 3 of the laser machining apparatus according to the present invention.

The laser machine apparatus according to this embodiment basically compensates the displacement of the focal point of the converging lens 20 because of a change in temperature of the converging lens 20 by means of automatic focusing, the movable lens 24 is held by a holding member 34 which expands or contracts according to the temperature of the lens holder, and the movable lens 24 is directly displaced in the direction of the optic axis.

The holding member 34 which expands or contracts according to the temperature is made from a material showing a negative value against the temperature characteristics (rate of change of the focal length f according to temperature) such as, for instance, calcite ($CaCO_3$), and displaces the movable lens 24 in the direction of the optic axis by means of expansion or contraction thereof according to a change in the temperature.

With this feature, the movable lens 24 moves in the direction of the optic axis according to a change in the temperature and the focal length f of the converging lens 20 is maintained at a constant value irrespective of a change in the temperature, and displacement of a machining position due to displacement of the focal length does not occur even if temperature of the converging lens 20 changes due to a change in the temperature of the ambient air or generation of heat in the laser machining apparatus itself, so that fine machining with high precision can be executed even when the laser machining apparatus is continuously operated for a long time.

Further, the need for providing a control circuit is eliminated only by the employment of the holding member 34 which expands or contracts according to temperature, and temperature compensation for a converging lens can be executed with very simple structure.

Figure 5:
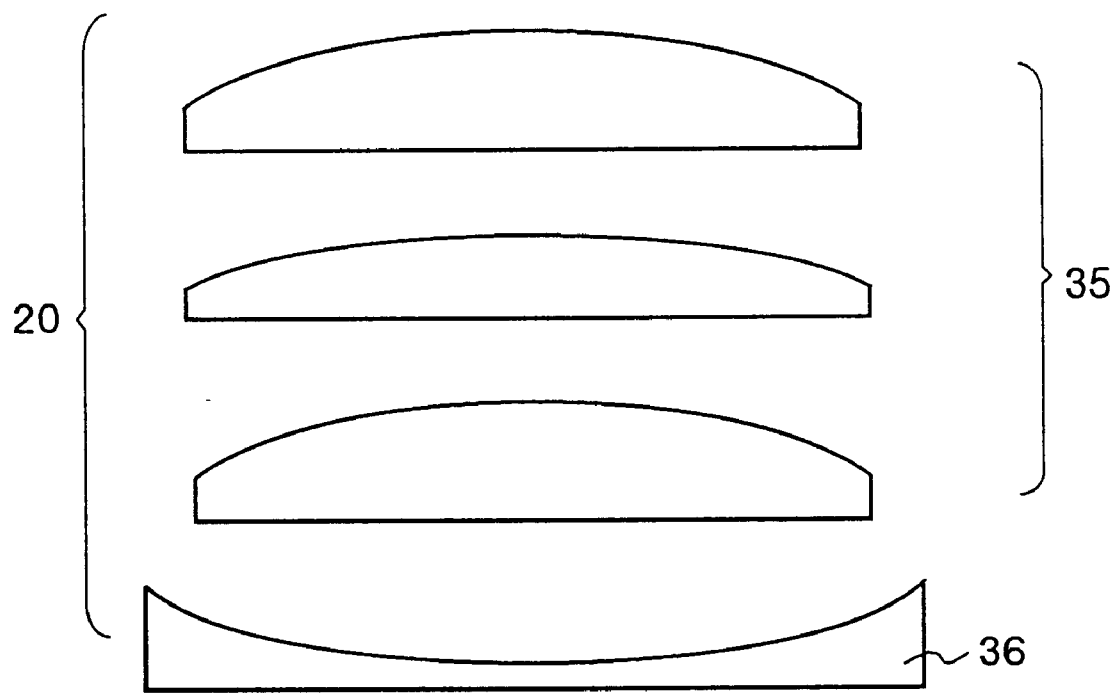
FIG. 5 is a block diagram showing the converging lens section in Embodiment 4 of the laser machining apparatus according to the present invention.

FIG. 5 shows Embodiment 4 of the laser machining apparatus according to the present invention.

The laser machining apparatus according to the present embodiment basically compensates the displacement of the focal point of the converging lens 20 due to a change in the temperature of the converging lens 20 by means of a combination of lenses.

The converging lens 20 has a concave lens 36 for temperature compensation incorporated therein in addition to a group of convex lenses 35 for converging each of which is made from a optical crystalline material of zinc selenite (a group of lenses originally required for the converging lens).

The concave lens 36 is made from germanium with a change rate of reflective index thereof according to the temperature being several times larger as compared to that of the optical crystalline material of zinc selenite, and functions to cancel a change in the reflective index according to a change in the temperature of the convex lens group 35.

Because of this feature, with appropriate lens configuration, other special control circuit is not required and focal length f of the converging lens 20 is maintained at a constant value irrespective of a change in the temperature, and even if temperature of the converging lens 20 changes due to a change in the temperature of the ambient air or generation of heat in the laser machining apparatus itself, displacement of a machining position due to displacement of a focal point does not occur, so that fine machining with high precision is executed even when the laser machining apparatus is continuously operated for a long time.

Figure 6:
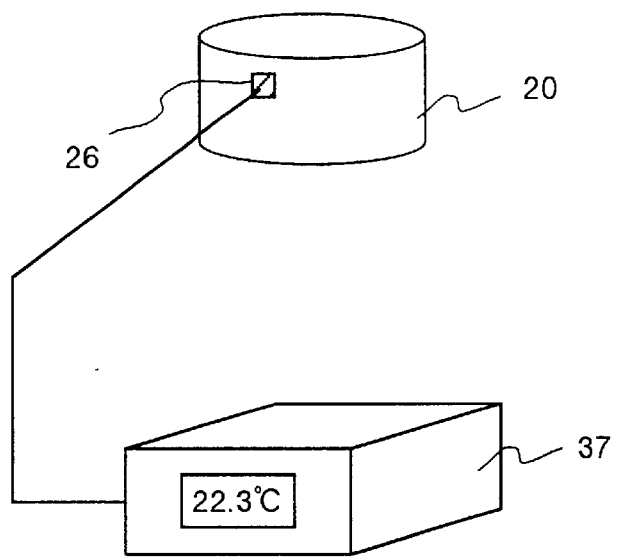
FIG. 6 is a perspective view showing a key section in Embodiment 5 of the laser machining apparatus according to the present invention.

FIG. 6 shows Embodiment 5 of the laser machining apparatus according to the present invention.

The laser machining apparatus according to this embodiment includes a temperature managing unit for the converging lens 20, and a temperature sensor 26 provided in the converging lens 20 is connected to a temperature display unit 37. The temperature display unit 37 digitally displays the temperature of the converging lens 20 detected by the temperature sensor or 26 with centigrade.

The temperature display unit 37 may be provided at any position on the condition that the operator can easily check its display, and with this temperature display unit 37, the operator can easily recognize a change in temperature of the converging lens 20 due to a change in the temperature of the ambient air or generation of heat in the laser machining apparatus itself. Because of this feature, when temperature of the converging lens 20 changes, the operator can stop the operation of the laser machining apparatus to prevent generation of machining faults.

Figure 7:
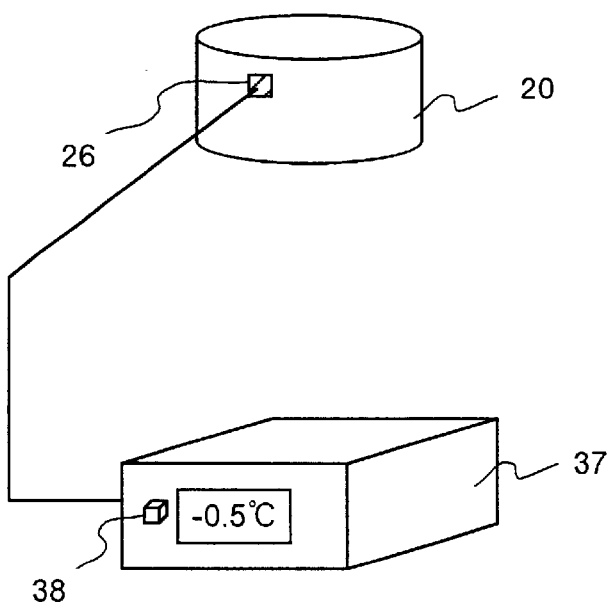

A shown in FIG. 7, a reset button 38 may be provided in the temperature display unit 37 and the temperature display unit 37 is made to display a temperature change at a point of time when the reset button 38 is pressed.

Because of this feature, the operator is not required to always remember appropriate temperature of the converging lens 20 and can operate the laser machining apparatus only by paying attention to the temperature difference displayed on the temperature display unit 37, and also the operator can know generation of a change in the temperature of the converging lens 20 before generation of machining fault due to displacement of a machining position or the like when the converging lens 20 changes in passage of time, and a change of parameters of the converging lens can be canceled by again measuring the optical characteristics of the converging lens 20, which is useful for preventing generation of faulty machining products.

Figure 8:
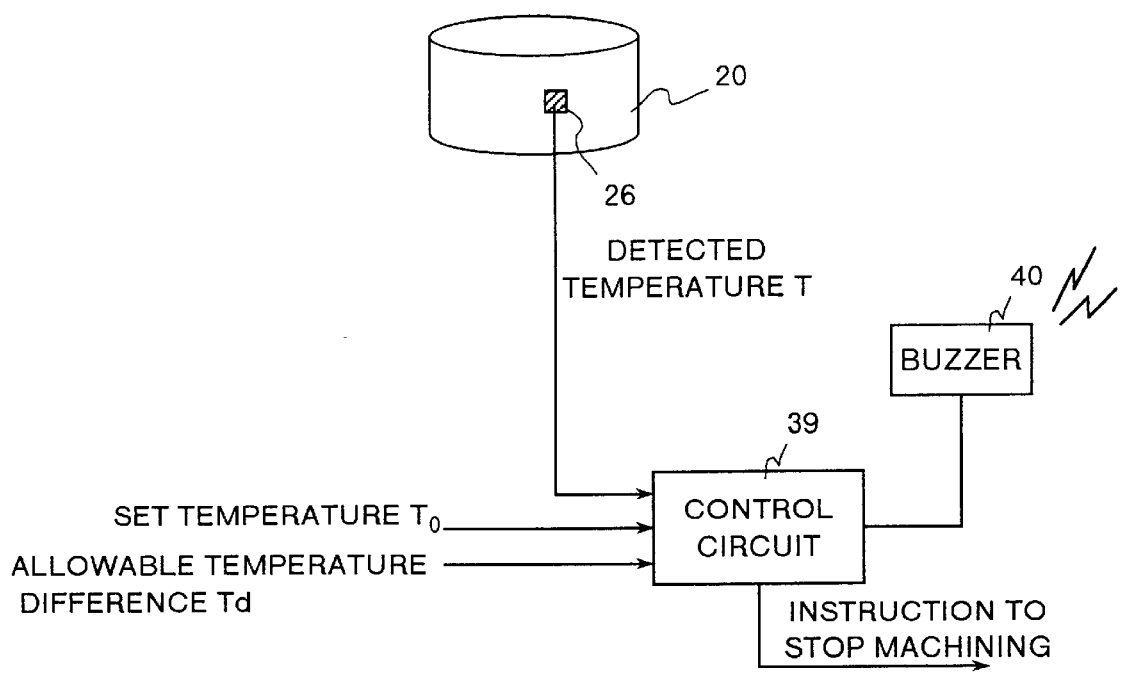
FIG. 8 is a block diagram showing a key section in Embodiment 6 of the laser machining apparatus according to the present invention.

FIG. 8 shows Embodiment 6 of the laser machining apparatus according to the present invention.

The laser machining apparatus according to this embodiment includes a temperature managing unit for the converging lens 20, and a temperature sensor 26 provided in the converging lens 20 is connected to a control circuit 39 for alarm control. A buzzer 40 is connected to the control circuit 39.

The control circuit 39 stores therein set temperature $T_0$ and an allowable temperature difference Td set as parameters, compares detected temperature T of the converging lens 20 detected by the temperature sensor 26 to the set temperature $T_0$, and when the difference exceeds the allowable temperature difference Td, the control circuit 39 outputs a machining stop instruction to the control unit 10 of the laser machining apparatus (Refer to FIG. 1) and sounds the buzzer 40.

Figure 9:
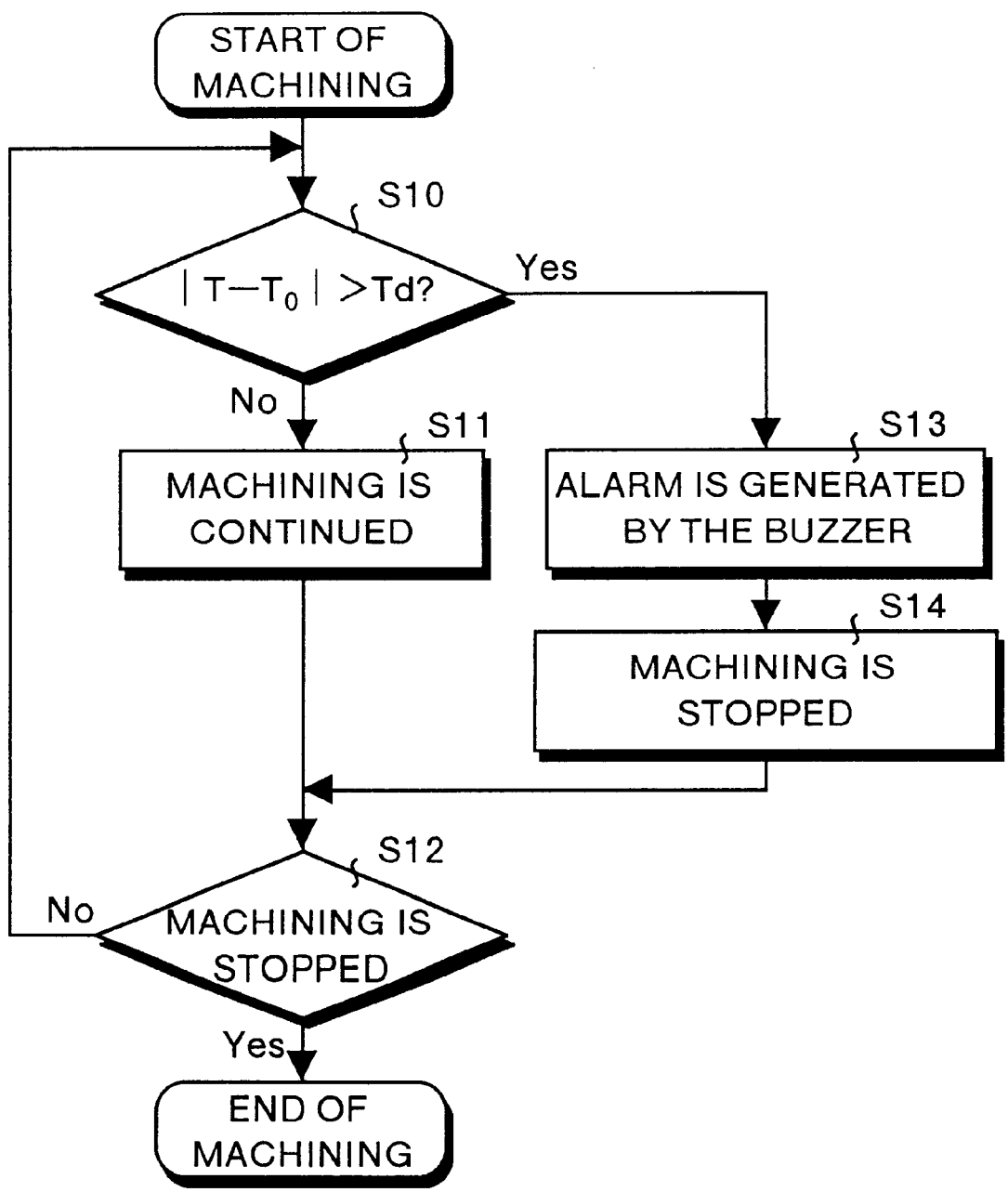
FIG. 9 is a flow chart showing an operational flow in Embodiment 6 of the laser machining apparatus according to the present invention.

FIG. 9 shows a processing flow for alarm control. At first, it is determined whether an absolute value of the difference of (detected temperature T)−(set temperature $T_0$) is greater than the allowable temperature difference Td or not (step S10). When the absolute value of (detected temperature T)−(set temperature $T_0$) is not greater than the allowable temperature different Td (step S10 negative), machining is continued (step S11), and the determination for temperature described above is repeated until machining is completed (step S12).

In contrast, when the absolute value of (detected temperature T)−(set temperature $T_0$) is greater than the allowable temperature difference Td (step S10 affirmative), the buzzer 40 is sounded for generating an alarm (step S13), and a machining stop instruction is outputted to the control unit 10 to compulsorily stop the machining (step S14).

With this feature, an operator can accurately know that temperature of the converging lens 20 has deviated from the allowable temperature, and also as machining is compulsorily stopped in this step, generation of machining fault is prevented.

Figure 10:
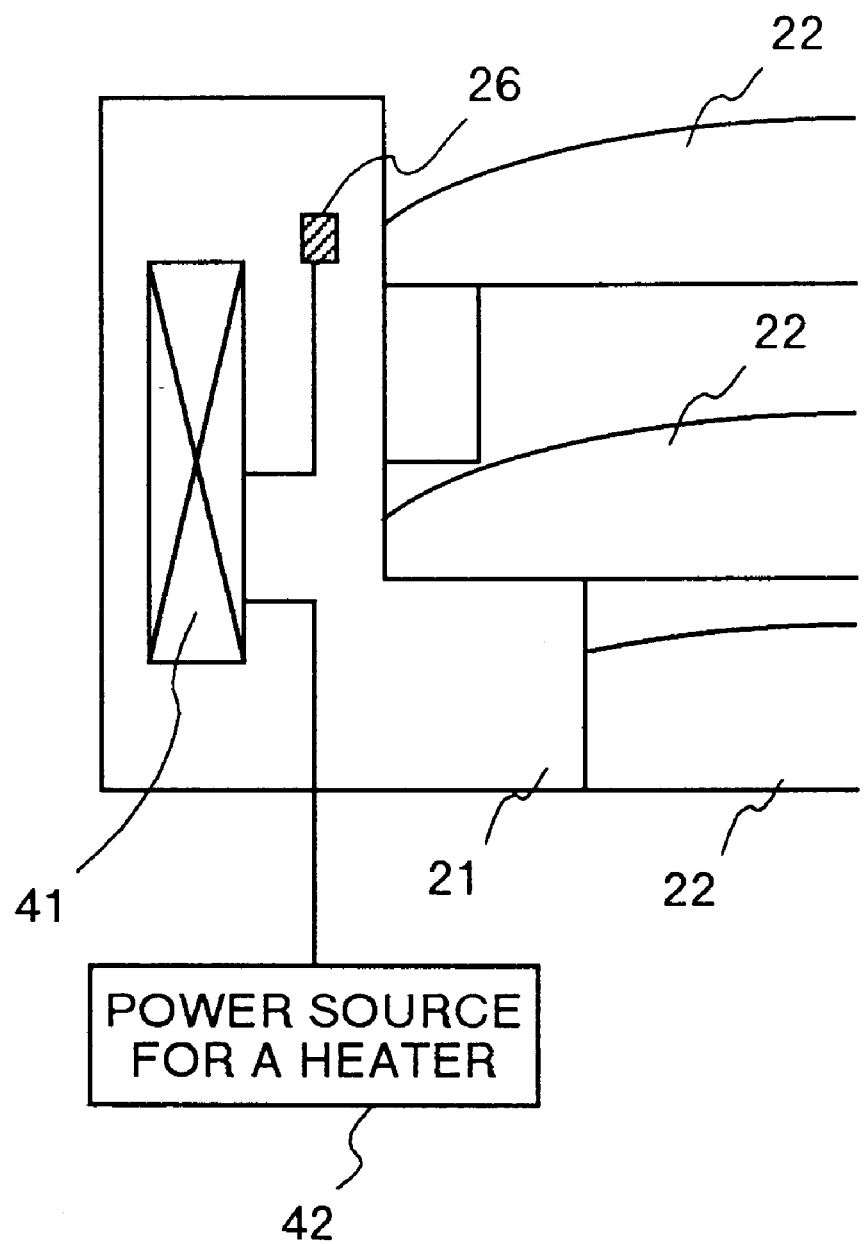
FIG. 10 is a block diagram showing the converging lens section in Embodiment 7 of the laser machining apparatus according to the present invention.
Figure 11:
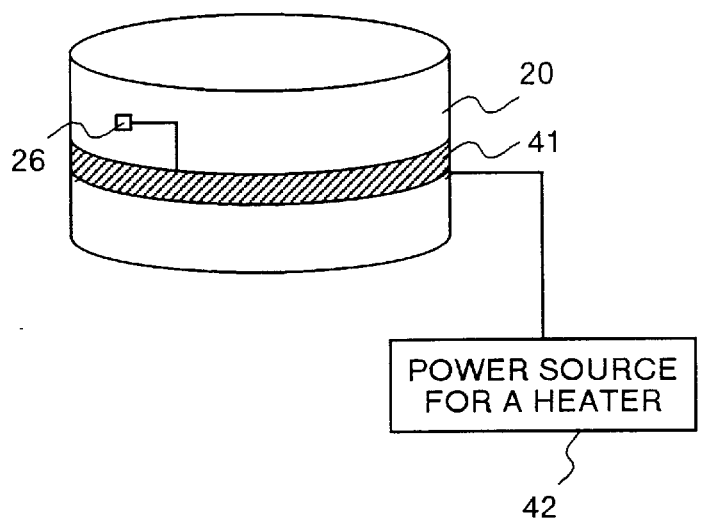
FIG. 11 is a block diagram showing a key section in Embodiment 7 of the laser machining apparatus according to the present invention.

FIG. 10 and FIG. 11 each show Embodiment 7 of the laser machining apparatus according to the present invention.

The laser machining apparatus according to this embodiment maintains temperature of the converging lens 20 at a constant value to prevent a displacement of the focal point because of a change in the temperature, and has a heater 41 and a temperature sensor 26 incorporated in the converging lens 20. Electric power is supplied to the heater 41 from a power source 42 for the heater, and the heater 41 heats the converging lens so that the temperature of the lens detected by the temperature sensor 26 is maintained at a constant value.

With this feature, temperature of the converging lens 20 is maintained at a constant value irrespective of a change in the temperature of the ambient air or generation of heat in the laser machining apparatus itself and generation of displacement of a machining position due to displacement of focal length is prevented, so that fine machining with high precision is executed even when the laser machining apparatus is continuously operated for a long time.

Figure 12:
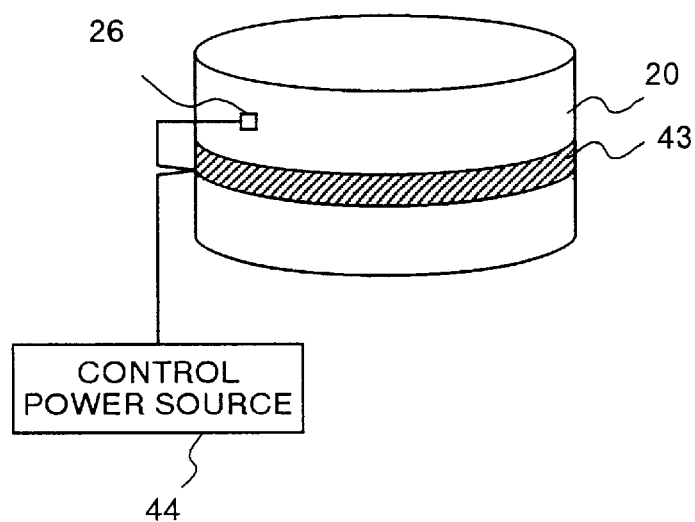
FIG. 12 is a block diagram showing a key section in Embodiment 8 of the laser machining apparatus according to the present invention.

FIG. 12 shows Embodiment 8 of the laser machining apparatus according to the present invention.

The laser machining apparatus according to this embodiment maintains temperature of the converging lens 20 at a constant value to prevent displacement of a focal point because of a change in the temperature, and a Peltier element 43 is provided in place of the heater 41 as a temperature control member in the converging lens 20.

Power supply to the Peltier element 43 is controlled by a power 44, and the Peltier element 43 heats or cools the converging lens 20 according to a direction of power supply, and adjusts temperature of the converging lens 20 so that temperature of the lens detected by the temperature sensor 26 is maintained at a constant value.

Because of this feature, temperature of the converging lens 20 is maintained at a constant value irrespective of a change in the temperature of the ambient air or generation of heat in the laser machining apparatus itself and generation of displacement of a machining position due to displacement of focal length is prevented, so that fine machining with high precision is executed even when the laser machining apparatus is continuously operated for a long time.

Figure 13:
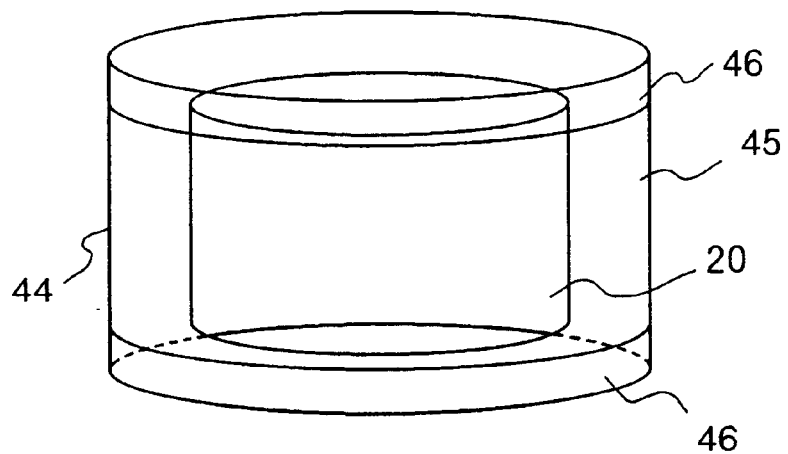
FIG. 13 is a perspective view showing the converging lens section in Embodiment 9 of the laser machining apparatus according to the present invention.
Figure 14:
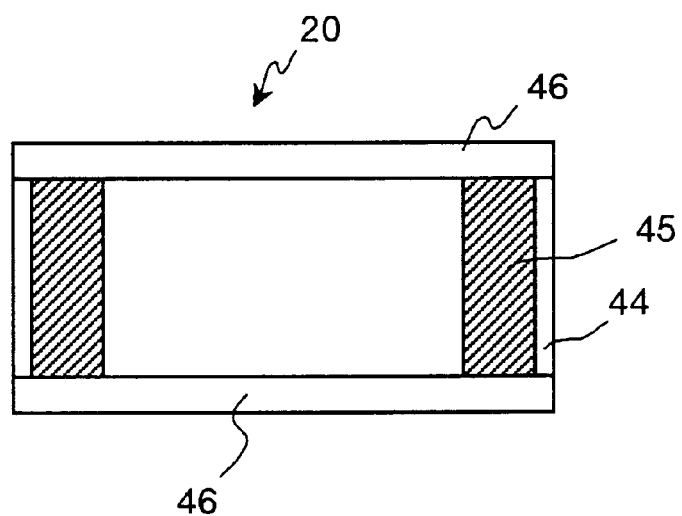
FIG. 14 is a cross-sectional view showing the converging lens section in Embodiment 9 of the laser machining apparatus according to the present invention.

FIG. 13 and FIG. 14 each show Embodiment 9 of the laser machining apparatus according to the present invention.

In the laser machining apparatus according to this embodiment, the converging lens 20 is diabatically packaged to maintain the temperature of the converging lens 20 at a constant temperature and also to prevent displacement of a focal point because of a temperature change. The diabetic packaging is made by concentrically providing an external cylindrical body 44 made from such a material as metal and provided around the converging lens 20 and filling the diabetic space defined between the converging lens 20 and the external cylindrical body 44 with a heat-insulating material 45 such as glass wool.

Window shield plates 46 are attached to the upper and lower edge sections of the external cylindrical section 44 to shield the upper and the lower edges of the diabetic space. The window shield plate 46 is made from such a material as zinc selenite, and a laser beam can pass therethrough.

With this feature, the converging lens 20 is diabatically separated from the outside, and a change in the temperature of the converging lens 20 is suppressed irrespective of a change in the temperature of the ambient air or the like, and also displacement of a machining position due to displacement of a focal length is prevented, so that fine machining with high precision is executed.

Figure 15:
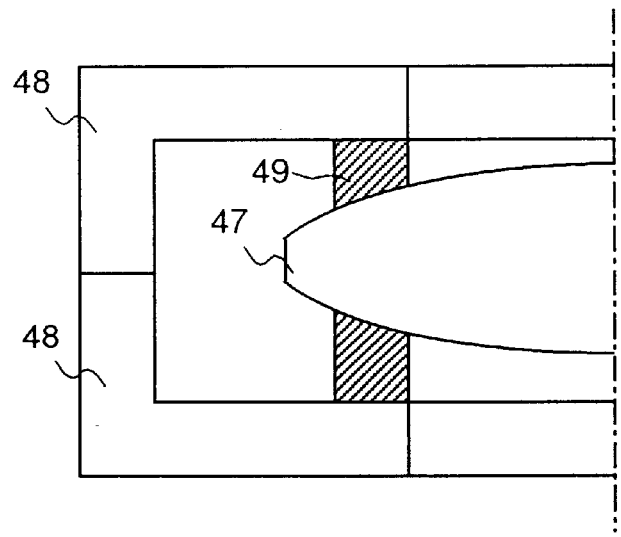
FIG. 15 is a cross-sectional view showing the converging lens section in Embodiment 10 of the laser machining apparatus according to the present invention.

FIG. 15 shows Embodiment 10 of the laser machining apparatus according to the present invention.

In the laser machining apparatus according to this embodiment, to maintain the temperature of the converging lens 20 and also to prevent displacement of a focal point due to a temperature change, a ring shaped heat-insulating member 49 made from a heat-insulating material with the thermal conduction expansion ratio of around 0.036 Kcal/mhdeg such as polystyrene foam or vinyl chloride is provided between a lens 47 constituting the converging lens and the lens mount ring 48.

With this feature, conduction of heat from the lens mount ring 48 to the lens 47 can be prevented, and the converging lens can be protected against influence of heat from the outside.

Because of this feature, a change in the temperature of the converging lens can be suppressed irrespective of a change in the temperature of the ambient air and generation of displacement of a machining position due to displacement of a focal length is prevented, so that fine machining with high precision is executed.

Figure 16:
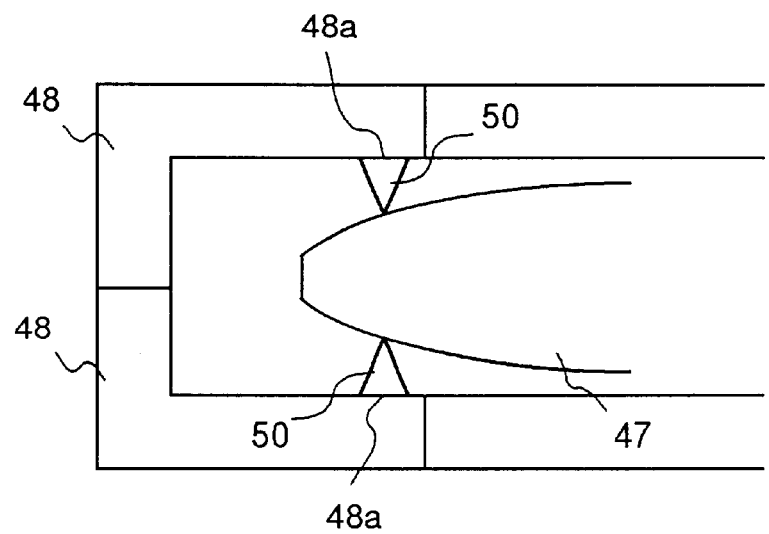
FIG. 16 is a cross-sectional view showing the converging lens section in Embodiment 11 of the laser machining apparatus according to the present invention.
Figure 17:
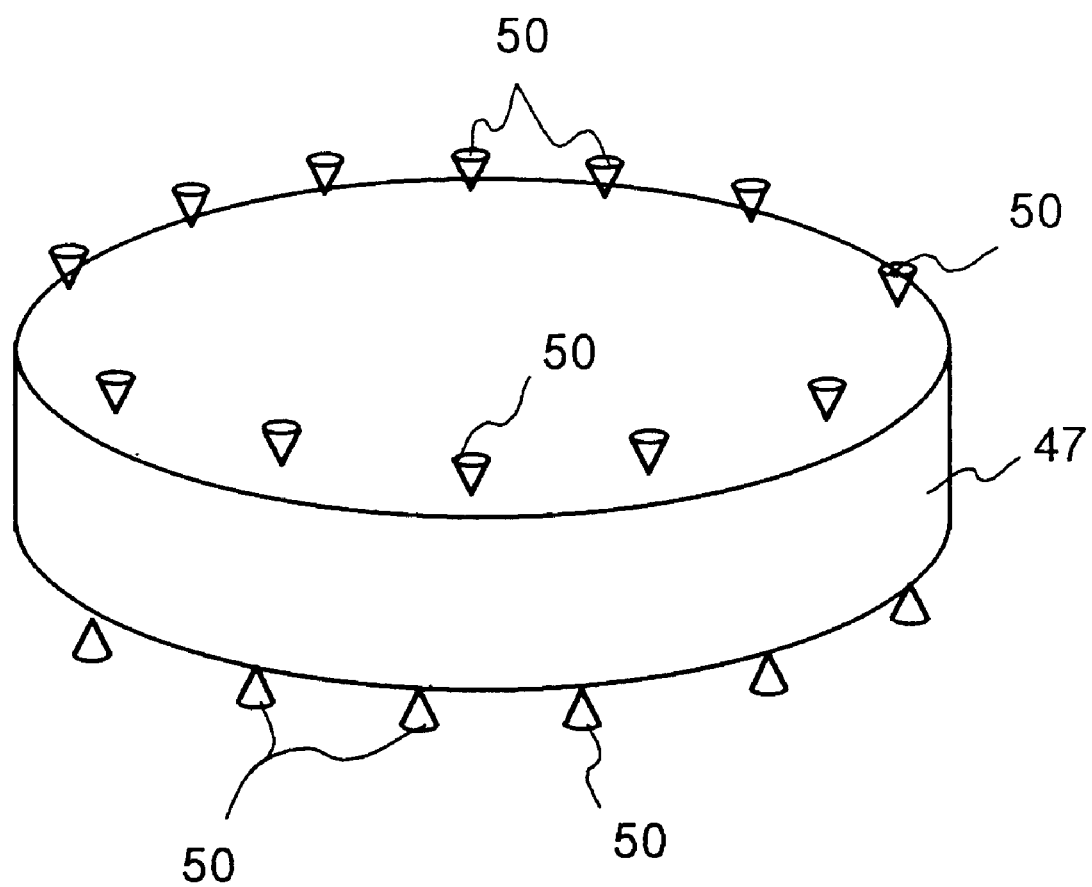
FIG. 17 is a perspective view showing the converging lens section in Embodiment 11 of the laser machining apparatus according to the present invention.

FIG. 16 and FIG. 17 show Embodiment 11 of the laser machining apparatus according to the present invention.

In the laser machining apparatus according to the present invention, to maintain the temperature of the converging lens 20 at a constant value and also to prevent displacement of a focal point due to a change in the temperature, a plurality of needle shaped projections 50 are provided at a fixed distance on a ring shaped lens holding surface 48a which support the lens 47 constituting the converging lens at many points.

With this configuration, a contact area between the lens 47 and lens mount ring 48 is minimized and the amount of heat conducted from the lens mount ring 48 to the lens 47 is reduced, so that the converging lens can be protected from influence of heat from the outside.

Because of this feature, a change in the parameters of the converging lens due to a change in the temperature is suppressed irrespective of a change in the temperature of the ambient air and generation of displacement of a machining position due to displacement of focal length is prevented, so that fine machining with high precision is executed.

Figure 18:
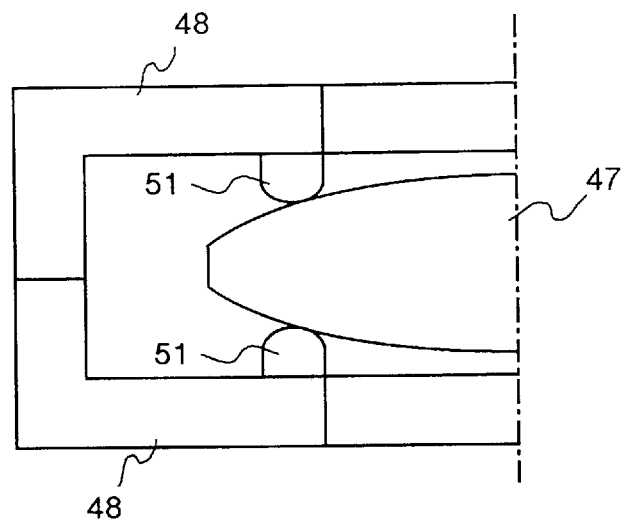
FIG. 18 is a cross-sectional view showing the converging lens section in variant of Embodiment 11 of the laser machining apparatus according to the present invention.

FIG. 18 shows a variant of Embodiment 11. In the embodiment shown in FIG. 18, a plurality of semi-spherical projections 51 are provided in place of the needle shaped projections 50 on the ring shaped lens holding surface 48a of the lens mount ring 48, and the lens 47 constituting the converging lens are supported by the semi-spherical projections 51 at many points.

Also in this case, a contact area between the lens 47 and lens mount ring 48 is minimized and the amount of heat conducted from the lens mount ring 48 to the lens 47 is reduced, so that the converging lens can be protected from influence of heat from the outside.

Figure 19:
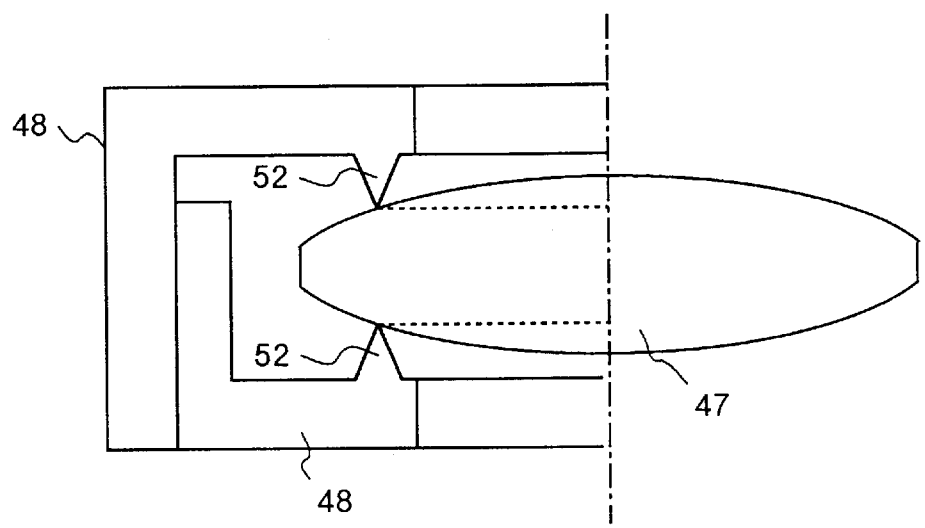
FIG. 19 is a cross-sectional view showing the converging lens section in Embodiment 12 of the laser machining apparatus according to the present invention.

FIG. 19 shows Embodiment 12 of the laser machining apparatus according to the present invention.

In the laser machining apparatus according to this embodiment, to maintain the temperature of the converging lens 20 at a constant value and also to prevent displacement of a focal point because of change in the temperature, a continuous projection 52 is formed along the periphery of the ring shaped lens holding surface 48a of the lens mount ring 48, and the lens 47 constituting the converging lens is supported by the continuous projection 52 by means of a line contact.

Because of this configuration, a contact area between the lens 47 and the lens mount ring 48 is minimized and the amount of heat conducted from the lens mount ring 48 to the lens 47 reduced, so that the converging lens can be protected from influence of heat from the outside.

Because of this feature, irrespective of a change in the temperature of the ambient air, a change in the temperature of the converging lens is suppressed and generation of displacement of a machining position due to displacement of a focal length is prevented, so that fine machining with high precision can be executed.

Figure 20:
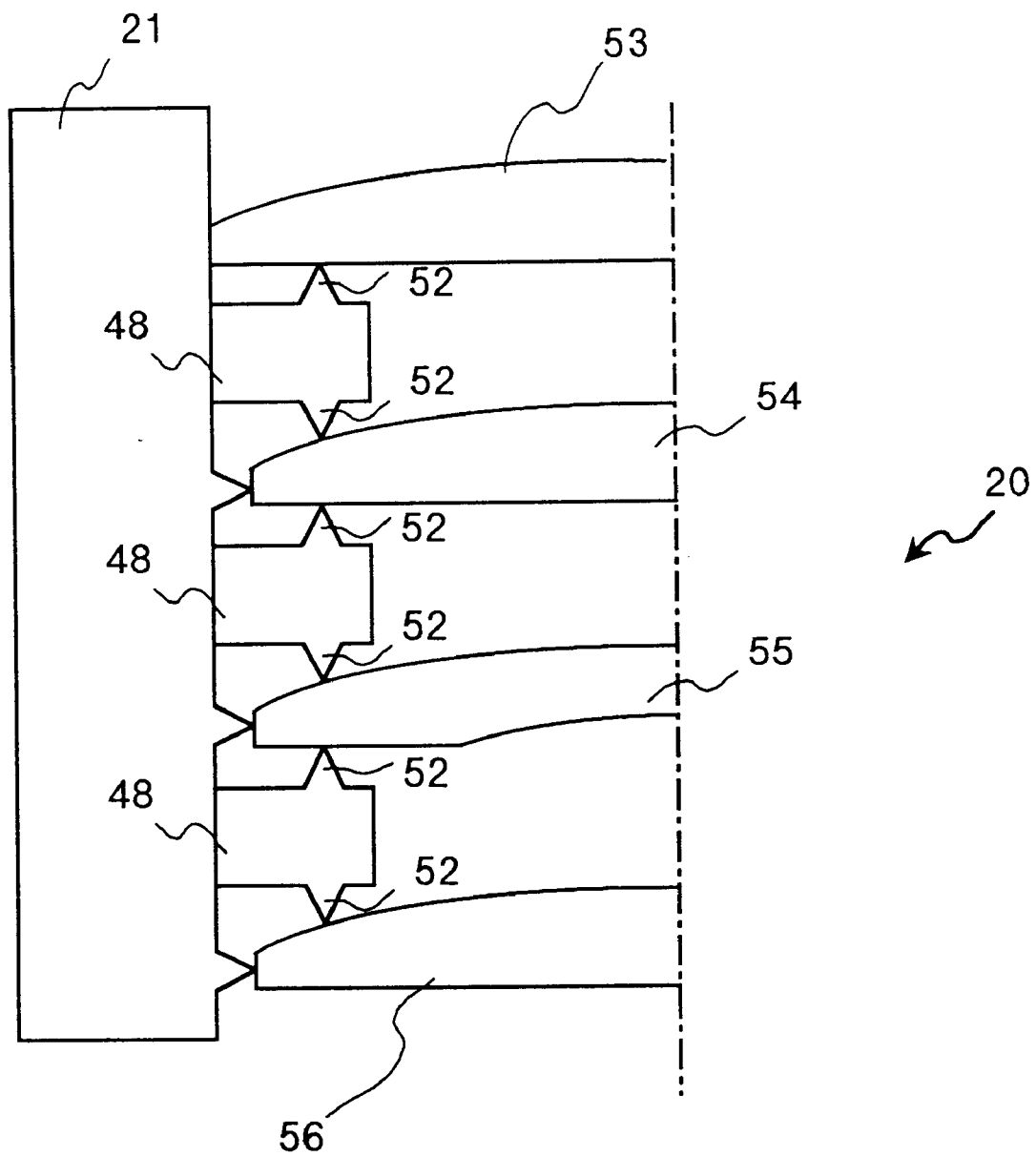
FIG. 20 is a cross sectional view showing the converging lens section in Embodiment 13 of the laser machining apparatus according to the present invention.

FIG. 20 shows Embodiment 13 of the laser machining apparatus according to the present invention.

In the laser machining apparatus according to present invention, in order to prevent the displacement of a focal point because of a change in the temperature of the converging lens 20, the converging lens 20 comprises four convex lenses 53, 54, 55 and 56. Of these lenses, the topmost and bottommost convex lenses 53 and 56 are made from a lens material having the optical characteristics that are hardly affected by the temperature (with low dependency on temperature) such an optical crystalline material as zinc selenite (ZnSe), while the convex lenses 54, 55 located in the intermediate section are made from a lens material such as an optical crystalline material having the optical characteristics that are easily affected by the temperature but also has high capability for converging a laser beam like germanium (Ge) as in the conventional technology.

The convex lenses 54, 55 located in the intermediate section are supported, in a similar way as in Embodiment 11, by the projections formed on the ring shaped lens holding surface 48a of the lens mount ring 48 by means of line contact.

The topmost and bottommost lens 53 and 56 which may be easily affected by the temperature of the ambient air because of their direct contact with the ambient air whose temperature changes easily are made from a lens material having optical characteristics that are hardly affected by the temperature, while the lens holder 21 easily affected by a change in temperature of ambient air and the convex lenses 54, 55 located in the intermediate section made from a material having optical properties highly depending on the temperature come in contact by a continuous projection 52 by means of a line contact and also are thermally insulated, so that the converging lens 20 is hardly affected by influence by a change in temperature of ambient air can be obtained.

Because of this feature, the topmost and bottommost convex lenses 53, 56 each having the optical characteristics with low dependency on temperature function as heat barriers, and a change in the optical characteristics of the converging lens 20 can be suppressed irrespective of a change in the temperature of the ambient air and generation of a machining position due to displacement of a focal distance is prevented, so that fine machining with high precision can be executed.

Figure 21:
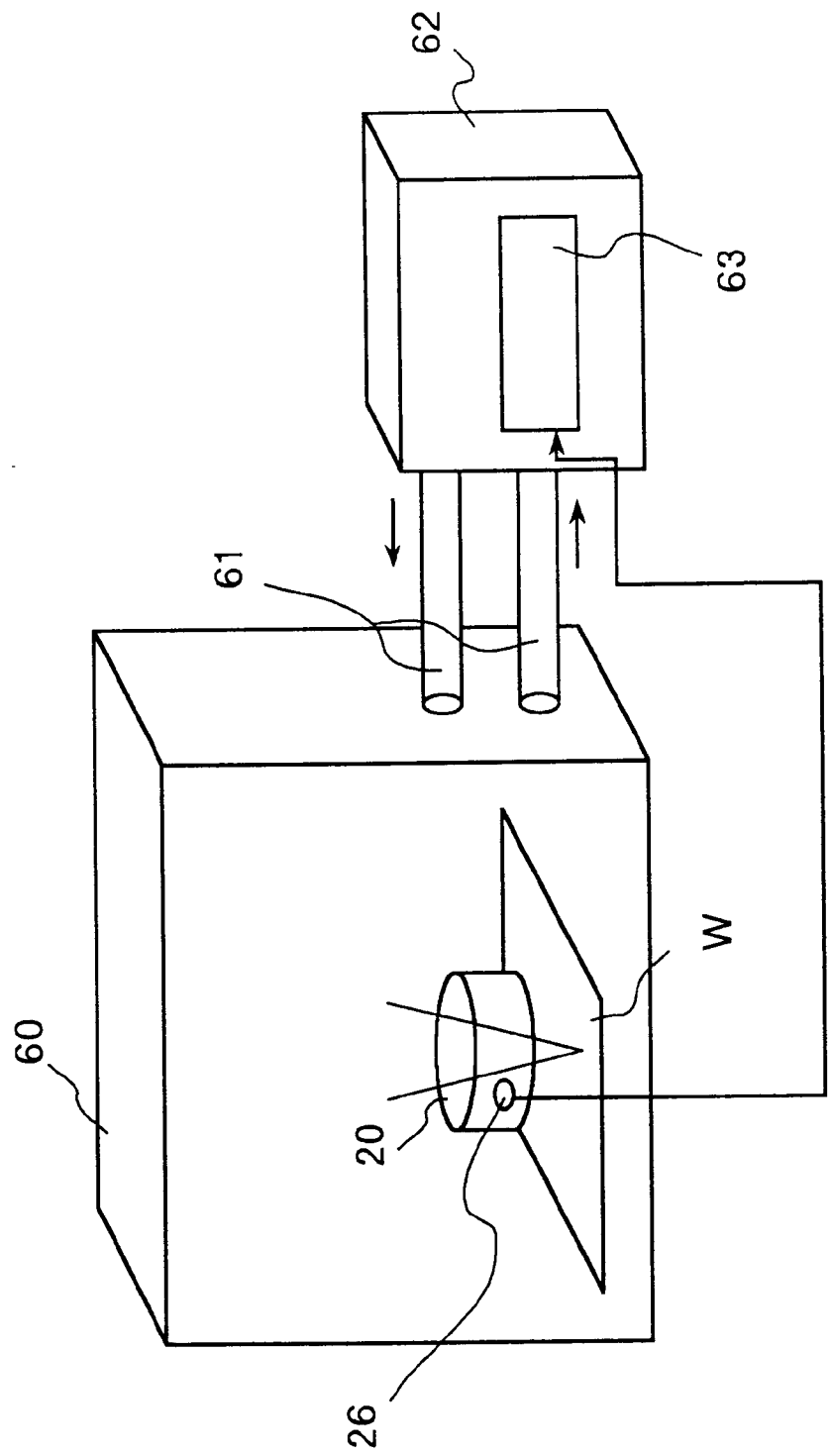
FIG. 21 is a block diagram showing Embodiment 14 of the laser machining apparatus according to the present invention.

FIG. 21 shows Embodiment 14 of the laser machining apparatus according to the present invention.

In the laser machining apparatus according to this embodiment, in order to maintain the temperature of the converging lens 20 at a constant value and also to prevent the displacement of a focal point because of a change in the temperature, the converging lens 20 and the other related components of the laser machining apparatus are accommodated in a machining chamber 60. The machining chamber 60 is connected via a circulation duct 61 to a temperature adjusting device 62 such as a ventilator.

The temperature sensor 26 for detecting the temperature of the converging lens 20 is attached to the converging lens 20, and a temperature signal outputted from the temperature sensor 26 is inputted into a temperature setting section 63 of the temperature adjusting device 62, and the temperature adjusting device 62 adjusts the temperature of air supplied to the machining chamber 60 so that temperature of the converging lens 20 detected by the temperature sensor 26 is maintained at a temperature set by a temperature setting section 63. With this feature, temperature of the converging lens 20 is maintained at a temperature set by the temperature setting section 63, and displacement of a machining position due to the displacement of a focal point does not occur irrespective of a change in the temperature of the ambient air or generation of heat in the laser machining apparatus itself, so that fine machining with high precision can be executed even when the laser machining apparatus is continuously operated for a long time.

Figure 22:
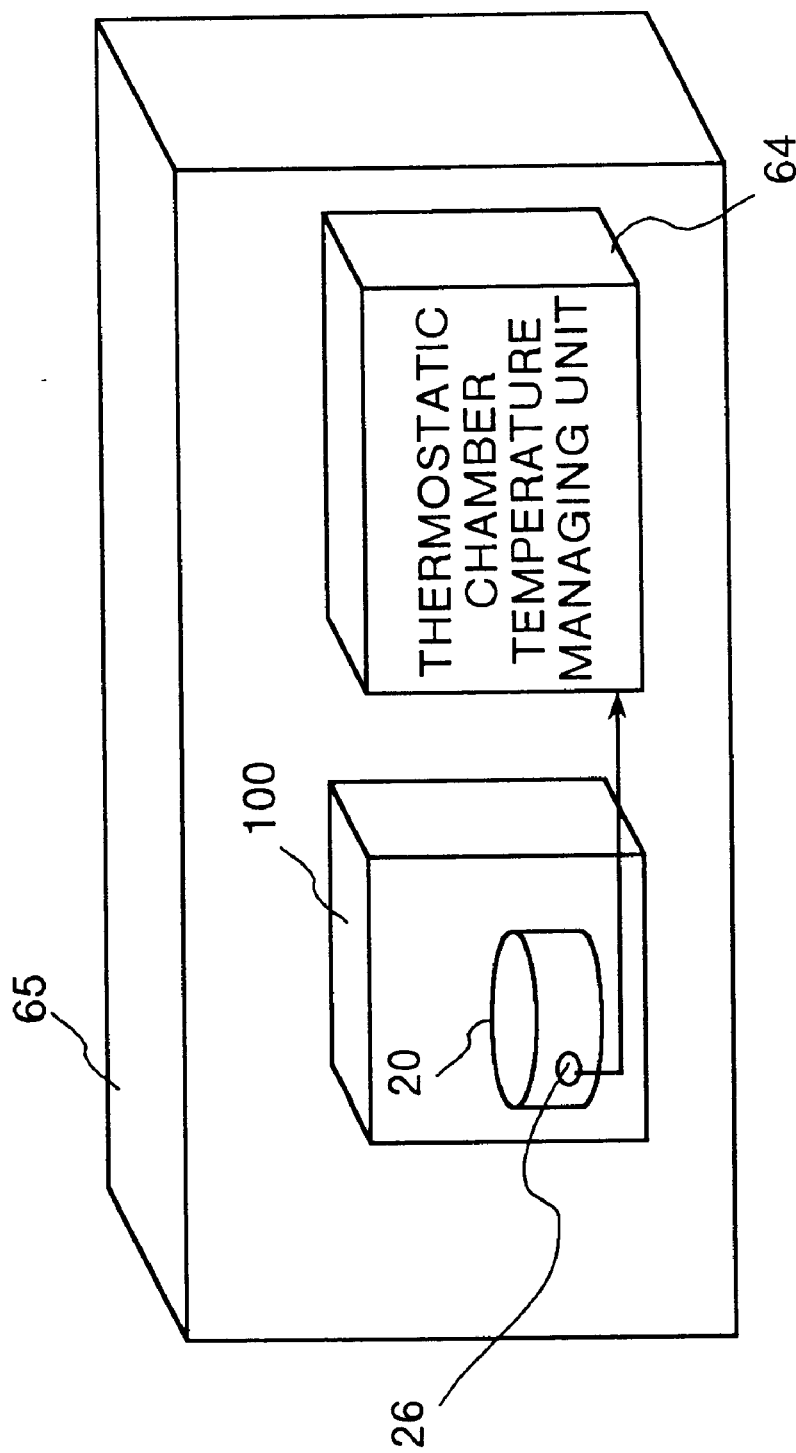
FIG. 22 is a cross-sectional view showing a variant of Embodiment 14 of the laser machining apparatus according to the present invention.

FIG. 22 shows a variant of Embodiment 14. In this embodiment, the entire laser machining apparatus 100 is accommodated in a thermostatic chamber 65 including a thermostatic chamber temperature managing device 64.

The laser machining apparatus 100 can output a signal for detected the temperature of the converging lens 20 with the temperature sensor 26 attached to the converging lens 20, and the signal is inputted into the thermostatic chamber temperature managing device 64, and the thermostatic chamber temperature managing device 64 controls the temperature of the thermostatic chamber 65 so that the temperature of the converging lens 20 is maintained at a specified contact value.

Because of this feature, also in this case, temperature of the converging lens 20 is maintained at a specified constant value, and displacement of a machining position due to the displacement of a focal length does not occur irrespective of change in the temperature of the ambient air or generation of heat in the laser machining apparatus itself, so that fine machining with high precision is executed even when the laser machining apparatus is continuously operated for a long time.

Figure 23:
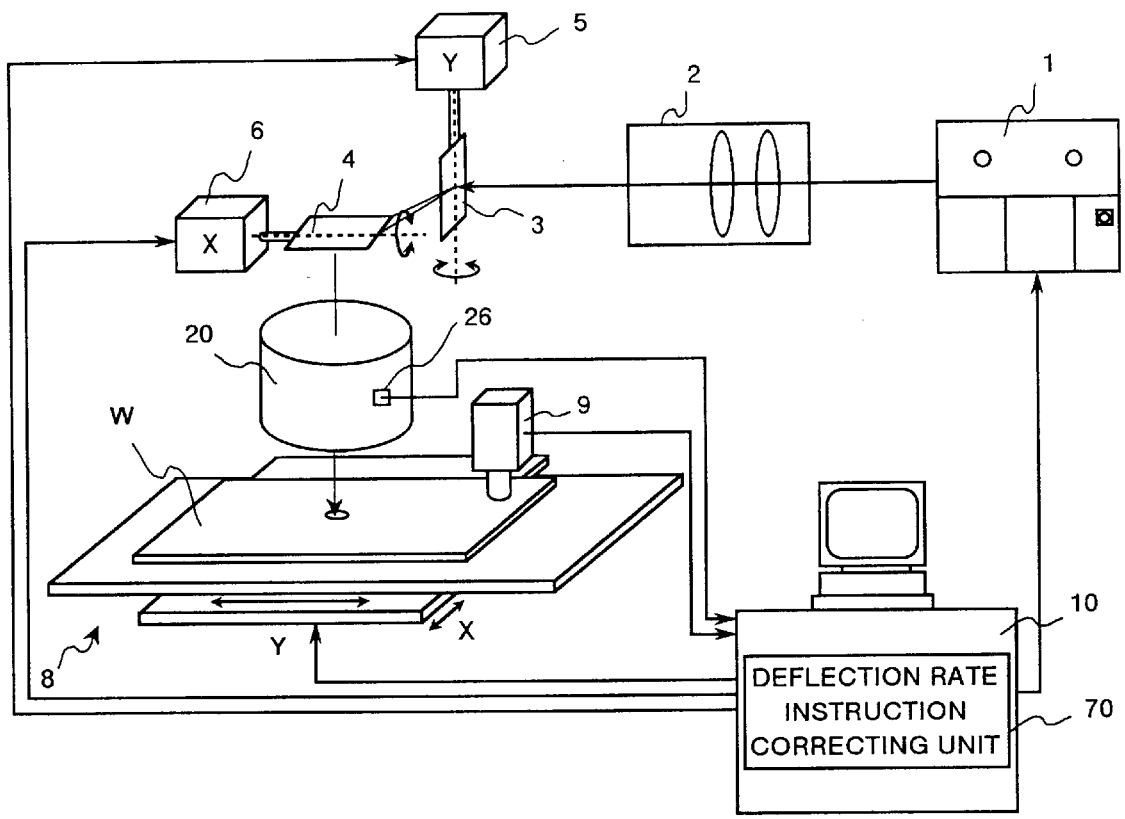
FIG. 23 is a general block diagram showing Embodiment 15 of the laser machining apparatus according to the present invention.
Figure 24:
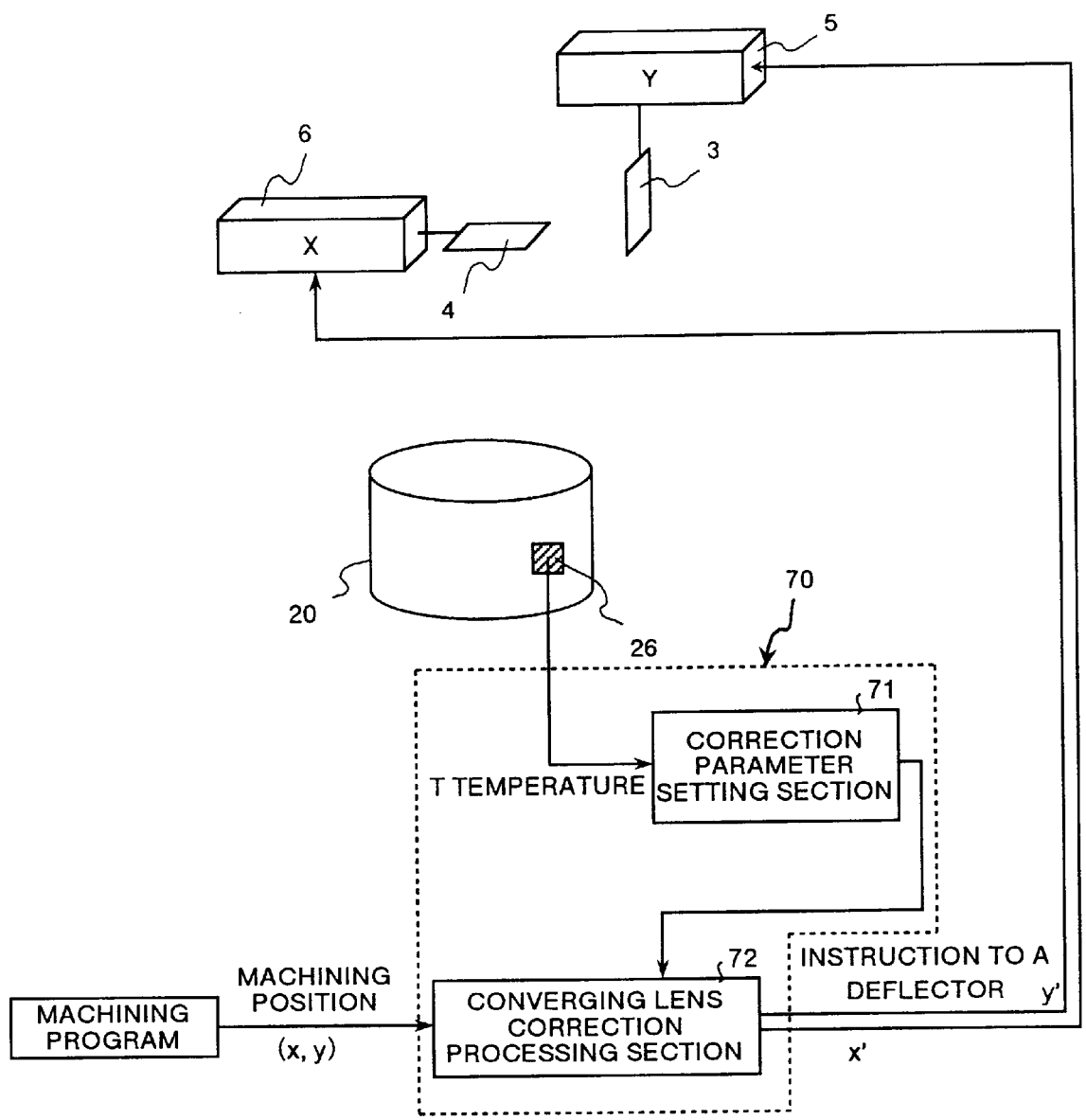
FIG. 24 is a block diagram showing a key section of Embodiment 15 of the laser machining apparatus according to the present invention.

FIG. 23 and FIG. 24 show Embodiment 15 of the laser machining apparatus according to the present invention.

The laser machining apparatus according to this embodiment has a mechanism for canceling a change rate of the optical characteristics of the converging lens by adjusting an angle of a laser beam introduced into the converging lens 20, even if the temperature of the converging lens 20 changes, so that stable and high precision laser machining is executed without being affected by ambient temperature or generation of heat in the laser machining apparatus itself, and also without generation of positional displacement. In this embodiment, the cancel mechanism is realized with a deflection rate instruction correcting unit 70.

The deflection rate instruction correcting unit 70 receives a signal for the temperature of the converging lens 20 detected by the temperature sensor 26 attached to the converging lens 20, corrects an instruction for a deflection rate supplied to a deflector, namely to the Y-axial galvanomirror 3 attached to the Y-axial galvanoscanner 5 and the X-axial galvanomirror 4 attached to the X-axial galvanoscanner 6 according to the temperature of the converging lens 20 detected by the temperature sensor 26, and this deflection rate instruction correcting unit 70 can be provided in the control unit 10.

The deflection rate instruction correcting unit 70 includes a correction parameter setting section 71 for setting the correction parameters according to the temperature of the converging lens 20 detected by the temperature sensor 26, and a converging lens correction processing section 72 for correcting the temperature of the converging lens according to the correction parameters set by the correction parameter setting section 71 for a positional instruction given from a machining program.

Figure 25:
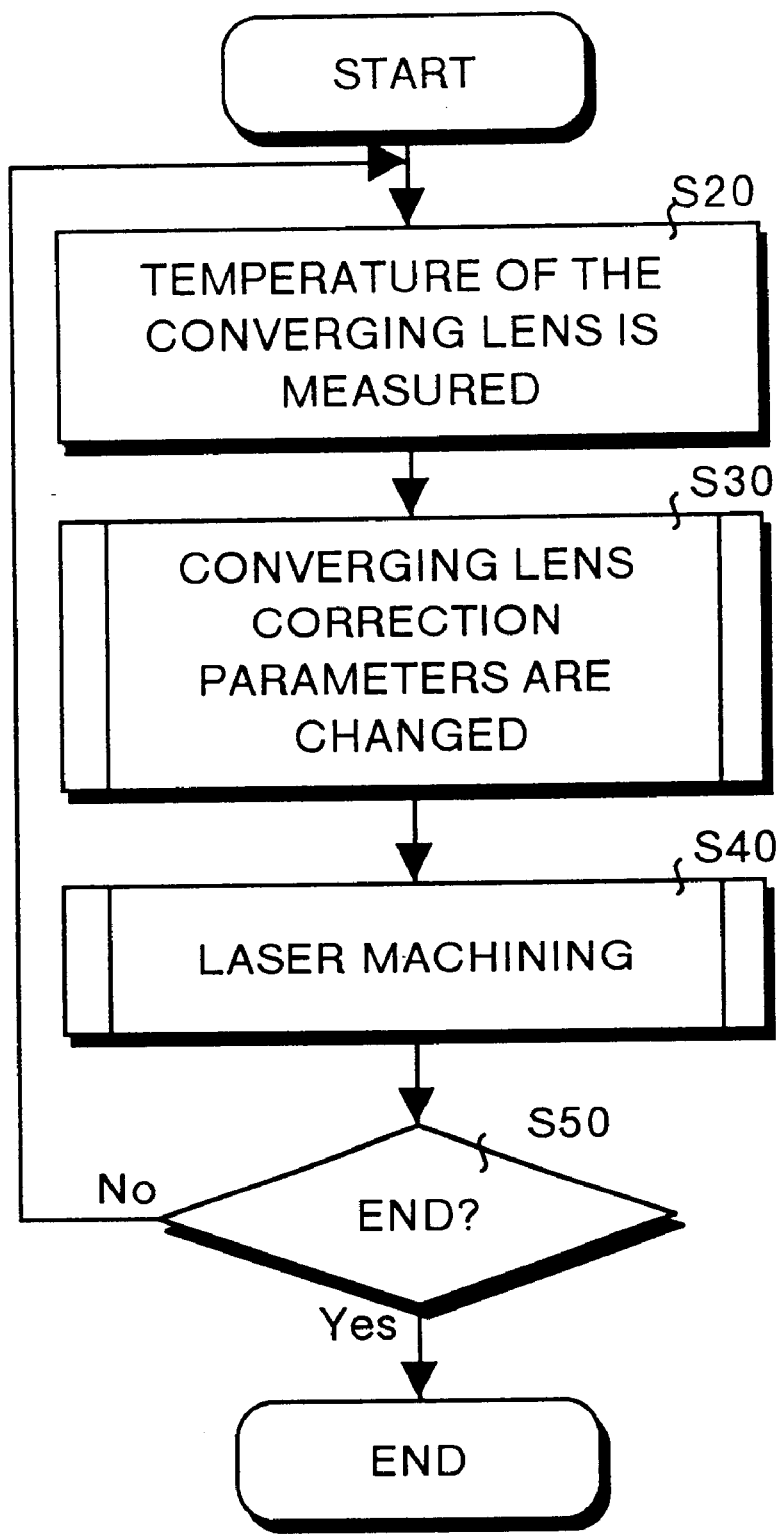
FIG. 25 is a flow chart showing an operational flow in Embodiment 15 of the laser machining apparatus according to the present invention.
Figure 26:
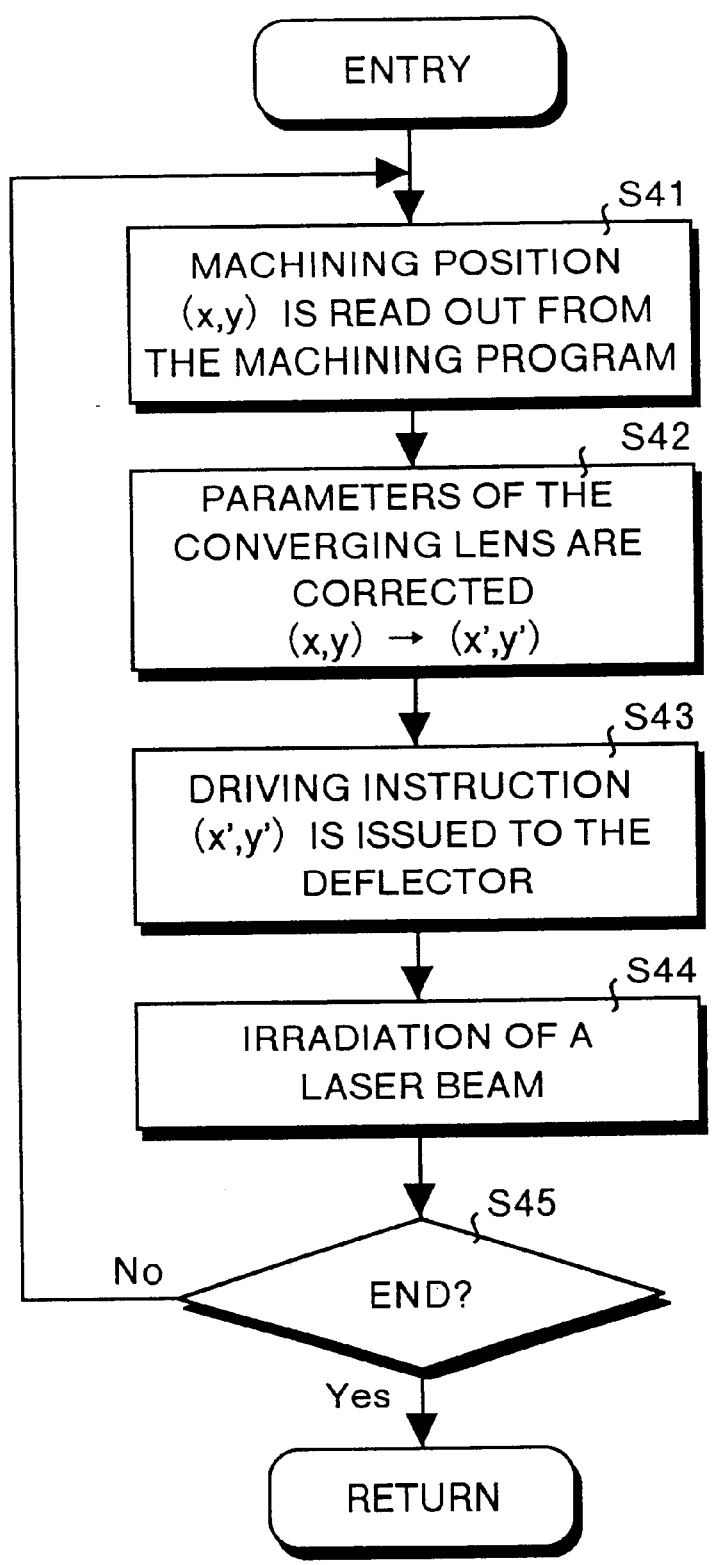
FIG. 26 is a flow chart showing laser machining in Embodiment 15 of the laser machining apparatus according to the present invention.

Next, description is made for a sequence of laser machining in this embodiment with reference to FIG. 25 and FIG. 26.

FIG. 25 shows a general flow, and when an operation of the laser machining apparatus is started, measurement of temperature of the converging lens is executed with the temperature sensor 26 before start of laser machining (step S20).

Then, the processing for correcting the parameters of the converging lens is executed according to the measured temperature of the converging lens, and required correction parameters for the current temperature of the converging lens are obtained (step S30).

Then laser machining is executed (step S40), and a sequence from step S20 to step S40 is repeatedly executed until laser machining is completed (step S50).

In laser machining, as shown in FIG. 26, a machining position (x, y) is read out from the machining program (step S41), correction of parameters of the converging lens is executed using the converging lens correction parameters obtained in the converging lens correction parameter changing processing (step S30) to the machining position (x, y), and then a driving instruction (x', y') to the deflector is obtained to cancel the displacement of a machining position because of a change in the temperature of the converging lens 20 (step S42).

Then the driving instruction (x', y') is outputted to the deflector (Y-axial galvanoscanner 5, X-axial galvanoscanner 6), and after a irradiating position of a laser beam for the converging lens 20 is deflected by means of a deflecting operation by the deflector, irradiation of a laser beam is executed (step S44). Then, it is determined whether the execution of the machining program is to be continued or not (step S45), and when it is determined that the execution of the machining program is to be continued (step S45 negative), a sequence from the machining position read step (step S41) is again repeated.

As described above, temperature of the converging lens 20 is detected, an instruction to the deflector is corrected so that displacement of a machining position due to a change in the temperature of the converging lens 20 is cancelled, and then the angle of the laser beam introduced into the converging lens 20 is corrected, so that stable laser machining with high precision can be executed, even if a change in the temperature of the converging lens is generated, without being affected by the temperature change.

Figure 27:
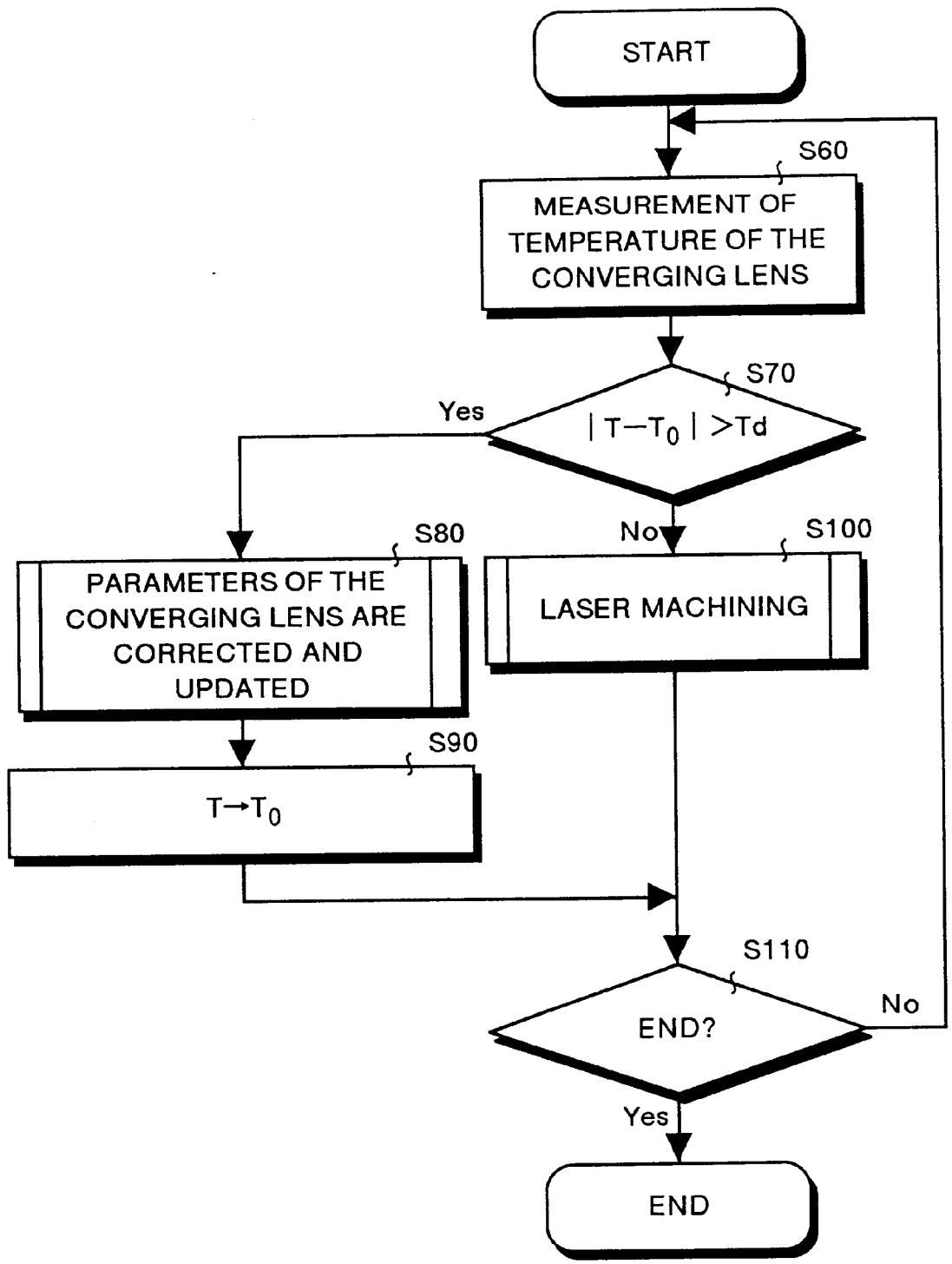
FIG. 27 is a flow chart showing an operational flow in Embodiment 15 of the laser machining apparatus according to the present invention.
Figure 28:
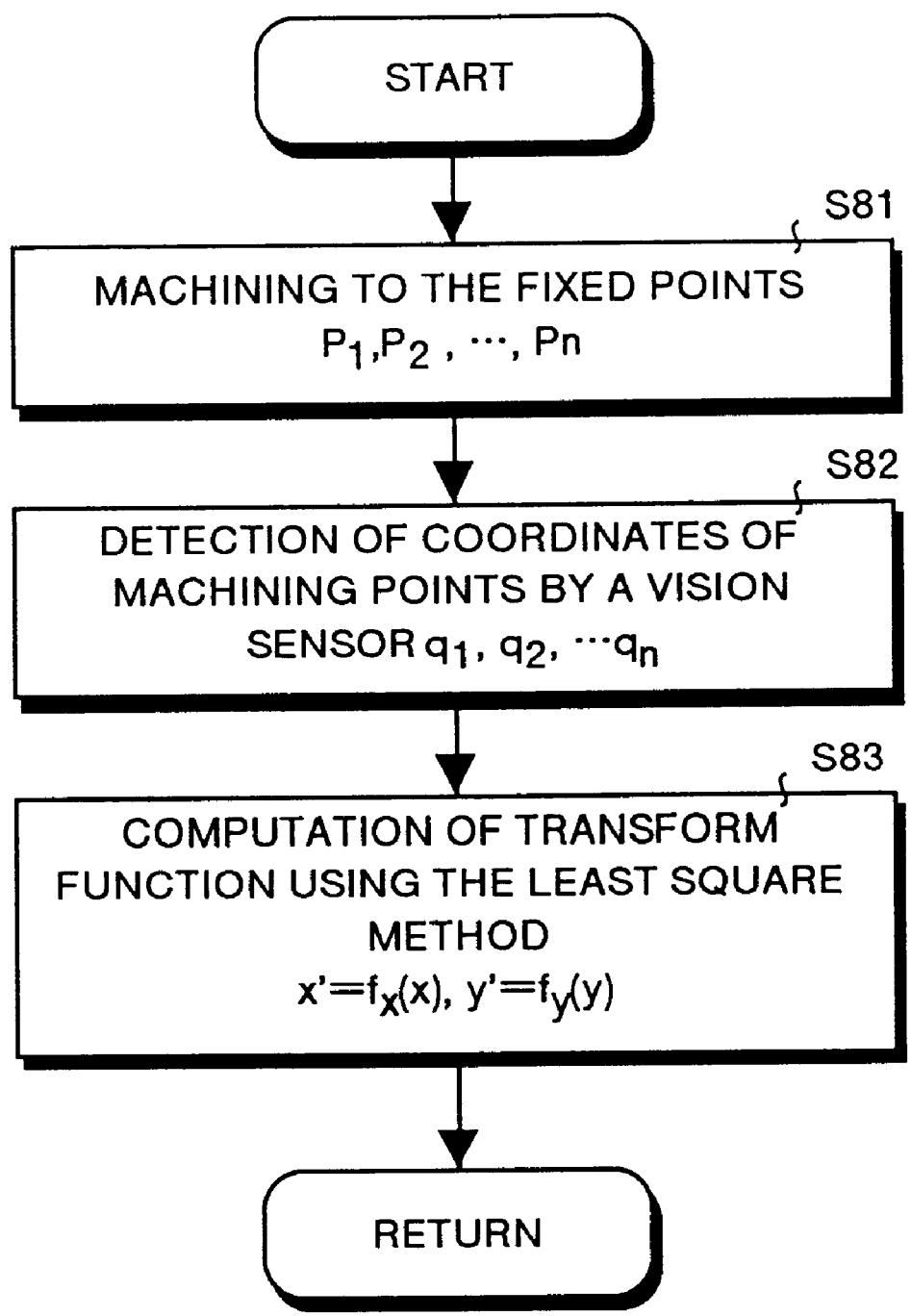
FIG. 28 is a flow chart for correction and updating of parameters of the converging lens in Embodiment 15 of the laser machining apparatus according to the present invention.
Figure 29:
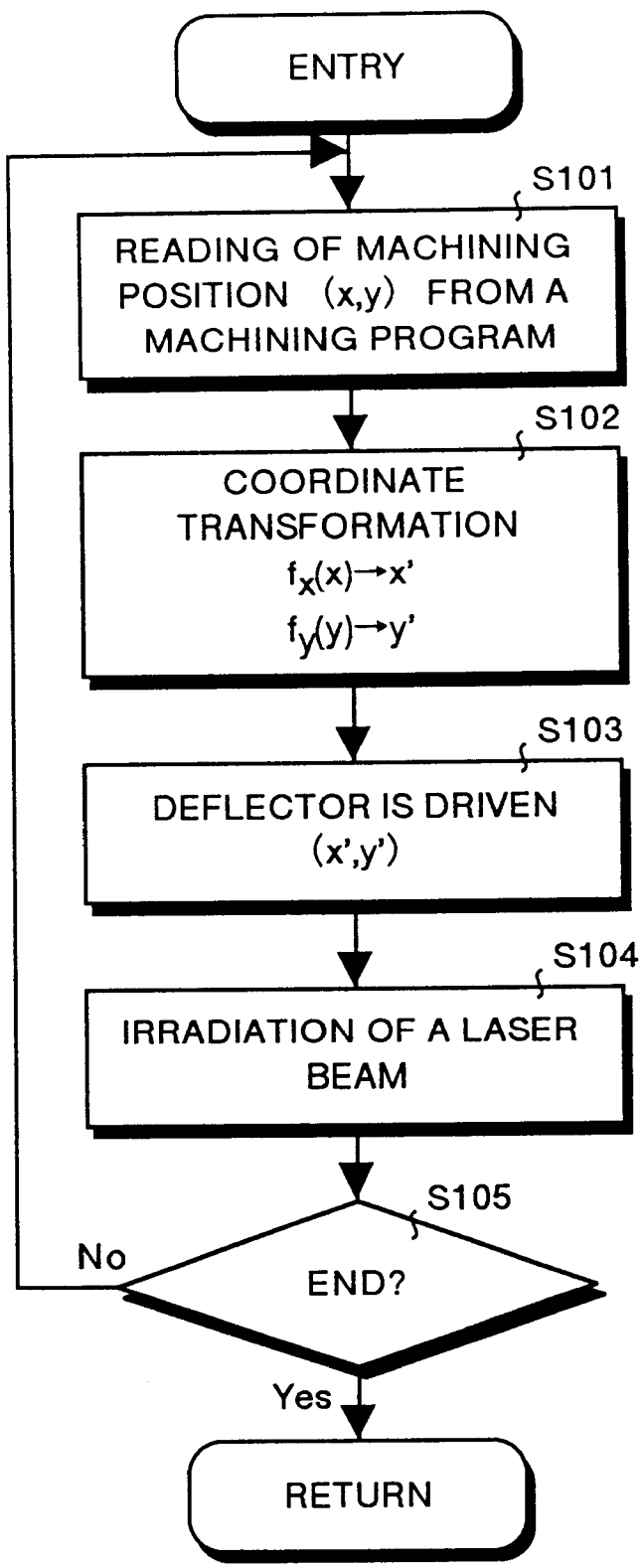
FIG. 29 is a flow chart showing another example of laser machining in Embodiment of the laser machining apparatus according to the present invention.

FIG. 27 to FIG. 29 show the other sequence of laser machining in this embodiment.

In this embodiment, each time the laser machining is executed, temperature of the converging lens is detected, and correction data for the converging lens is updated if a change rate in temperature of the converging lens since the point of time when the correction data for the converging lens was previously corrected has exceeded an allowable value.

FIG. 27 shows a general flow, and when an operation of the laser machining apparatus is started, temperature of the converging lens 20 is measured by the temperature sensor 26 before start of laser machining (step S60). Then, it is determined whether an absolute value of a difference between temperature T of the converging lens detected by the temperature sensor 26 and temperature $T_0$ of the converging lens when the correction data for the converging lens was previously updated has exceeds the allowable temperature difference Td or not (step S70).

When the absolute value of $T-T_0$ exceeds the allowable temperature difference Td (step S70 affirmative), the converging lens correction updating processing is executed (step S80). In this correction for updating, coordinate transformation functions fx(x) and fy(y) themselves are updated.

In this processing for updating, as shown in FIG. 28, machining for prespecified points $P_1, P_2, \ldots P_n$ is executed (step S81), coordinates of the machining points $q_1, q_2, \ldots q_n$ are detected by the vision sensor 9, and then the processing for updating is completed by operating the coordinate transformation functions fx(x), fy(y) by means of least square fitting of the machining position error.

When the processing for updating of the correction parameters of the converging lens is complete, the temperature T of the converging lens at the point of time when the updating was executed is stored as temperature $T_0$ of the converging lens when the updating was executed (step S90).

If the absolute value of $T-T_0$ is less than the allowable temperature difference Td (step S70 negative), laser machining is executed (step S100), and a sequence from step S60 to step S100 is repeatedly executed until laser machining is completed (step S110).

In laser machining, as shown in FIG. 29, a machining position (x, y) is read out from a machining program (step S101), the machining position (x, y) is subjected to coordinate transformation with the coordinate transformation functions fx(x), fy(y) obtained in the converging lens correction changing processing (step S80) to obtain a driving instruction (x', y') to the deflector so that displacement of a machining position due to a change in the temperature of the converging lens 20 is obtained (step S102).

The driving instruction (x', y') is outputted to the deflector (Y-axial galvanoscanner 5, X-axial galvanoscanner 6) to drive the deflector (step S103), and after a irradiating position of a laser beam to the converging lens 20 is decided through deflection by the deflector, irradiation of a laser beam is executed (step S104). Then, it is determined whether execution of the machining program is to be continued or not (step S105), and when it is determined that execution of the machining program is to be continued (step S105 negative), a sequence from the step of reading out a machining position (step S101) is again repeated.

As described above, by providing a means for correcting the coordinates instructed to the deflector, displacement of a machining position generated in the converging lens is canceled, and machining can be executed according to an aimed machining position with high precision.

It is also possible to correct the parameters of the converging lens using a correction matrix M corresponding to the temperature of the converging lens for transforming a machining position (x, y) to instructed coordinates (x', y') of a deflector in place of the coordinate transformation function described above as shown in FIG. 30. By using a correction matrix M non-linear positional displacement can also completely be corrected and laser machining with high precision can be carried out.

The matrix M is decided, like in a case of the converging lens correction updating as shown in FIG. 28, by executing machining to of the fixed points $P_1, P_2, \ldots P_n$, detecting the coordinates of the machining positions $q_1, q_2, \ldots q_n$, and using the least square method so that machining can be executed with high precision to a required machining position.

The matrix M is obtained through a two-dimensional expression for the coordinates x, y in the example shown in FIG. 30, but a higher-dimensional expression may be used when higher precision is required.

Figure 31:
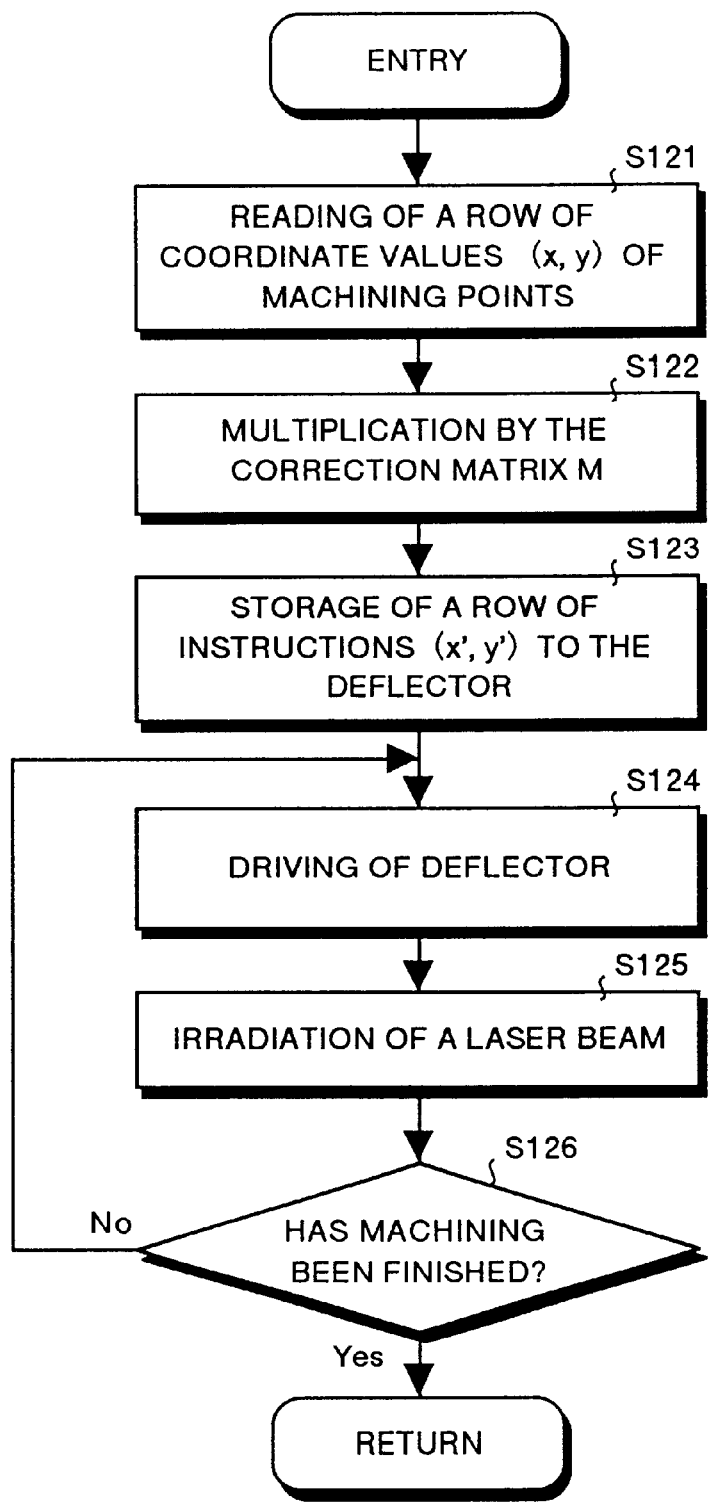
FIG. 31 is a flow chart showing still another example of laser machining in Embodiment 15 of the laser machining apparatus according to the present invention.

Next, description is made for a processing flow when machining is executed with the correction matrix with reference to FIG. 31. At first, a series of row of the machining coordinates (x, y) are read out from the machining program (step S121), then an instruction values for all the machining points are corrected according to the matrix M before laser beam irradiation is executed (step S122), and the corrected matrix of machining points corresponding to the corrected instruction values (x', y') are stored (step S123).

Then, an instruction value (x', y') is outputted to the deflector (Y-axial galvanoscanner 5, X-axial galvanoscanner 6) to drive the deflector according to the driving instruction (x', y') (step S124), and after an irradiating position of a laser beam to the converging lens 20 is decided through deflection of the deflector, irradiation of a laser beam is executed (step S125). Then it is determined whether execution of the machining program is to be continued further or not (step S126), and when execution of the machining program is to be continued further (step S126 negative), a sequence from the step of driving the deflector (step S124) is repeated again.

The correction matrix M is set according to the temperature of a converging lens, temperature is divided with a required resolution step within a range of anticipated change in the temperature of the converging lens, then values for the correction matrix M optimal at each temperature step are obtained, and the temperature values can be stored in a temperature correction table system shown in FIG. 32.

It is not required to obtain the temperature correction table each time the machining is executed, and it has been known that the temperature correction table is required only when a laser machining apparatus is to be installed or when the converging lens 20 is to be replaced with a new one. In this case, a correction matrix corresponding to the temperature of the converging lens detected by the temperature sensor is read out from a memory to correct an instruction for a deflection rate.

Thus, it is not necessary to stop the laser machining for updating of the correction parameters for the converging lens even when temperature of the converging lens 20 changes, and a change in the machining position a change in the temperature can be suppressed by setting an optimal correction matrix M corresponding to the current temperature of the converging lens. Therefore, even if a change in the temperature of the converging lens occurs during execution of continuous machining in the automatic mode, a correction rate can be set to the optimal value according to a change in the temperature of the converging lens 20, so that stable laser machining with high precision can be executed.

Figure 33:
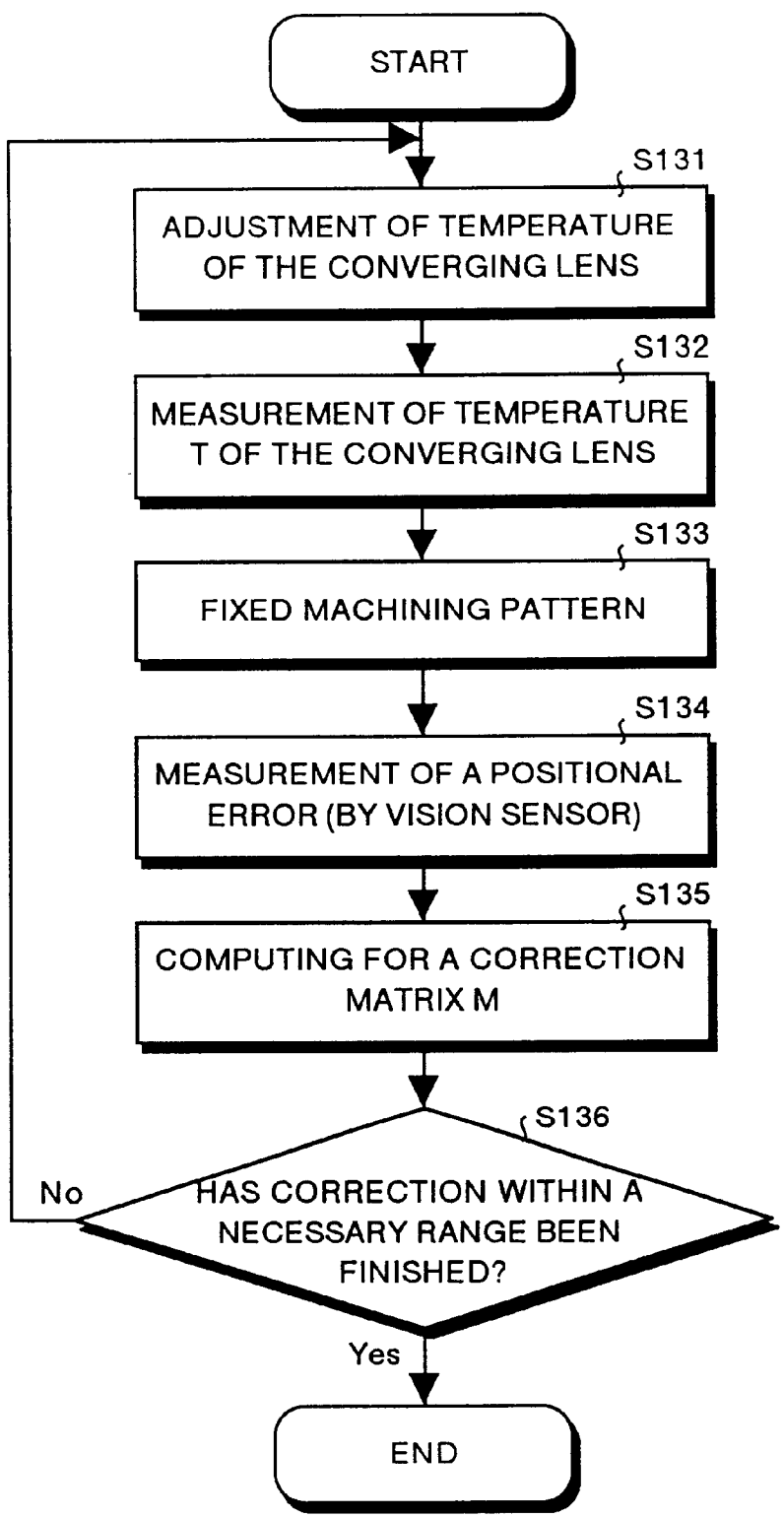
FIG. 33 is a flow chart showing a sequence for obtaining a correction matrix in Embodiment 15 of the laser machining apparatus according to the present invention.

FIG. 33 shows a sequence of operations for setting the temperature correction table described above.

When setting the temperature correction table, at first temperature of the converging lens 20 is adjusted (step S131), and temperature T of the converging lens is measured with the temperature sensor 26 (step S132).

The machining according to a matrix shaped pattern is executed (step S133), a measurement of a positional error according to a result of machining is executed by the vision sensor 9 (step S134), and then the correction matrix M at the converging lens temperature T is computed according to the measured error (step S135). The processing sequence described above is repeatedly executed within a required temperature range by changing the temperature of the converging lens by a required resolution step (step S136).

Figure 34:
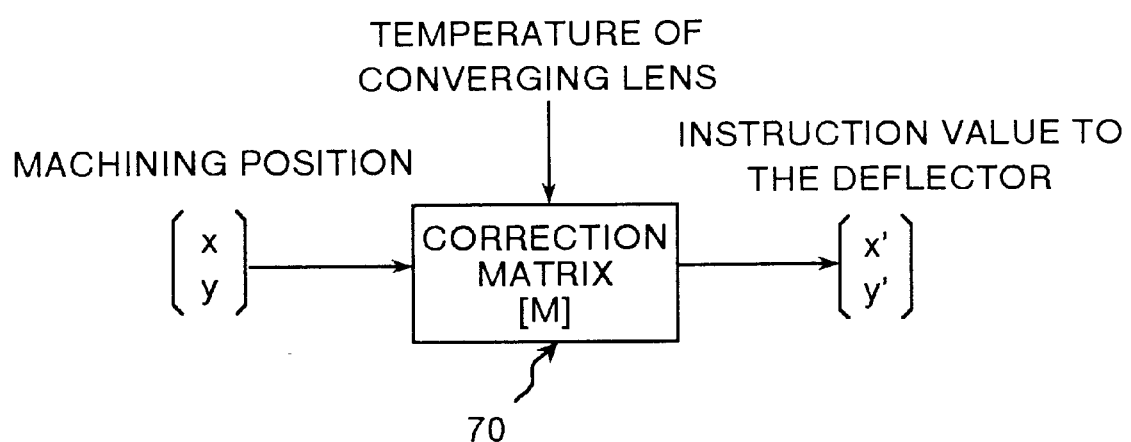
FIG. 34 is a block diagram showing a variant of Embodiment 15 of the laser machining apparatus according to the present invention.

FIG. 34 shows the deflection rate instruction correcting unit 70 in a case where an optimal value for the correction matrix M at each temperature is obtained as described above.

Figure 35:
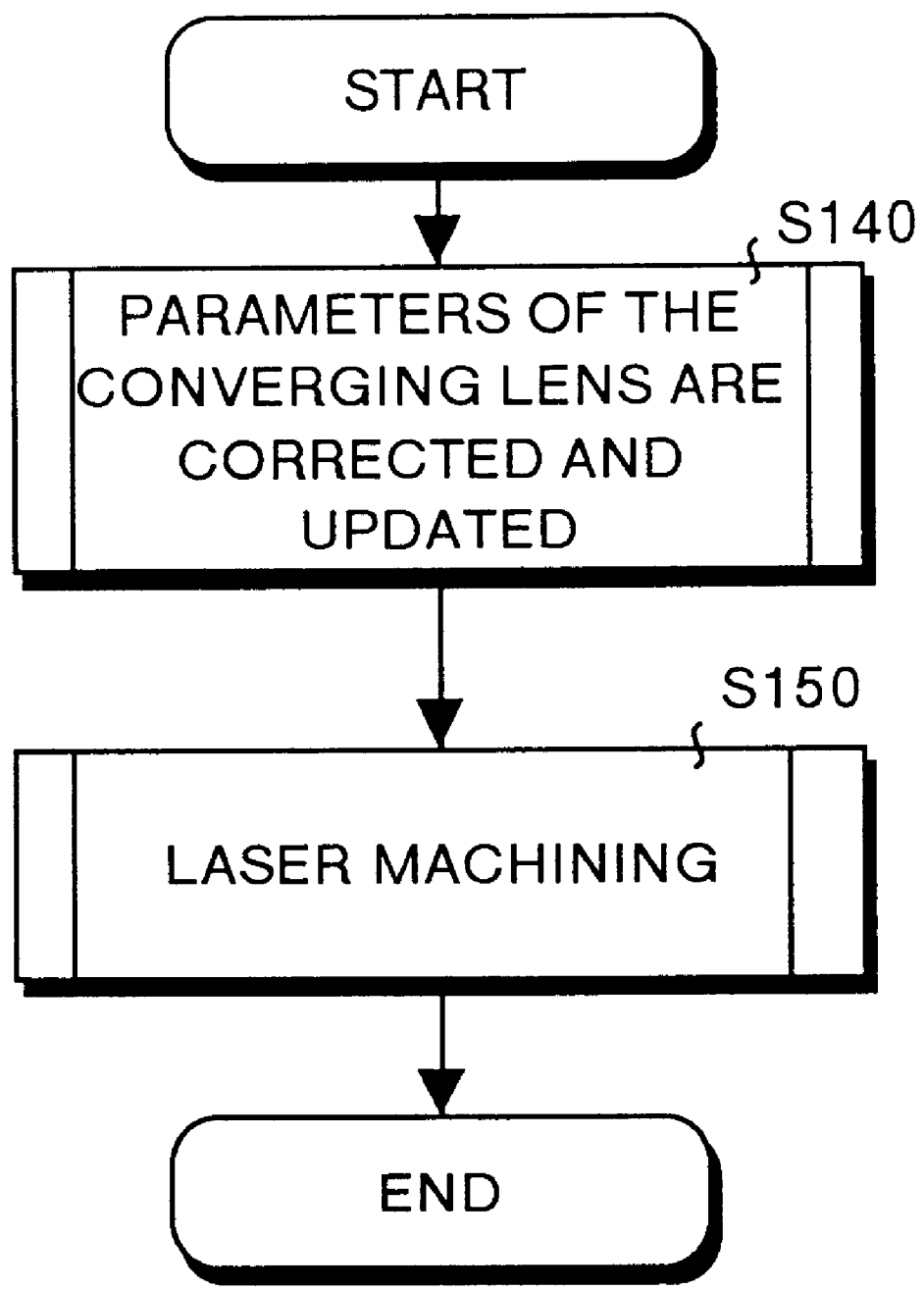
FIG. 35 is a flow chart showing another operational flow in Embodiment 15 of the laser machining apparatus according to the present invention.

Updating of the coordinate transformation function or correction matrix described above may be executed, each time laser machining is to be executed, before start of the laser machining. In the flow chart shown in FIG. 35, when an operation of the laser machining apparatus is started, updating of correction parameters for the converging lens is executed before start of laser machining (step S140), and then laser machining is executed (step S150).

In this case, the temperature sensor 26 may be eliminated.

In many cases, based on the concept that the temperature of the converging lens does not change much within a short period of time, updating of correction parameters of the converging lens may be executed at a prespecified timing, for instance, periodically each time a specified period of time (about one hour) has passed.

Figure 36:
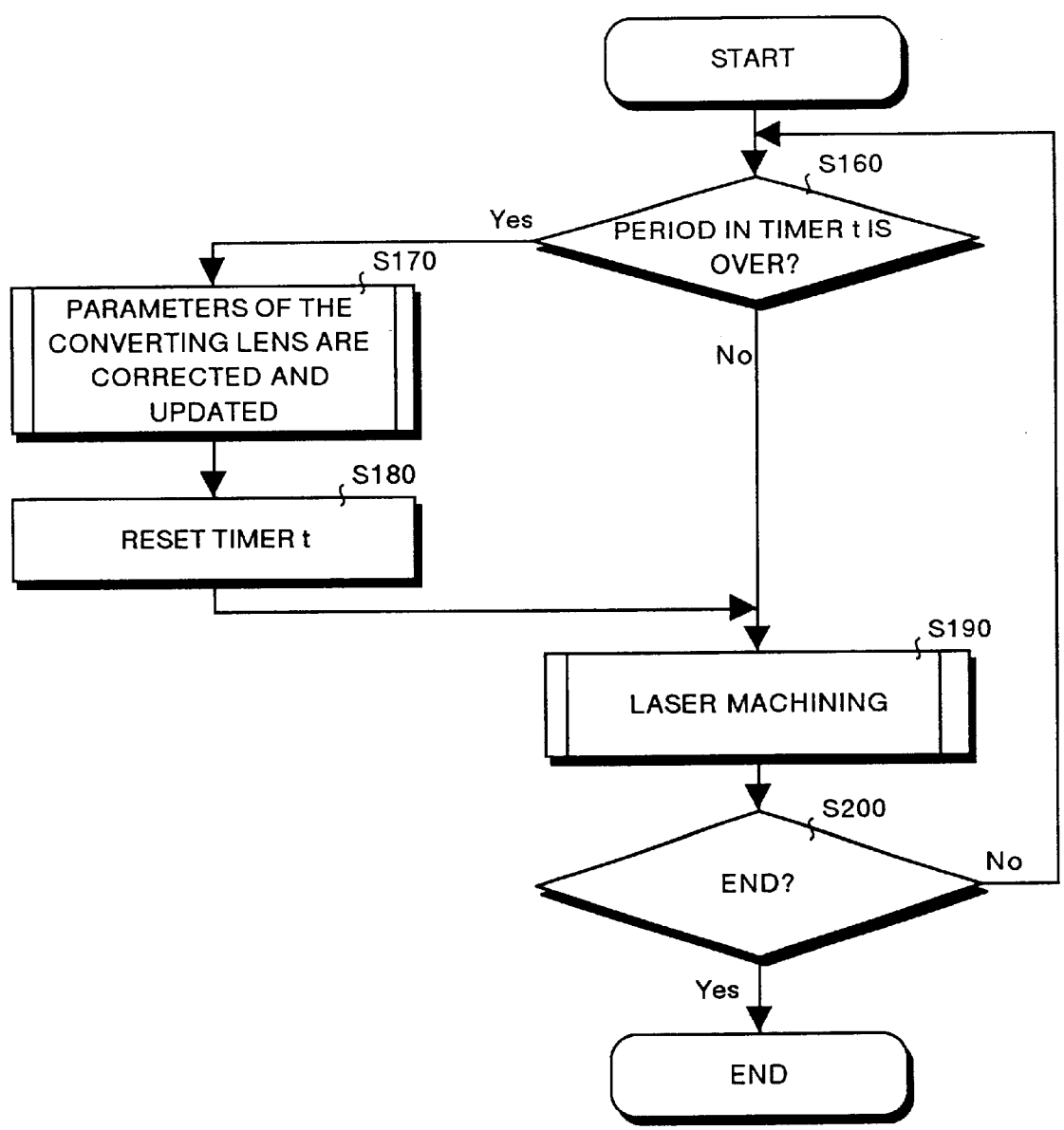
FIG. 36 is a flow chart showing still another operational flow in Embodiment 15 of the laser machining apparatus according to the present invention.

In this case, as shown in FIG. 36, when the operation of the laser machining apparatus is started, at first it is determined whether a preset period in the timer t is over or not before start of laser machining (step S160). If the preset value is not over laser machining is executed immediately (step S190), and a sequence of operations from step S160 to step S190 is repeated until laser machining is completed (step S200).

When the preset period is over, the processing for updating of the correction parameters of the converging lens is executed (step S170) and the timer t is reset (step S180).

Figure 37:
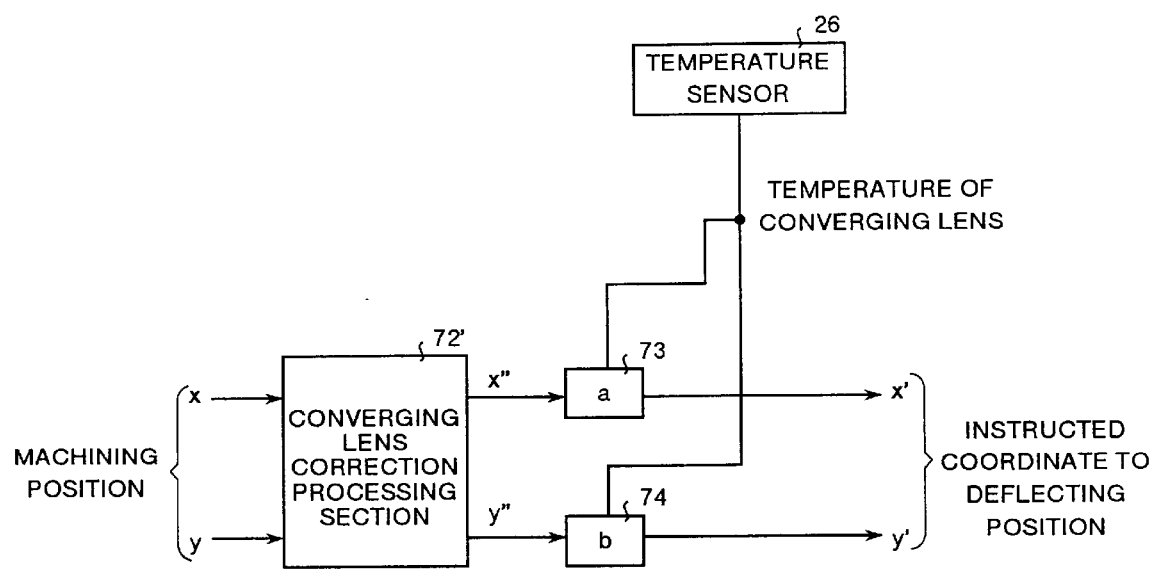
FIG. 37 is a block diagram showing Embodiment 16 of the laser machining apparatus according to the present invention.

FIG. 37 shows Embodiment 16 of the laser machining apparatus according to the present invention.

In the laser machining according to this embodiment, variable gain setters 73, 74 for the Y-axial galvanoscanner and X-axial galvanoscanner 5 are incorporated in the downstream from the converging lens correcting processing section 72'.

The variable gain setters 73, 74 receive coordinates (x", y") after correction of parameters from the converging lens correction processing section 72' and also the information concerning the temperature of the converging lens given thereto from the temperature sensor 26, and set the gains a, b for the Y-axial galvanoscanner 5 and X-axial galvanoscanner 6 according to the temperature of the converging lens.

When the gains a, b as appropriate temperature parameters are obtained for a change rate in temperature of the converging lens 20, machining can be executed without generating a displacement of a machining position even when there occurs a change in temperature of the converging lens 20. It has been known that, to cancel a change in temperature of the converging lens 20, the gains a and b sufficient for canceling a change in the temperature characteristics of the converging lens can be obtained through a one-dimensional expression for temperature of the converging lens.

With this operations described above, displacement of a machining position due to a change in the temperature of the converging lens can be prevented.

Figure 38:
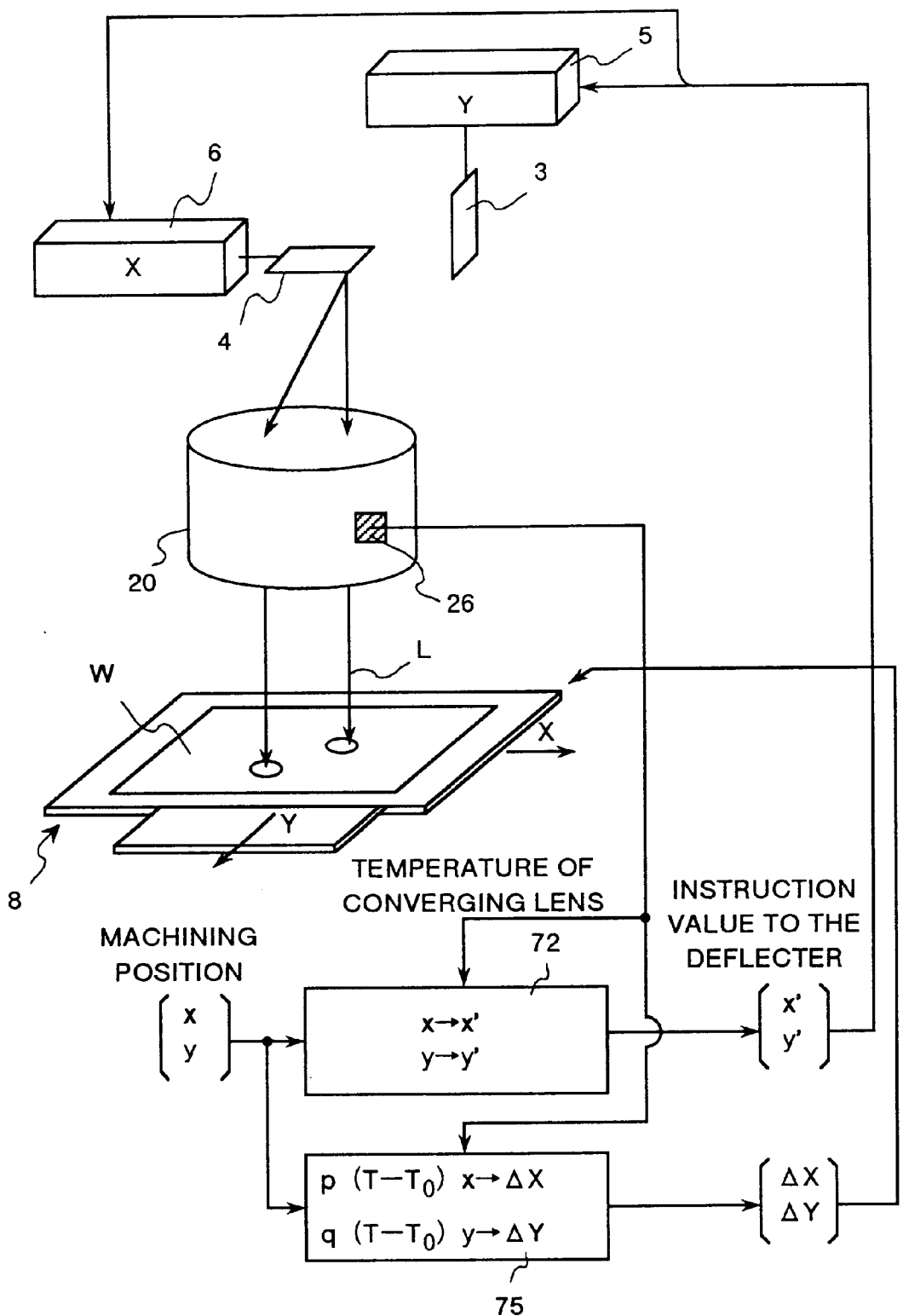
FIG. 38 is a block diagram showing Embodiment 17 of the laser machining apparatus according to the present invention.

FIG. 38 shows Embodiment 17 of the laser machining apparatus according to the present invention.

In the laser machining apparatus according to this embodiment, a machining table driving instruction correcting section 75 is provided as a mechanism for canceling a change in the converging characteristics of the converging lens 20 according to a temperature change. The machining table driving instruction correcting section 75 corrects, like the deflection rate instruction correcting unit 70, a positional instruction for the machining table device 8 supplied by a machining program according to the temperature of the converging lens 20 detected by the temperature sensor 26 with correction constants p, q decided according to a change in the converging characteristics of the converging lens 20 due to a temperature change.

The correction constants p, q can be obtained by previously measuring a change rate in the converging characteristics of the converging lens 20 because of a change in the temperature, and positional instructions Δx and Δy after correction are obtained by multiplying a difference value between the standard temperature $T_0$ and temperature T of the converging lens detected by the temperature sensor 26 by the correction coefficients p, q to obtain correction coefficients corresponding to the temperature difference and them multiplying the positional instructions given from a machining program by the correction coefficient.

With this operations, the machining table device 8 can be moved so that displacement of a machining position caused by a change in temperature of the converging lens 20 is not generated, and displacement of a machining position caused by a change in the temperature can be canceled by moving the machining table device 8, so that laser machining with high precision can be executed.

Figure 39:
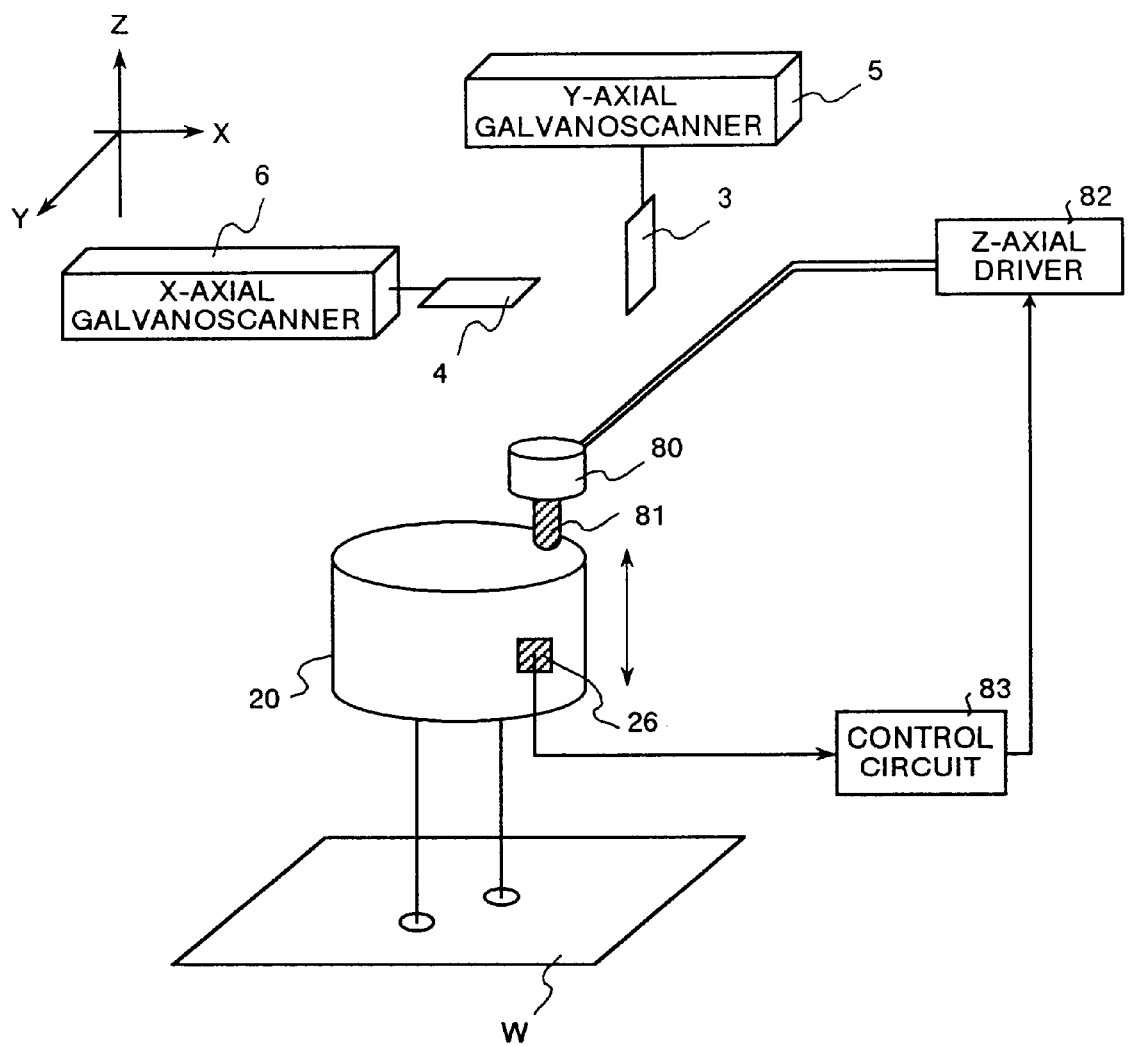
FIG. 39 is a block diagram showing Embodiment 18 of the laser machining apparatus according to the present invention.

FIG. 39 shows Embodiment 18 of the laser machining apparatus according to the present invention.

In the laser machining apparatus according to this embodiment, as a mechanism for canceling a change in the converging characteristics of the converging lens 20 because of a change in the temperature, a lens-side Z-axis driving mechanism for displacing the entire converging lens 20 in a direction of the optic axis (Z-axial direction) is incorporated therein The deflector comprises the Y-axial galvanomirror 3 attached to the Y-axial galvanoscanner 5 and the X-axial galvanomirror 4 attached to the x-axial galvanoscanner 6, and these components are attached to a frame not shown in the figure.

The lens-side Z axis driving mechanism is based, for instance, on a feed screw system, and has a servo motor 80 mounted on and fixed to the frame described above, a ball screw 81 rotated and driven by the servo motor 80 for moving the converging lens 20 by means of its rotation in the Z-axial direction, and a control circuit 83 for outputting a Z-axial instruction according to the temperature of the converging lens 20 detected by the temperature sensor 26 to the Z-axial driver 82 of the servo motor 80.

The lens-side Z-axis driving mechanism changes a relative distance between the converging lens 20 and the deflector by means of rotation of the ball screw by the servo motor 80.

As it is generally known that, when the temperature of the converging lens 20 goes up, also reflective index thereof goes high, a driving instruction is issued from the control circuit 83 according to the temperature of the converging lens detected by the temperature sensor 26 attached to the converging lens 20 so that, when the temperature of the converging lens rises, a distance between the deflector and the converging lens 20 becomes shorter.

Because of this configuration, displacement of a machining position due to a change in the temperature of the converging lens 20 can be corrected by changing a relative position of the converging lens 20 and the deflector so that even when there occurs a change in temperature of the converging lens 20 the positional displacement corresponding to the temperature change is canceled.

With this feature, generation of a machining position caused by a change in the temperature of the converging lens 20 is prevented.

Figure 40:
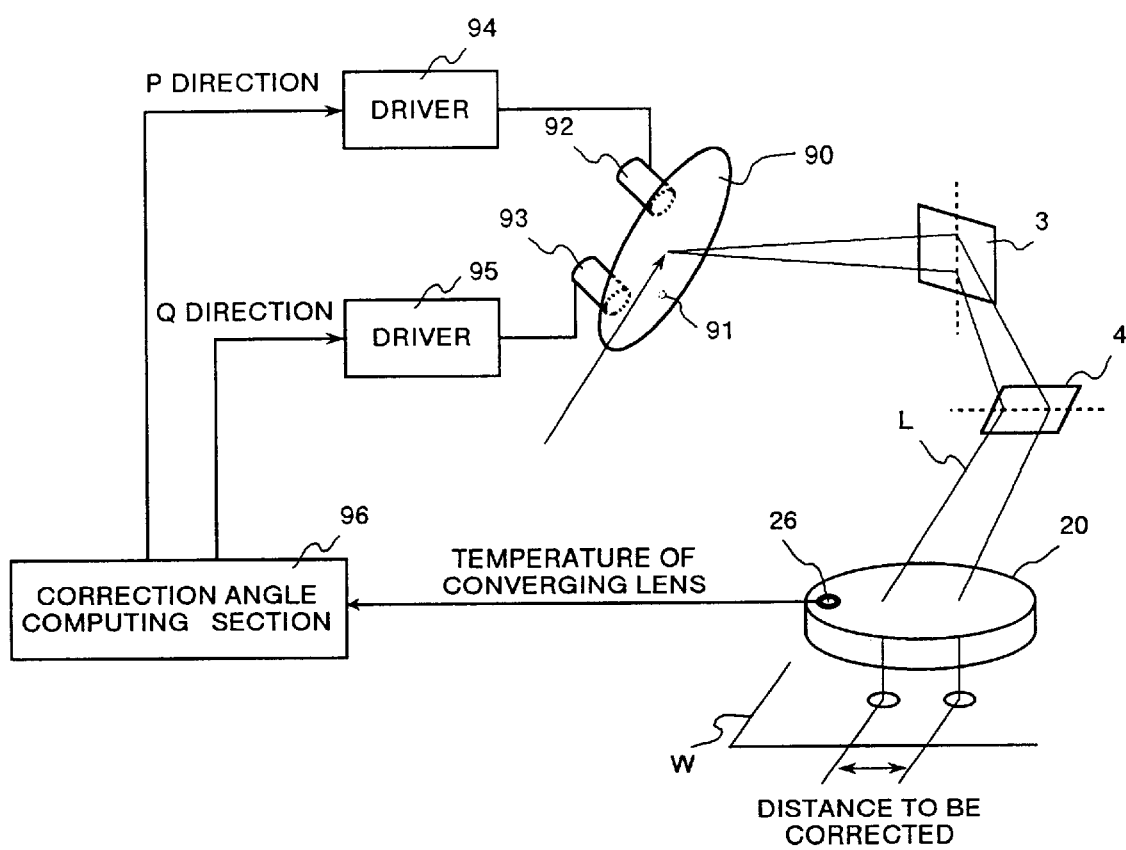
FIG. 40 is a block diagram showing Embodiment 19 of the laser machining apparatus according to the present invention.

FIG. 40 shows Embodiment 19 of the laser machining apparatus according to the present invention.

In the laser machining apparatus according to this embodiment, as a mechanism for canceling a change in the converging characteristics of the converging lens 20 due to a change in the temperature, a mechanism for adjusting the incidence angle of the laser beam L introduced into the deflector is incorporated therein.

This incidence angle adjusting mechanism includes a bend mirror 90. The bend mirror 90 is supported by a fulcrum 91 comprising a flexible joint so that the bend mirror 90 can be inclined in two directions (P and Q directions) crossing each other at right angles. As actuators for inclining the bend mirror 90 in the direction P and direction Q respectively, piezoelectric elements 92 and 93 are drivably connected to the bend mirror 90.

The piezoelectric elements 92 and 93 are driven at a fixed rate according to an instruction signal outputted from a correction angle computing section 96. The correction angle computing section 96 outputs a P-axial instruction and a Q-axial instruction to the piezoelectric elements 92 and 93 respectively according to the temperature of the converging lens 20 detected by the temperature sensor 26.

The piezoelectric elements 92 and 93 are driven at a fixed rate according to an electric signal (for voltage control), so that the angle of the bend mirror 90 can be adjusted according to the temperature of the converging lens 20 detected by the temperature sensor 26. By previously setting a relational expression for correction angles required according to the temperature of the converging lens 20 in the correction angle computing processing section 96, an angle of a laser beam introduced into the deflector and then an angle of the laser beam introduced into the converging lens are adjusted according to a correction value instructed by the correction angle computing section 96, so that a change in the converging characteristics of the converging lens 20 due to a change in the temperature can be canceled.

With this feature, generation of displacement of a machining position caused by a change in the temperature of the converging lens 20 is prevented.

Therefore, when machining is executed, by driving the bend mirror 90 and changing the angle thereof to correct the displacement of a machining position caused by a change in the temperature of the converging lens generated in association with driving of the deflector according to the machining position, laser machining with high precision can be executed without being affected by a change in temperature of the converging lens 20.

Figure 41:
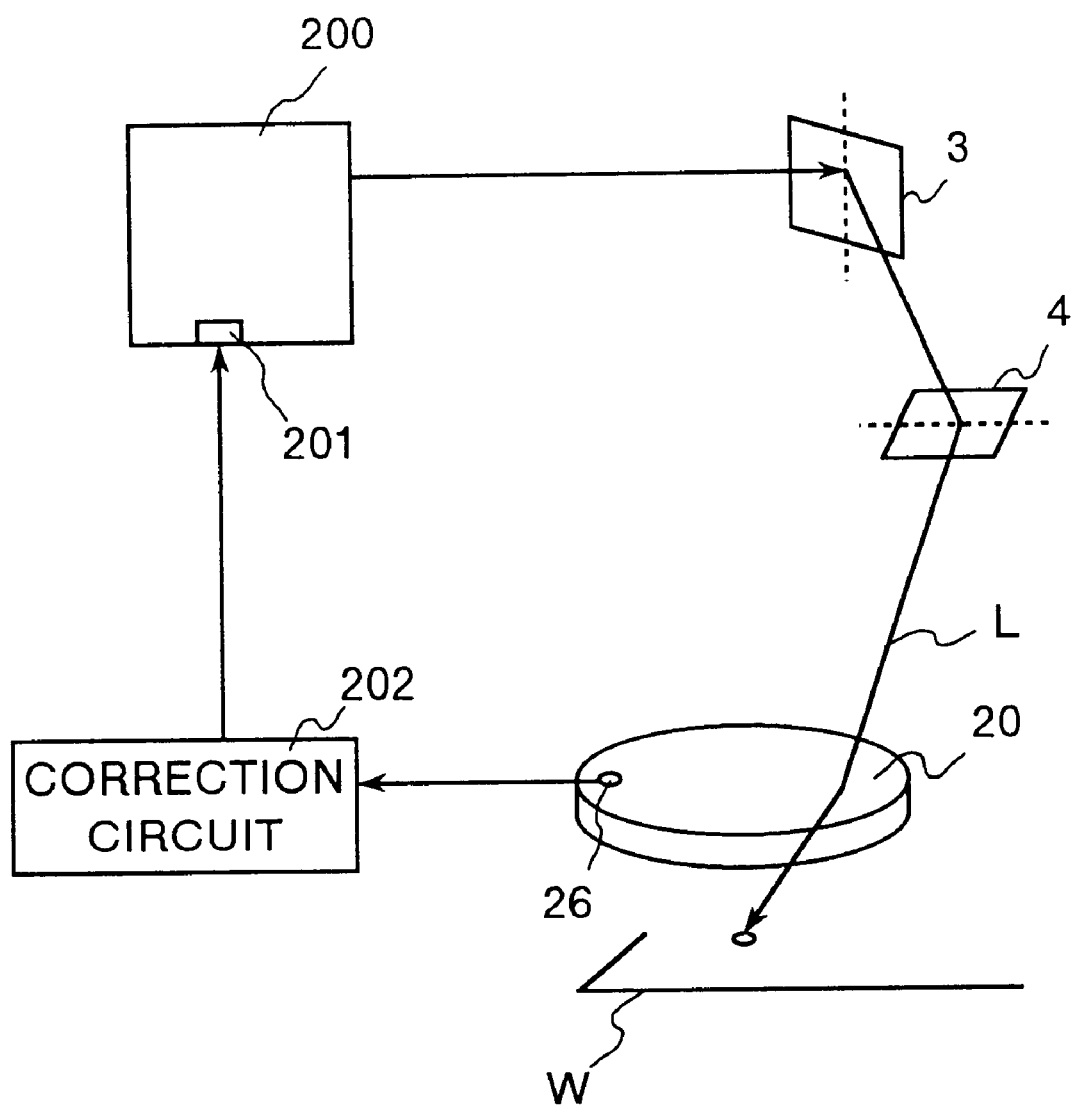
FIG. 41 is a block diagram showing Embodiment 20 of the laser machining apparatus according to the present invention.

FIG. 41 shows Embodiment 20 of the laser machining apparatus according to the present invention.

In the laser machining apparatus according to this embodiment, as a mechanism for canceling a change in the converging characteristics of the converging lens because of a change in the temperature, a mechanism for variably setting a wavelength of a laser beam L is incorporated therein. This mechanism is realized with a wavelength-variable laser oscillator 200 capable of changing a wavelength. The wavelength-variable laser oscillator 200 changes the wavelength of an output laser beam L according to a wavelength instruction signal inputted into a wavelength instruction input terminal 201, while the correction circuit 202 adjusts a wavelength of the laser beam L to cancel a change in the optical characteristics of the converging lens 20 according to the temperature T detected by the temperature sensor 26 attached to the converging lens 20.

Generally a reflective index n of the converging lens 20 depends on the wavelength λ, so that adjustment can be made to cancel a change of the optical characteristics of the converging lens according to temperature by adjusting a wavelength λ of the laser beam L.

With this feature, a wavelength of a laser beam can be changed so that positional displacement because of a change in temperature of the converging lens 20 is canceled and generation of displacement of a machining position caused due to a change in temperature of the converging lens 20 is prevented, so that stable laser machining with high precision can be executed without being affected by a change in temperature of the converging lens.

Figure 42:
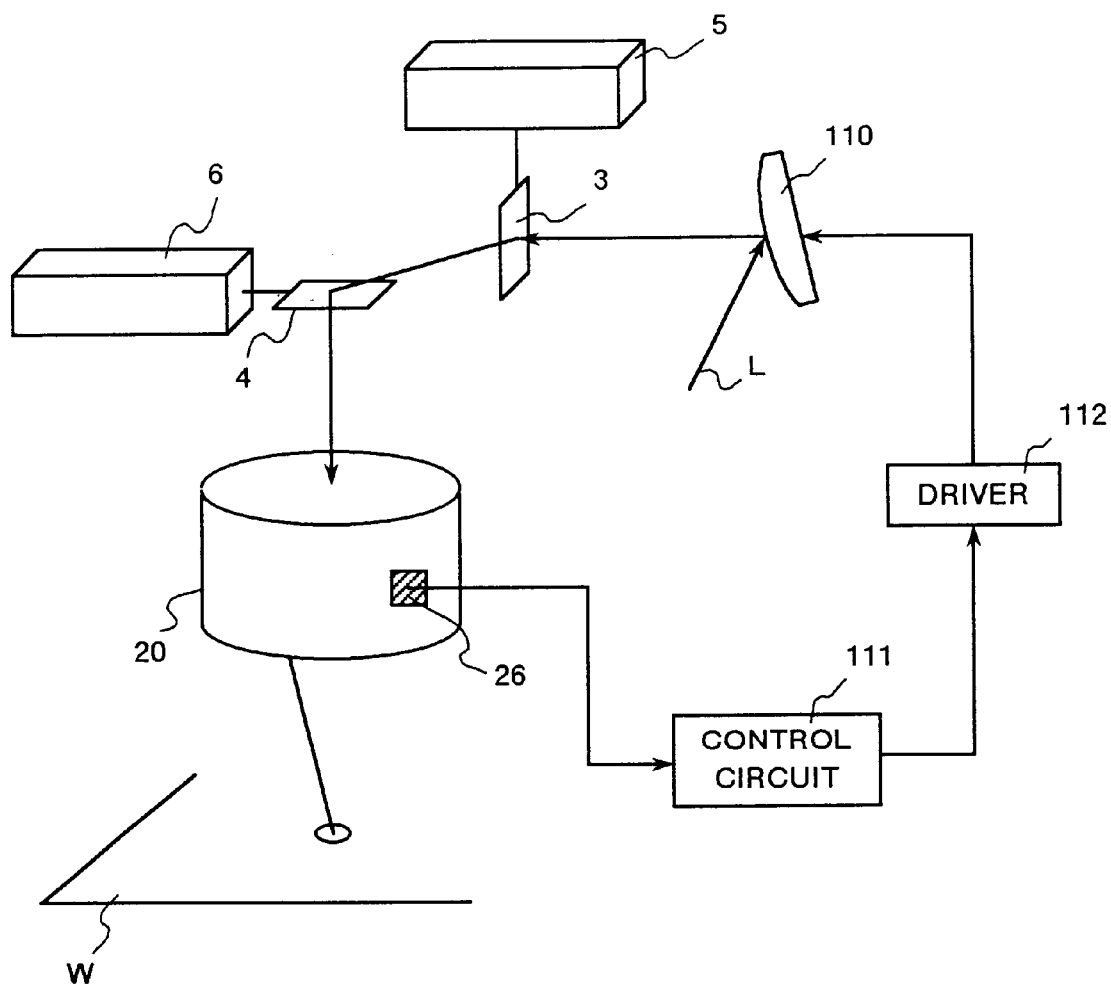
FIG. 42 is a block diagram showing Embodiment 21 of the laser machining apparatus according to the present invention.

FIG. 42 shows Embodiment 21 of the laser machining apparatus according to the present invention.

In the laser machining apparatus according to this embodiment, as a mechanism for canceling a change in the focal length of the converging lens 20 because of a change in the temperature change, a mechanism for adjusting a divergence angle of a laser beam L introduced onto the converging lens is incorporated therein.

This mechanism includes an adaptive optics 110. The adaptive optics 110 can change a curvature of a reflection surface for a laser beam L with an electric signal, and adjusts a divergence signal of the laser beam L.

Figure 43:
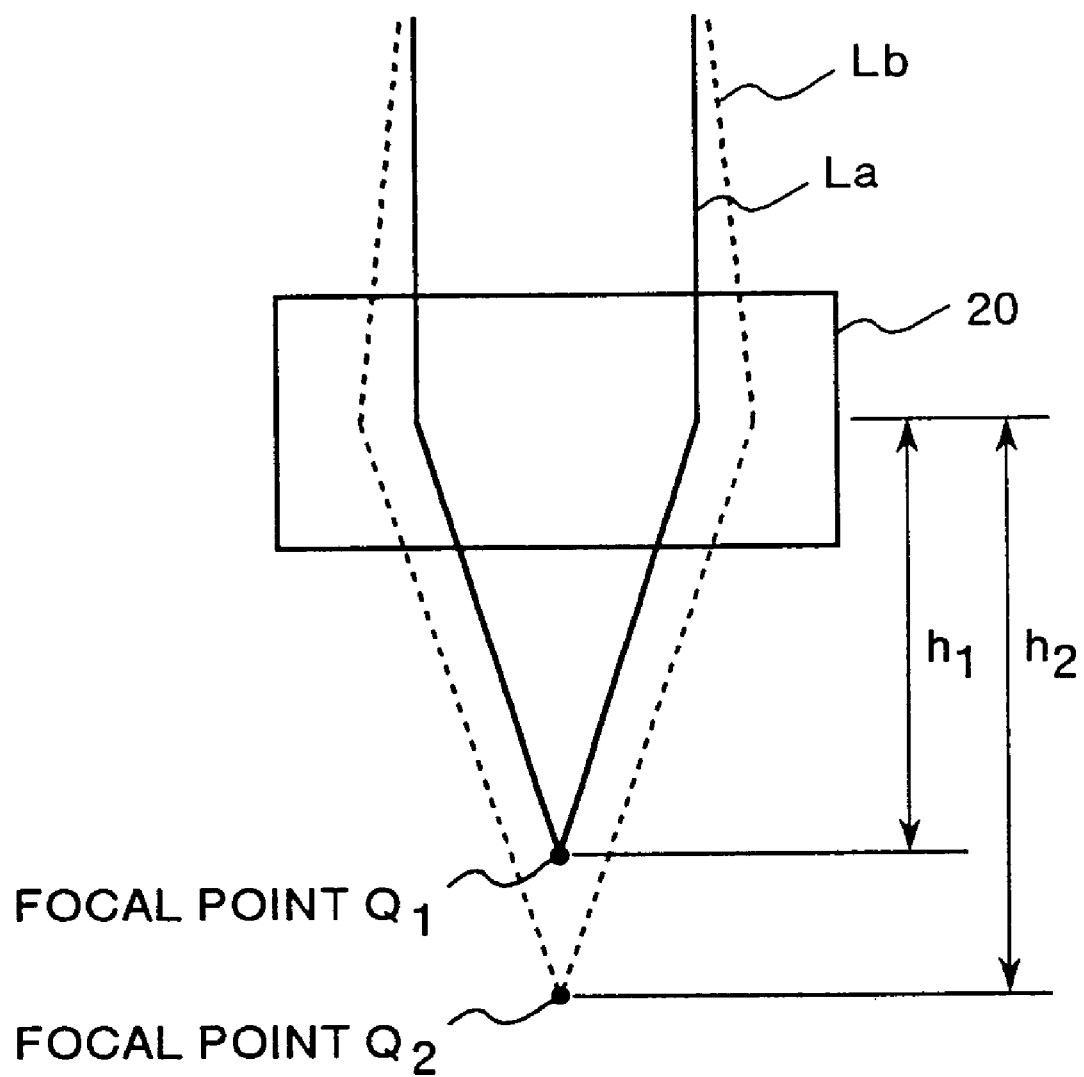
FIG. 43 is an explanatory view showing a relation between a divergence angle of a laser beam and a converging position.

As shown in FIG. 43, a focal point of the laser beam L after having passing through the converging lens 20 can be changed by adjusting a divergence angle of the laser beam L introduced into the converging lens 20. In FIG. 43, La shows a case where a divergence angle of the laser beam L is relatively small, and Lb shows a case where a divergence angle of the laser beam L is relatively large. When a divergence angle of the laser beam L is relatively small, the focal length is $h_1$ according to the focal point $Q_1$, and when a divergence angle of the laser beam L is relatively large, the focal length is $h_2$ according to the focal point $Q_2$.

The adaptive optics 110 is driven at a fixed rate according to an instruction signal outputted from a control circuit 111. The control circuit 111 outputs an instruction to a driver 112 for the adaptive optics 110 according to the temperature of the converging lens 20 detected by the temperature sensor 26.

In addition to positional displacement on a work W according to temperature, a change of a focal point due to a temperature change occurs, so that a focal point of a laser beam L passing through the converging lens 20 can be adjusted by adjusting a divergence angle of the laser beam L with the adaptive optics according to the temperature of the converging lens, and also the focal point can be maintained on a surface of the work W by means of this adjustment, so that, even if a change in the temperature of the converging lens occurs, stable laser machining can be executed and also machining fault due to displacement of a focus caused by a change in the temperature of the converging lens can be prevented.

Figure 44:
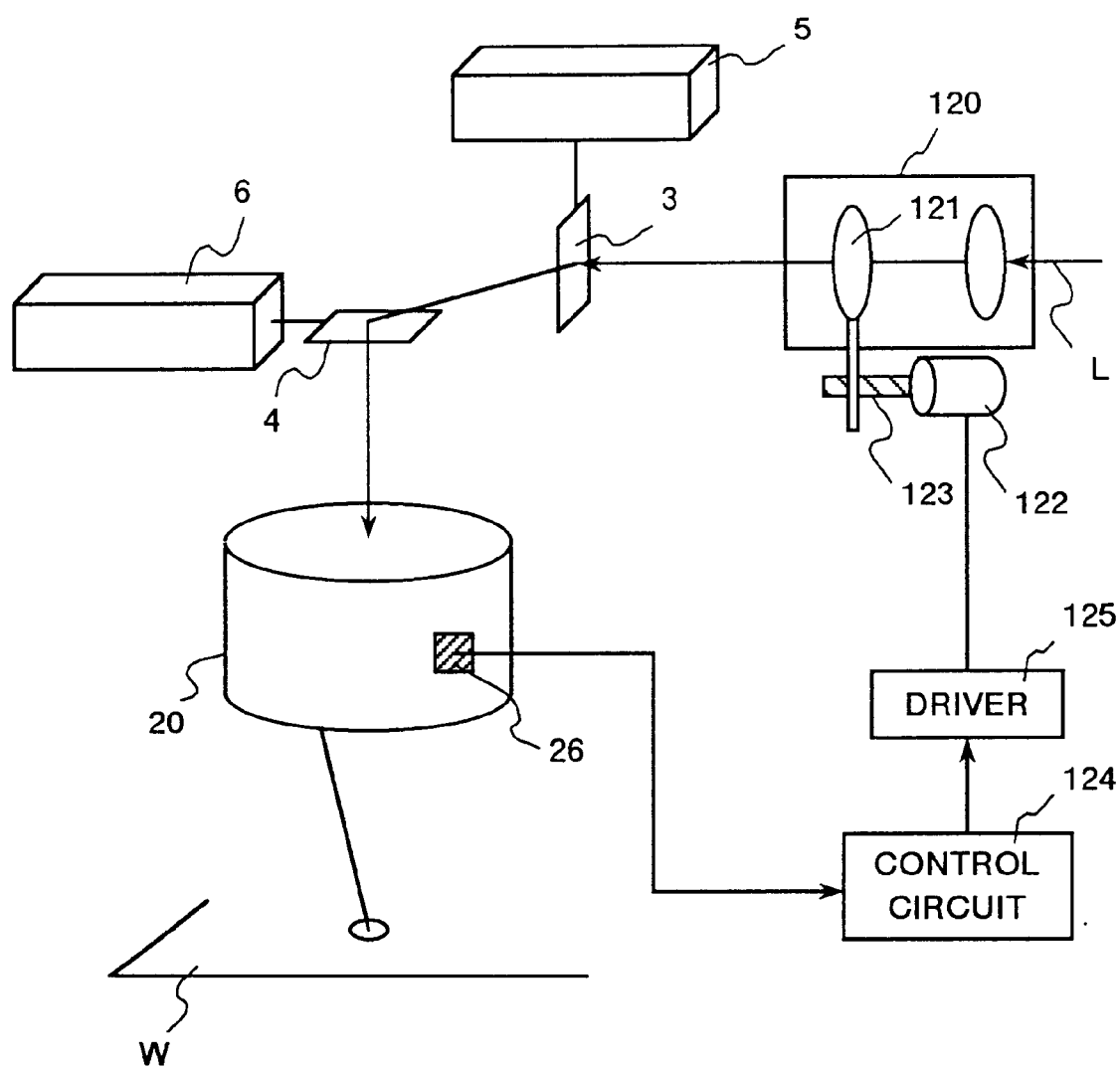
FIG. 44 is a block diagram showing Embodiment 22 of the laser machining apparatus according to the present invention.

FIG. 44 shows Embodiment 22 of the laser machining apparatus according to the present invention.

In the laser machining apparatus according to this embodiment, to cancel a change in the focal length of the converging lens 20 because of a change in the temperature, as a mechanism for adjusting a divergence angle of a laser beam L introduced into the converging lens 20, a collimate lens position adjusting mechanism is incorporated therein.

The collimate lens 120 includes a variable lens 121 movable in the direction of the optic axis. A ball screw 123 driven by the servo motor 122 is connected to the movable lens 121, and moves in the direction of the optic axis according to rotation of the ball screw 123.

The servo motor 122 is driven according to an instruction signal outputted by a control circuit 124. The control circuit 124 outputs an instruction to a driver 125 of the servo motor 122 according to the temperature of the converging lens 20 detected by the temperature sensor 26.

The control circuit 124 can cancel a change in a focal length of the converging lens 20 because of a change in the temperature by outputting an instruction for a lens position according to the temperature of the converging lens 20 detected by the temperature sensor 26 attached to the converging lens 20 for adjustment with the diver 125.

Because of this feature, a position of a focal point can be maintained on the surface of the work, and stable laser machining can be made even if a change in the temperature of the converging lens 20 occurs, so that machining fault due to displacement of a focus caused by a change in the temperature of the converging lens can be prevented.

Figure 45:
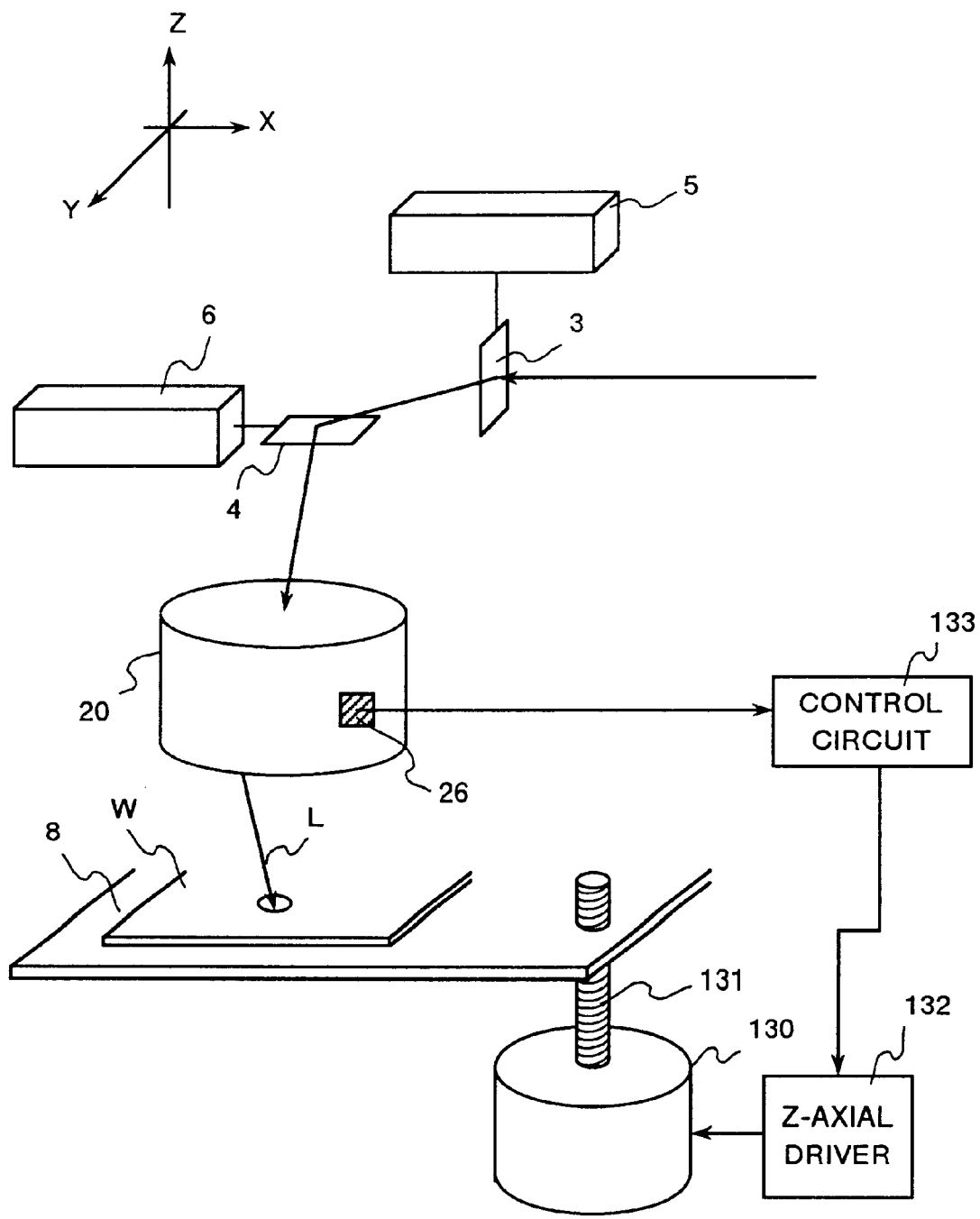
FIG. 45 is a block diagram showing Embodiment 23 of the laser machining apparatus according to the present invention.
Figure 46:
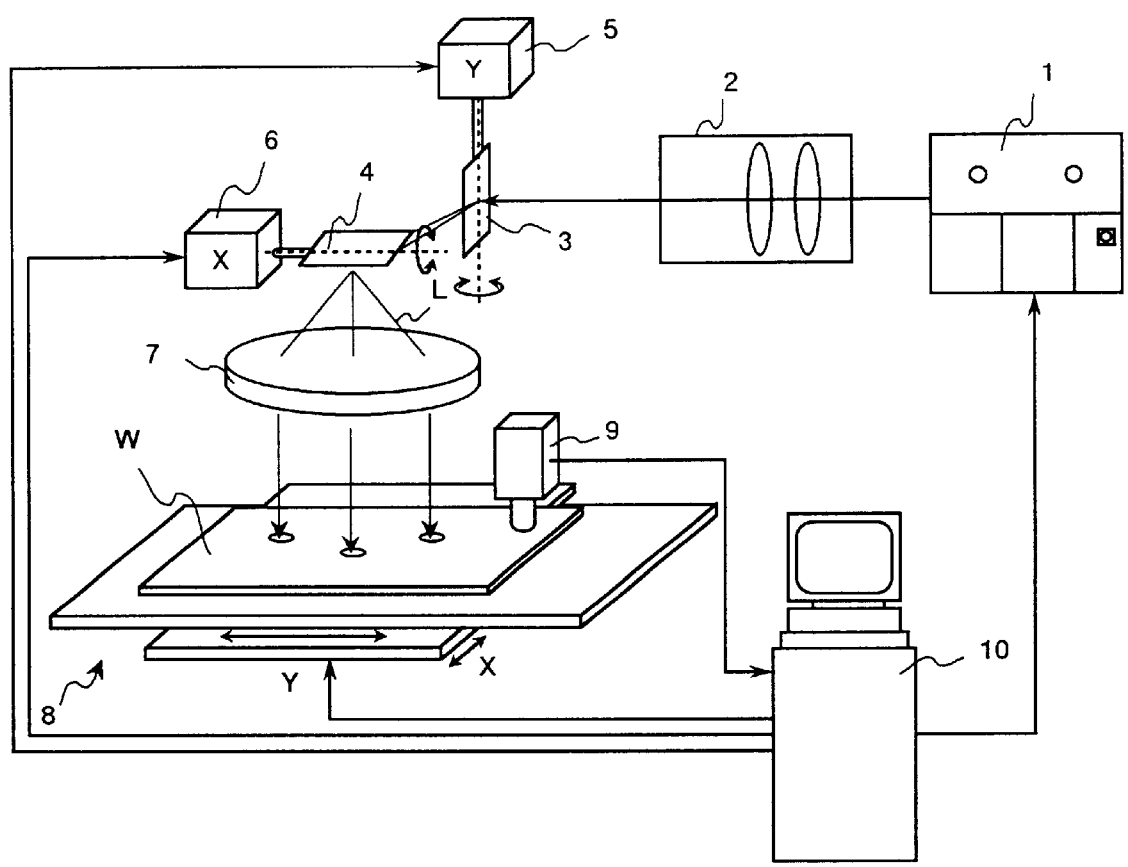
FIG. 46 is a block diagram showing an example of a laser machining apparatus based on the conventional technology.
Figure 47:
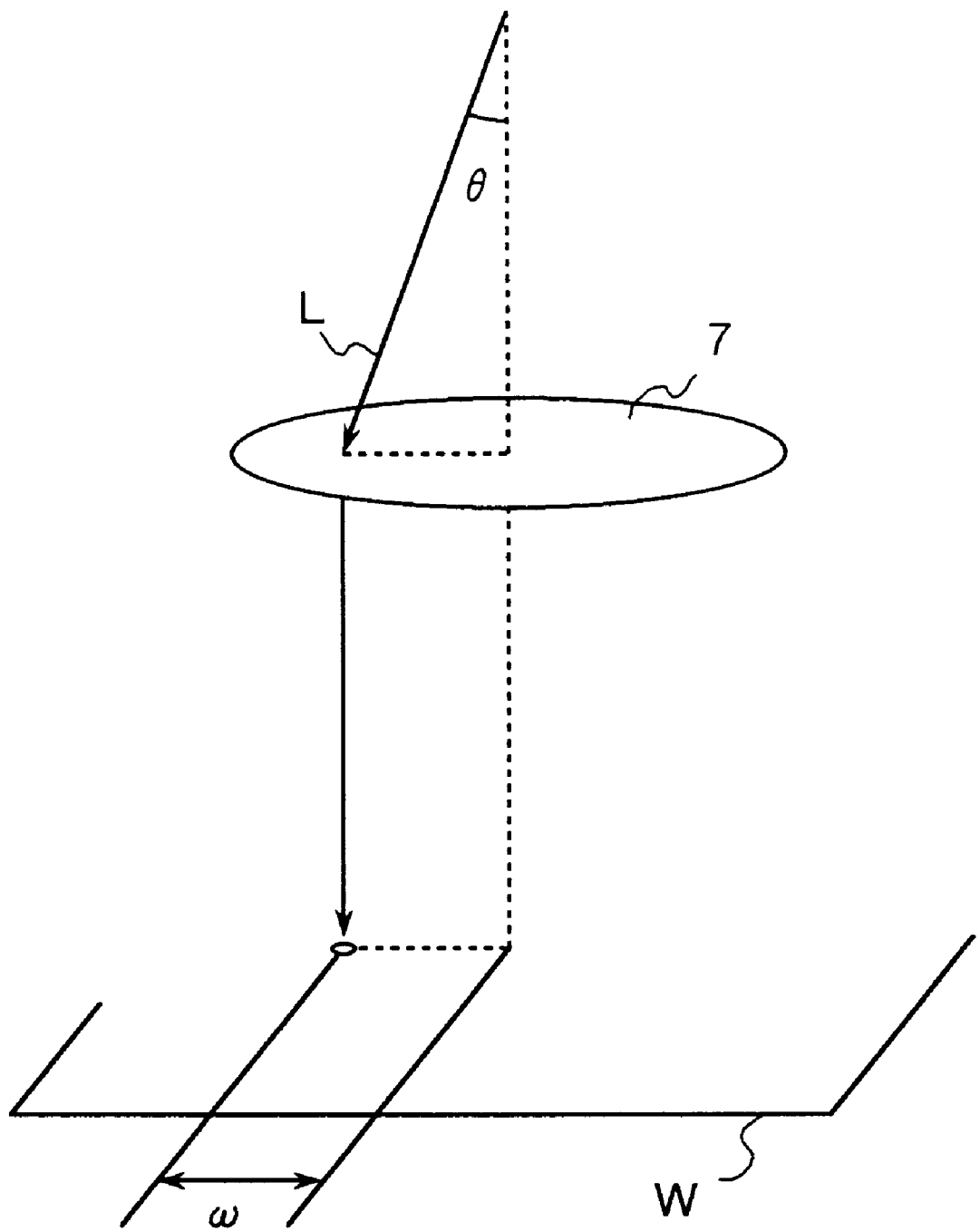
FIG. 47 is an explanatory view showing the converging position characteristics of an fθ lens.
Figure 48:
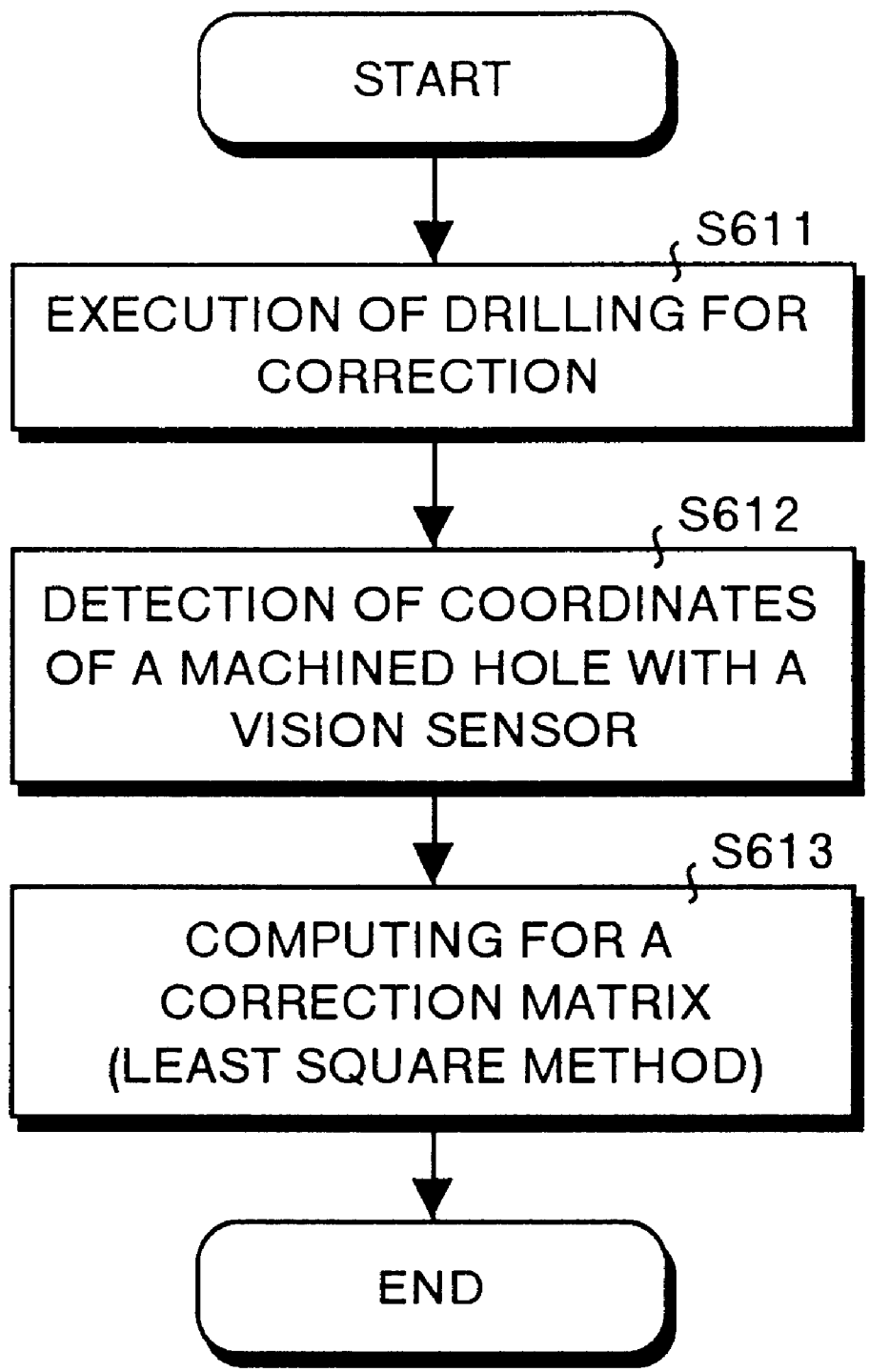
FIG. 48 is a flow chart showing a sequence for correcting and updating the parameters of the converging lens.
Figure 49:
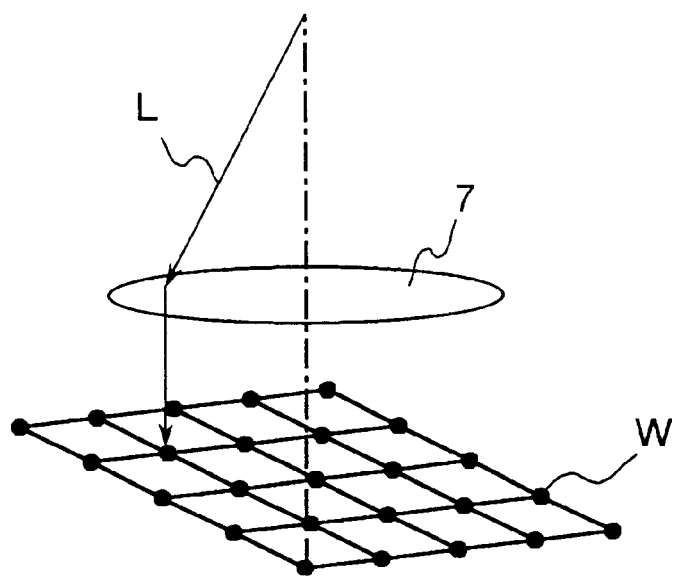
FIG. 49 is an explanatory view showing outline of fixed point machining.
Figure 50:
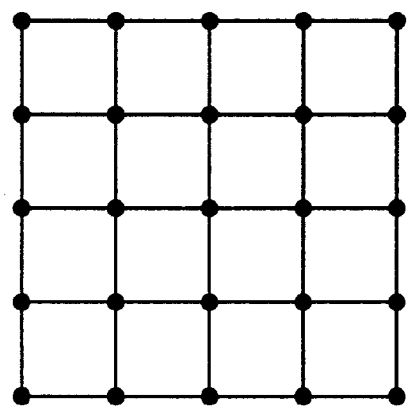
FIG. 50 is an explanatory view showing fixed position machining.
Figure 51:
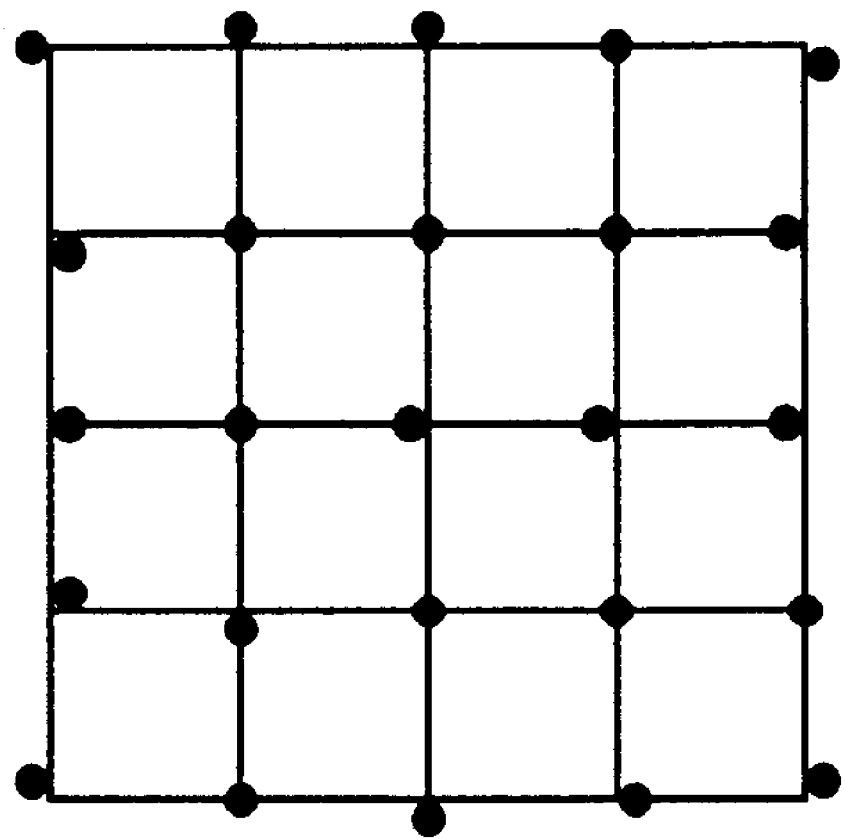
FIG. 51 is an explanatory view showing a machining error in fixed position machining.
Figure 52:
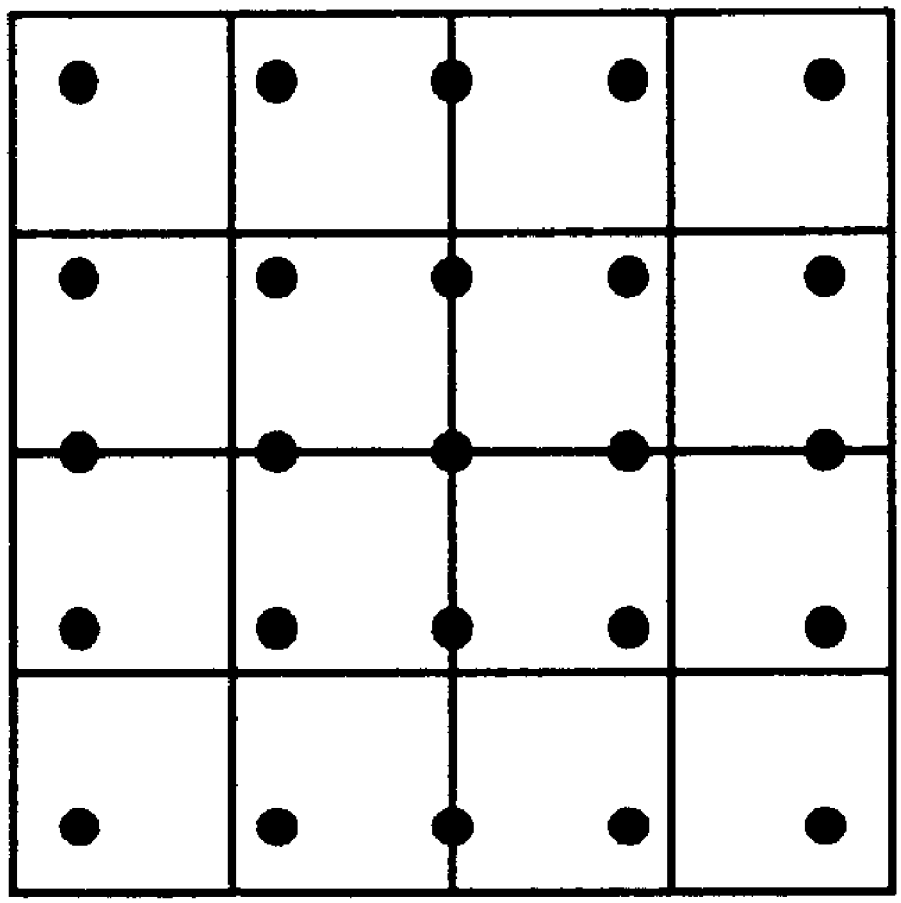
FIG. 52 is an explanatory view showing positional displacement in a laser machining apparatus based on the conventional technology.
Figure 53:
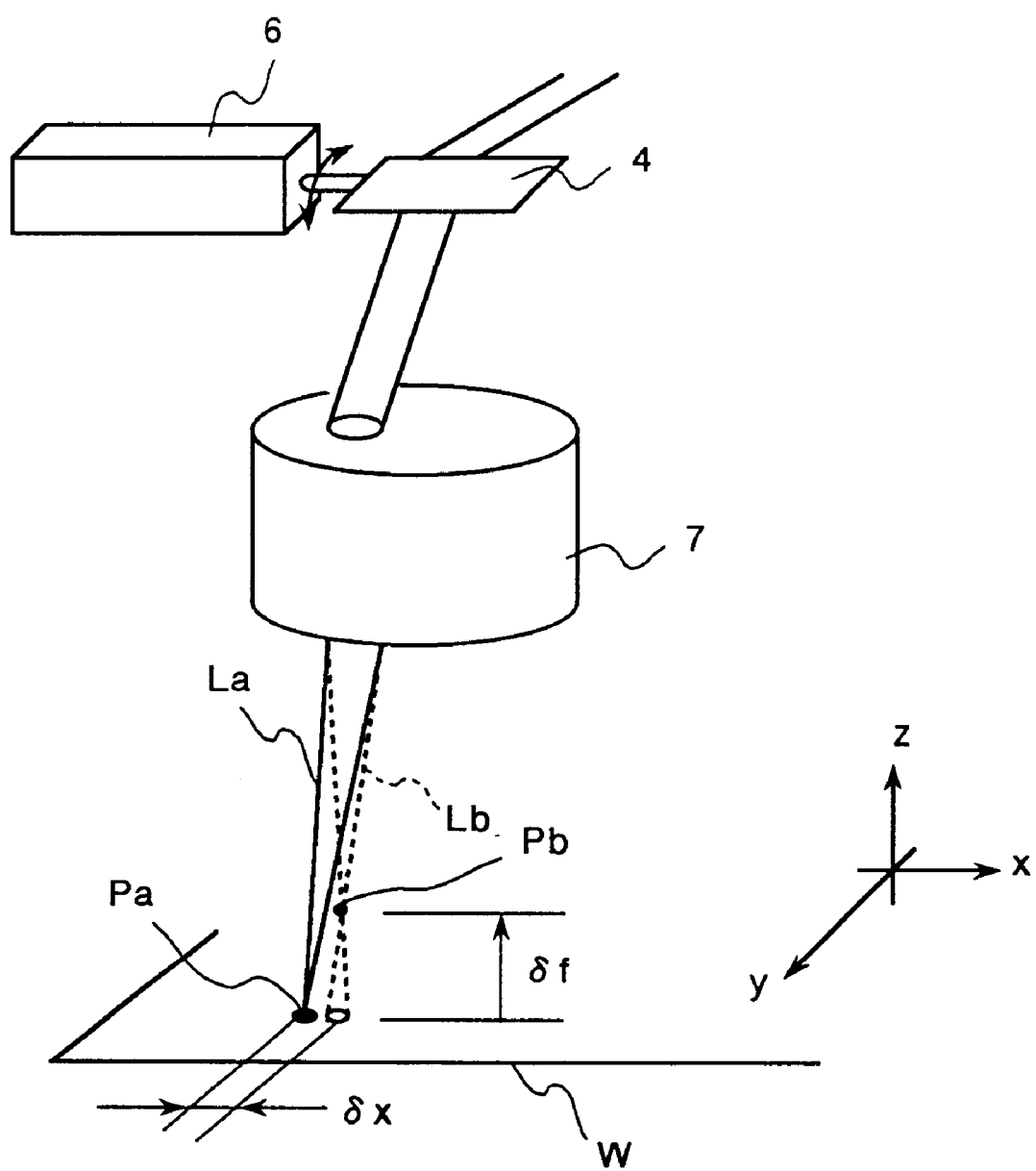
FIG. 53 is an explanatory view showing a change of a converging position in a laser machining apparatus.

FIG. 45 shows Embodiment 23 of the laser machining apparatus according to the present invention.

In the laser machining apparatus according to this embodiment, as a mechanism for canceling a change in a focal length of the converging lens 20 because of a change in the temperature, a table-side Z-axis driving mechanism (table height adjusting mechanism) for displacing the entire work table device 8 towards the converging lens 29 in the direction of the optic axis (in the Z-axial direction) is incorporated therein.

The table-side Z-axis driving mechanism is based, for instance, on a feed screw system, and has a servo motor 130 fixed on a basement for the laser machining apparatus not shown herein, a ball screw 131 rotated and driven by the servo motor 130 for moving the work table device 8 by means of its rotation in the Z-axial direction, and a control circuit 133 for outputting a Z-axial instruction to the Z-axial driver 132 of the servo motor 130 according to the temperature of the converging lens 20 detected by the temperature sensor 26.

A height of the machining table device 8 along the Z axis with a work W to be machined mounted thereon is adjusted by rotation of the ball screw 131 by the servo motor 130.

The height of the machining table device 8 is adjusted in order to cancel a previously estimated change rate in a focal position of the converging lens 20 because of a change in the temperature according to temperature of the converging lens 20 detected by the temperature sensor 26 attached to the converging lens 20.

With this configuration, a position of a focal point can be maintained on the surface of a work to be machined, and stable laser machining can be executed even if a change in the temperature of the converging lens 20 occurs, so that machining fault due to displacement of a focus caused by a change in the temperature of the converging lens can be prevented.

INDUSTRIAL AVAILABILITY

As described above, the laser machining apparatus according to the present invention is suited to high precision and fine laser machining for drilling, cutting, or marking a material such as resin or ceramics in printed boards or semiconductor chips.

What is claimed is:

1. A laser machining apparatus comprising:
   a deflector for changing the direction of a laser beam outputted from a laser oscillator; and
   a converging lens for refracting a laser beam introduced from the deflector and focusing the laser beam onto a work to be machined; wherein said converging lens comprises a plurality of lenses and has a lens position adjusting unit for changing a relative position of the plurality of lenses to cancel a change of a reflective index of the converging lens according to a change in the temperature so that the converging characteristics of the converging lens does not depend on a change in the temperature of the converging lens.

2. A laser machining apparatus according to claim 1; wherein said lens position adjusting unit comprises a temperature measuring unit for detecting the temperature of the converging lens, an actuator for driving the lens in the direction of the optic axis, and a control circuit for controlling the actuator so as to compensate for the displacement of a focus of the converging lens because of the change in the temperature according to the temperature of the converging lens detected by the temperature measuring unit.

3. A laser machining apparatus according to claim 2; wherein said actuator comprises a feed screw mechanism for moving the lens in the direction of the optic axis, and a motor for rotating and driving the feed screw mechanism.

4. A laser machining apparatus according to claim 2; wherein said actuator comprises a piezoelectric element.

5. A laser machining apparatus according to claim 1; wherein said lens position adjusting unit comprises a holding member made from a material having temperature dependency for holding the lenses and for changing the position of the lens by expansion or contraction of the holding member itself according to a change in the temperature.

6. A laser machining apparatus comprising:
   a deflector for changing a direction of a laser beam outputted from a laser oscillator; and
   a converging lens for refracting a laser beam introduced from the deflector and focusing the laser beam onto a work to be machined;
   wherein said converging lens has, in addition to a group of convex lenses for converging a light beam, a concave lens for temperature compensation incorporated therein, a change of a reflective index of the group of convex lenses because of a change in the temperature is canceled by a change of a reflective index of the concave lens, and the converging characteristics of the converging lens does not depend on a change in the reflective index of the converging lens because of the change in the temperature.

7. A laser machining apparatus according to claim 6; wherein said group of the convex lenses of the converging lens are made of zinc selenite and the concave lens is made of germanium.

8. A laser machining apparatus comprising:
   a deflector for changing a direction of a laser beam outputted from a laser oscillator;
   a converging lens for refracting a laser beam introduced from the deflector and focusing the laser beam onto a work to be machined;
   a temperature measuring unit for detecting the temperature of the converging lens; and
   a temperature display unit for displaying the temperature of the converging lens detected by the temperature measuring unit.

9. A laser machining device according to claim 8; wherein the temperature display unit has a reset button and a change in the temperature of the converging lens is displayed when the reset button is operated.

10. A laser machining apparatus comprising:
    a deflector for changing a direction of a laser beam outputted from a laser oscillator;
    a converging lens for refracting a laser beam introduced from the deflector and focusing the laser beam onto a work to be machined;
    a temperature measuring unit for detecting the temperature of the converging lens; and
    an alarming unit for generating an alarm when a change in the temperature of the converging lens exceeds a previously decided permissible value.

11. A laser machining apparatus comprising:
    a deflector for changing a direction of a laser beam outputted from a laser oscillator;
    a converging lens for refracting a laser beam introduced from the deflector and focusing the laser beam onto a work to be machined;
    a temperature measuring unit for detecting the temperature of the converging lens; and
    a heating unit for heating the converging lens so that the temperature of the converging lens detected by the temperature measuring unit is maintained at a specified constant value.

12. A laser machining apparatus comprising:
    a deflector for changing a direction of a laser-beam outputted from a laser oscillator;
    a converging lens for refracting a laser beam introduced from the deflector and focusing the laser beam onto a work to be machined;
    a temperature measuring unit for detecting the temperature of the converging lens; and
    a temperature control unit for cooling the converging lens so that the temperature of the converging lens detected by the temperature measuring unit is maintained at a specified constant value.

13. A laser machining device according to claim 12; wherein the temperature control unit is a Peltier element.

14. A laser machining apparatus comprising:
   a deflector for changing a direction of a laser beam outputted from a laser oscillator;
   a converging lens for refracting a laser beam introduced from the deflector and focusing the laser beam onto a work to be machined; and
   a heat-insulating unit for protecting the converging lens from temperature of ambient air.

15. A laser machining apparatus according to claim 14; wherein said heat-insulating unit comprising:
   an external cylindrical body surrounding the outside of the converging lens;
   a heat-insulating material filled in a space (heat-insulating space) between the converging lens and the external cylindrical body surrounding outside of the converging lens; and
   window shield plates which pass the laser beam are provided on the upper and lower sides of the heat-insulating space.

16. A laser machining apparatus comprising:
   a deflector for changing a direction of a laser beam outputted from a laser oscillator;
   a converging lens for refracting a laser beam introduced from the deflector and focusing the laser beam onto a work to be machined;
   a temperature measuring unit for detecting the temperature of the converging lens; and
   a variable wavelength laser oscillator for variably setting a wavelength of an outputted laser beam according to the temperature of the converging lens detected by the temperature measuring unit so that the amount of change in the optical characteristics of the converging lens because of a change in the temperature of the converging lens is canceled.

17. A laser machining apparatus comprising:
   a deflector for changing a direction of a laser beam outputted from a laser oscillator;
   a converging lens for refracting a laser beam introduced from the deflector and focusing the laser beam onto a work to be machined;
   a temperature measuring unit for detecting the temperature of the converging lens; and
   a cancel mechanism for adjusting a distance between the converging lens and the deflector according to the temperature of the converging lens detected by the temperature measuring unit to cancel the amount of change in the optical characteristics of the converging lens because of a change in the temperature of the converging lens.

18. A laser machining apparatus comprising:
   a deflector for changing a direction of a laser beam outputted from a laser oscillator;
   a converging lens for refracting a laser beam introduced from the deflector and focusing the laser beam onto a work to be machined;
   a temperature measuring unit for detecting the temperature of the converging lens; and
   an adaptive optics for adjusting a divergence angle of a laser beam according to the temperature of the converging lens detected by the temperature measuring unit so that the amount of change in the focal length of the converging lens because of a change in the temperature of the converging lens is canceled.

19. A laser machining apparatus comprising:
   a deflector for changing a direction of a laser beam outputted from a laser oscillator;
   a converging lens for refracting a laser beam introduced from the deflector and focusing the laser beam onto a work to be machined;
   a temperature measuring unit for detecting the temperature of the converging lens; and
   a collimate lens position adjusting mechanism for adjusting a position of a collimate lens according to the temperature of the converging lens detected by the temperature measuring unit so that the amount of change in the focal length of the converging lens because of a change in the temperature of the converging lens is canceled.

20. A laser machining apparatus comprising:
   a deflector for changing a direction of a laser beam outputted from a laser oscillator;
   a converging lens for refracting a laser beam introduced from the deflector and focusing the laser beam onto a work to be machined;
   a temperature measuring unit for detecting the temperature of the converging lens; and
   a machining table height adjusting mechanism for adjusting a distance between the converging lens and the work so that the amount of change in the focal length of the converging lens because of a change in the temperature of the converging lens is cancelled.

21. A laser machining apparatus comprising:
   a deflector for changing a direction of a laser beam outputted from a laser oscillator;
   a converging lens for refracting a laser beam introduced from the deflector and focusing the laser beam onto a work to be machined;
   a temperature measuring unit for detecting the temperature of the converging lens; and
   a temperature adjusting unit for adjusting the temperature of ambient air in a section where the converging lens is provided therein so that temperature of the converging lens detected by the temperature measuring unit is maintained at a specified contact value.

22. A laser machining apparatus comprising:
   a deflector for changing a direction of a laser beam outputted from a laser oscillator;
   a converging lens for refracting a laser beam introduced from the deflector and focusing the laser beam onto a work to be machined; and
   a cancel mechanism for canceling a change rate of the optical characteristics of the converging lens because of a change in the temperature of the converging lens by adjusting an angle of the laser beam introduced into the converging lens.

23. A laser machining apparatus according to claim 22; wherein said cancel mechanism is a deflection rate instruction correcting unit for correcting an instruction value for a deflection rate to the deflector.

24. A laser machining apparatus according to claim 23 comprising:
   a temperature measuring unit for detecting the temperature of the converging lens; wherein said deflection rate instruction correcting unit corrects an instruction value for a deflection rate to the deflector according to a correction parameter set according to temperature of the converging lens detected by the temperature measuring unit.

25. A laser machining apparatus according to claim 23; wherein said deflection rate instruction correcting unit executes correction of an instruction for a deflection rate by means of coordinate transformation with a coordinate transformation function obtained from a machining position error in fixed point machining.

26. A laser machining apparatus according to claim 25; wherein the coordinate transformation function or correction matrix is updated before start of laser machining each time laser machining is executed.

27. A laser machining apparatus according to claim 25 comprising a temperature measuring unit for detecting the temperature of the converging lens; wherein said coordinate transformation function or correction matrix is updated, when a change in the temperature of the converging lens detected by the temperature measuring unit exceeds a specified value, before start of laser machining according to the temperature of the converging lens at that point of time.

28. A laser machining apparatus according to claim 25; wherein the coordinate transformation function or the correction matrix is updated at prespecified timing.

29. A laser machining apparatus according to claim 25; wherein the coordinate transformation function or the correction matrix is updated each time a specified period of time has passed.

30. A laser machining apparatus according to claim 25 comprising:
a temperature measuring unit for detecting the temperature of the converging lens by previously obtaining a correction matrix for temperature of each converging lens; wherein a correction matrix corresponding to the temperature of the converging lens detected by the temperature measuring unit is used.

31. A laser machining apparatus according to claim 21 or claim 22; wherein said cancel mechanism includes a variable gain setting unit for variably setting a gain of an instruction value for a deflection rate to the deflector according to the temperature of the converging lens detected by the temperature measuring unit.

32. A laser machining apparatus according to claim 22; wherein said cancel mechanism includes a bend mirror for adjusting the angle of the laser beam introduced into the deflector.

33. A laser machining apparatus comprising:
a deflector for changing a direction of a laser beam outputted from a laser oscillator;
a converging lens for refracting a laser beam introduced from the deflector and focusing the laser beam onto a work to be machined;
a temperature measuring unit for detecting the temperature of the converging lens; and
a machining table driving instruction correcting unit for correcting a positional instruction for the work to the converging lens according to the temperature of the converging lens detected by the temperature measuring unit and also for canceling fluctuation of the optical characteristics of the converging lens due to fluctuation in temperature of the converging lens.

* * * * *